United States Patent
Lynam

(10) Patent No.: US 11,827,155 B2
(45) Date of Patent: *Nov. 28, 2023

(54) VEHICULAR EXTERIOR REARVIEW MIRROR ASSEMBLY WITH BLIND SPOT INDICATOR

(71) Applicant: Magna Mirrors of America, Inc., Holland, MI (US)

(72) Inventor: Niall R. Lynam, Holland, MI (US)

(73) Assignee: Magna Mirrors of America, Inc., Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/054,964

(22) Filed: Nov. 14, 2022

(65) Prior Publication Data

US 2023/0075827 A1   Mar. 9, 2023

Related U.S. Application Data

(63) Continuation of application No. 17/649,808, filed on Feb. 3, 2022, now Pat. No. 11,498,487, which is a
(Continued)

(51) Int. Cl.
*B60R 1/12* (2006.01)
*B60R 1/06* (2006.01)
(Continued)

(52) U.S. Cl.
CPC .............. *B60R 1/1207* (2013.01); *B60R 1/06* (2013.01); *B60R 1/0602* (2013.01); *B60R 1/062* (2013.01);
(Continued)

(58) Field of Classification Search
CPC ....... B60R 1/1207; B60R 1/06; B60R 1/0602; B60R 1/08; B60R 2001/1215
See application file for complete search history.

(56) References Cited

U.S. PATENT DOCUMENTS

| 1,096,452 A | 5/1914 | Perrin |
| 1,114,559 A | 10/1914 | Weed |

(Continued)

FOREIGN PATENT DOCUMENTS

| CA | 1063695 A | 10/1979 |
| DE | 3624321 A1 | 2/1988 |

(Continued)

*Primary Examiner* — Anne M Hines
(74) *Attorney, Agent, or Firm* — HONIGMAN LLP

(57) ABSTRACT

A vehicular exterior breakaway rearview mirror assembly includes a skull-cap mirror shell and a reflective element. With the mirror assembly mounted at an exterior side of a vehicle, the skull-cap mirror shell has an inboard wall that faces toward the exterior side of the vehicle. A blind spot indicator is disposed at an aperture established at the inboard wall of the skull-cap mirror shell. An illumination source of the blind spot indicator is activated to illuminate the blind spot indicator responsive to an electronic blind spot monitoring system of the vehicle detecting another vehicle that is approaching or overtaking the equipped vehicle. Illumination of the blind spot indicator by activation of the illumination source is readily viewable by the driver of the equipped vehicle and is not readily viewable by a driver of the detected other vehicle.

45 Claims, 35 Drawing Sheets

Related U.S. Application Data continuation of application No. 16/819,693, filed on Mar. 16, 2020, now Pat. No. 11,242,009, which is a continuation of application No. 15/083,895, filed on Mar. 29, 2016, now Pat. No. 10,589,686, which is a continuation of application No. 14/714,762, filed on May 18, 2015, now Pat. No. 9,302,624, which is a continuation of application No. 13/919,489, filed on Jun. 17, 2013, now Pat. No. 9,035,754, which is a continuation of application No. 13/572,045, filed on Aug. 10, 2012, now Pat. No. 8,466,779, which is a continuation of application No. 13/290,644, filed on Nov. 7, 2011, now Pat. No. 8,242,896, which is a continuation of application No. 12/446,507, filed as application No. PCT/US2007/082099 on Oct. 22, 2007, now Pat. No. 8,058,977, said application No. 13/919,489 is a continuation of application No. 13/452,121, filed on Apr. 20, 2012, now Pat. No. 8,466,780, which is a continuation of application No. 13/017,346, filed on Jan. 31, 2011, now Pat. No. 8,164,482, which is a continuation of application No. 12/794,111, filed on Jun. 4, 2010, now Pat. No. 7,880,596, which is a continuation of application No. 12/370,050, filed on Feb. 12, 2009, now Pat. No. 7,760,111, which is a continuation of application No. 11/994,471, filed as application No. PCT/US2006/026148 on Jul. 5, 2006, now Pat. No. 7,492,281, said application No. 14/714,762 is a continuation-in-part of application No. 14/486,133, filed on Sep. 15, 2014, now Pat. No. 9,045,091, which is a continuation of application No. 13/646,960, filed on Oct. 8, 2012, now Pat. No. 8,833,987, which is a continuation of application No. 13/335,135, filed on Dec. 22, 2011, now Pat. No. 8,282,253, which is a continuation of application No. 12/550,054, filed on Aug. 28, 2009, now Pat. No. 8,083,386, which is a continuation of application No. 11/520,193, filed on Sep. 13, 2006, now Pat. No. 7,581,859.

(60) Provisional application No. 60/970,687, filed on Sep. 7, 2007, provisional application No. 60/918,089, filed on Mar. 15, 2007, provisional application No. 60/853,850, filed on Oct. 24, 2006, provisional application No. 60/696,953, filed on Jul. 6, 2005, provisional application No. 60/784,570, filed on Mar. 22, 2006, provisional application No. 60/717,093, filed on Sep. 14, 2005.

(51) Int. Cl.
    *B60R 1/062* (2006.01)
    *B60R 1/08* (2006.01)

(52) U.S. Cl.
    CPC ........ *B60R 1/08* (2013.01); *B60R 2001/1215* (2013.01)

(56) References Cited

U.S. PATENT DOCUMENTS

| | | |
|---|---|---|
| 1,563,258 A | 11/1925 | Cunningham |
| 1,672,559 A | 6/1928 | Doble |
| RE17,274 E | 4/1929 | Porter |
| 2,010,138 A | 8/1935 | Condon |
| 2,135,262 A | 11/1938 | Schumacher |
| 2,263,382 A | 11/1941 | Gotzinger |
| 2,457,348 A | 12/1948 | Chambers |
| 2,514,989 A | 7/1950 | Buren |
| 2,561,582 A | 7/1951 | Marbel |
| 2,580,014 A | 12/1951 | Gazda |
| 2,636,419 A | 4/1953 | Kerr |
| 2,778,273 A | 1/1957 | Fellmeth |
| 2,911,177 A | 11/1959 | West |
| 3,104,274 A | 9/1963 | King |
| 3,131,250 A | 4/1964 | Ely |
| 3,146,296 A | 8/1964 | Fischer |
| 3,170,985 A | 2/1965 | Katulich |
| 3,175,463 A | 3/1965 | Seashore |
| 3,266,016 A | 8/1966 | Maru |
| 3,267,806 A | 8/1966 | Azegami |
| 3,280,701 A | 10/1966 | Donnelly et al. |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer |
| 3,610,739 A | 10/1971 | Seashore |
| 3,667,833 A | 6/1972 | Baldwin, Sr. |
| 3,708,222 A | 1/1973 | Stern |
| 3,764,201 A | 10/1973 | Haile |
| 3,806,232 A | 4/1974 | Gray |
| 3,826,563 A | 7/1974 | Davis |
| 3,881,811 A | 5/1975 | French |
| 3,887,788 A | 6/1975 | Seibel et al. |
| 3,909,117 A | 9/1975 | Takahashi et al. |
| 4,200,359 A | 4/1980 | Lawson |
| 4,223,983 A | 9/1980 | Bloom |
| 4,258,979 A | 3/1981 | Mahin |
| 4,264,144 A | 4/1981 | McCord |
| 4,268,120 A | 5/1981 | Jitsumori |
| 4,274,078 A | 6/1981 | Isobe et al. |
| 4,281,899 A | 8/1981 | Oskam |
| 4,293,191 A | 10/1981 | Kim |
| 4,303,308 A | 12/1981 | Kobrin |
| 4,306,770 A | 12/1981 | Marhauer |
| 4,311,362 A | 1/1982 | LaPorte |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,435,042 A | 3/1984 | Wood et al. |
| 4,436,371 A | 3/1984 | Wood et al. |
| 4,436,372 A | 3/1984 | Schmidt et al. |
| 4,439,013 A | 3/1984 | Hagn et al. |
| 4,449,786 A | 5/1984 | McCord |
| 4,470,665 A | 9/1984 | Blom |
| 4,499,451 A | 2/1985 | Suzuki et al. |
| 4,526,446 A | 7/1985 | Adams |
| 4,549,786 A | 10/1985 | Albers et al. |
| 4,555,166 A | 11/1985 | Enomoto |
| 4,575,202 A | 3/1986 | McGuire |
| 4,588,267 A | 5/1986 | Pastore |
| 4,609,266 A | 9/1986 | Blom |
| 4,623,222 A | 11/1986 | Itoh et al. |
| 4,629,296 A | 12/1986 | White |
| 4,630,904 A | 12/1986 | Pastore |
| 4,674,849 A | 6/1987 | Stewart |
| 4,674,850 A | 6/1987 | Blom |
| 4,678,294 A | 7/1987 | Van Nostrand |
| 4,679,906 A | 7/1987 | Brandenburg |
| 4,712,879 A | 12/1987 | Lynam et al. |
| 4,715,701 A | 12/1987 | Urban |
| 4,721,364 A | 1/1988 | Itoh et al. |
| 4,727,302 A | 2/1988 | Mizuta et al. |
| 4,733,335 A | 3/1988 | Serizawa et al. |
| 4,733,336 A | 3/1988 | Skogler et al. |
| 4,770,522 A | 9/1988 | Alten |
| 4,773,740 A | 9/1988 | Kawakami et al. |
| D297,926 S | 10/1988 | Kesler |
| 4,793,690 A | 12/1988 | Gahan et al. |
| 4,799,768 A | 1/1989 | Gahan |
| 4,803,599 A | 2/1989 | Trine et al. |
| 4,824,231 A | 4/1989 | Quintana |

(56) References Cited

U.S. PATENT DOCUMENTS

| | | |
|---|---|---|
| 4,826,289 A | 5/1989 | Vandenbrink et al. |
| 4,828,379 A | 5/1989 | Parsons et al. |
| 4,853,283 A | 8/1989 | Skolnick |
| 4,859,046 A | 8/1989 | Traynor et al. |
| 4,882,466 A | 11/1989 | Friel |
| 4,882,565 A | 11/1989 | Gallmeyer |
| 4,906,075 A | 3/1990 | Matsumiya |
| 4,906,085 A | 3/1990 | Sugihara et al. |
| 4,913,542 A | 4/1990 | Adolfsson |
| 4,917,477 A | 4/1990 | Bechtel et al. |
| 4,917,485 A | 4/1990 | Baldwin, Sr. |
| 4,929,074 A | 5/1990 | Urban |
| 4,931,627 A | 6/1990 | Watts |
| 4,932,769 A | 6/1990 | Goosen |
| 4,932,770 A | 6/1990 | Caravaty |
| 4,948,242 A | 8/1990 | Desmond et al. |
| 4,951,179 A | 8/1990 | Machida |
| 4,989,964 A | 2/1991 | Meise |
| 5,005,962 A | 4/1991 | Edelman |
| 5,014,167 A | 5/1991 | Roberts |
| 5,016,996 A | 5/1991 | Ueno |
| 5,017,903 A | 5/1991 | Krippelz, Sr. |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,052,792 A | 10/1991 | McDonough |
| 5,059,015 A | 10/1991 | Tran |
| 5,066,112 A | 11/1991 | Lynam et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,080,492 A | 1/1992 | Platzer, Jr. |
| 5,107,374 A | 4/1992 | Lupo et al. |
| 5,115,346 A | 5/1992 | Lynam |
| 5,115,352 A | 5/1992 | do Espirito Santo |
| 5,117,346 A | 5/1992 | Gard |
| 5,118,540 A | 6/1992 | Hutchison |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,166,833 A | 11/1992 | Shyu |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,225,943 A | 7/1993 | Lupo |
| 5,233,461 A | 8/1993 | Dornan et al. |
| 5,237,458 A | 8/1993 | Polanyi et al. |
| 5,237,459 A | 8/1993 | Strauss |
| 5,239,405 A | 8/1993 | Varaprasad et al. |
| 5,247,395 A | 9/1993 | Martinez |
| 5,253,109 A | 10/1993 | O'Farrell et al. |
| 5,285,060 A | 2/1994 | Larson et al. |
| 5,295,021 A | 3/1994 | Swanson |
| 5,296,973 A | 3/1994 | Burke |
| 5,313,335 A | 5/1994 | Gray et al. |
| 5,327,288 A | 7/1994 | Wellington et al. |
| 5,340,503 A | 8/1994 | Varaprasad et al. |
| 5,354,965 A | 10/1994 | Lee |
| 5,355,245 A | 10/1994 | Lynam |
| 5,355,284 A | 10/1994 | Roberts |
| 5,361,190 A | 11/1994 | Roberts et al. |
| 5,371,659 A | 12/1994 | Pastrick et al. |
| 5,402,103 A | 3/1995 | Tashiro |
| 5,406,414 A | 4/1995 | O'Farrell et al. |
| 5,412,512 A | 5/1995 | Zebold et al. |
| 5,424,875 A | 6/1995 | Davis, II |
| 5,432,643 A | 7/1995 | Huang |
| 5,436,741 A | 7/1995 | Crandall |
| 5,437,931 A | 8/1995 | Tsai et al. |
| 5,438,487 A | 8/1995 | Schmid et al. |
| 5,446,576 A | 8/1995 | Lynam et al. |
| 5,448,397 A | 9/1995 | Tonar |
| D363,920 S | 11/1995 | Roberts et al. |
| 5,481,409 A | 1/1996 | Roberts |
| 5,497,305 A | 3/1996 | Pastrick et al. |
| 5,497,306 A | 3/1996 | Pastrick |
| 5,509,606 A | 4/1996 | Breithaupt et al. |
| 5,517,367 A | 5/1996 | Kim et al. |
| 5,523,877 A | 6/1996 | Lynam |
| 5,525,264 A | 6/1996 | Cronin et al. |
| 5,526,195 A | 6/1996 | Thomas |
| 5,528,422 A | 6/1996 | Roberts |
| 5,530,588 A | 6/1996 | Vivier |
| 5,535,056 A | 7/1996 | Caskey et al. |
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,567,360 A | 10/1996 | Varaprasad et al. |
| 5,575,552 A | 11/1996 | Faloon et al. |
| 5,579,133 A | 11/1996 | Black et al. |
| 5,587,236 A | 12/1996 | Agrawal et al. |
| 5,587,699 A | 12/1996 | Faloon et al. |
| 5,594,222 A | 1/1997 | Caldwell |
| 5,594,593 A | 1/1997 | Milner |
| 5,610,756 A | 3/1997 | Lynam et al. |
| 5,619,374 A | 4/1997 | Roberts |
| 5,619,375 A | 4/1997 | Roberts |
| 5,621,569 A | 4/1997 | Schlenke |
| 5,621,577 A | 4/1997 | Lang et al. |
| 5,632,551 A | 5/1997 | Roney et al. |
| 5,644,442 A | 7/1997 | Lemere |
| 5,649,756 A | 7/1997 | Adams et al. |
| 5,659,423 A | 8/1997 | Schierbeek et al. |
| 5,668,663 A | 9/1997 | Varaprasad et al. |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,689,370 A | 11/1997 | Tonar et al. |
| 5,691,855 A | 11/1997 | Lupkas |
| 5,715,093 A | 2/1998 | Schierbeek et al. |
| 5,722,836 A | 3/1998 | Younker |
| 5,724,187 A | 3/1998 | Varaprasad et al. |
| 5,751,489 A | 5/1998 | Caskey et al. |
| D394,833 S | 6/1998 | Muth |
| 5,760,962 A | 6/1998 | Schofield et al. |
| 5,784,211 A | 7/1998 | Mingledorff |
| 5,786,772 A | 7/1998 | Schofield et al. |
| 5,788,357 A | 8/1998 | Muth et al. |
| 5,790,298 A | 8/1998 | Tonar |
| 5,790,327 A | 8/1998 | Lee et al. |
| 5,793,542 A | 8/1998 | Kondo et al. |
| 5,796,094 A | 8/1998 | Schofield et al. |
| 5,796,176 A | 8/1998 | Kramer et al. |
| 5,796,532 A | 8/1998 | Kanazawa |
| 5,798,575 A | 8/1998 | O'Farrell et al. |
| 5,803,579 A | 9/1998 | Turnbull et al. |
| 5,805,367 A | 9/1998 | Kanazawa |
| 5,808,777 A | 9/1998 | Lynam et al. |
| 5,818,625 A | 10/1998 | Forgette et al. |
| 5,823,654 A | 10/1998 | Pastrick et al. |
| 5,825,527 A | 10/1998 | Forgette et al. |
| 5,835,294 A | 11/1998 | Minegishi |
| 5,838,505 A | 11/1998 | Palathingal |
| 5,847,889 A | 12/1998 | Komiyama et al. |
| 5,863,116 A | 1/1999 | Pastrick et al. |
| 5,864,434 A | 1/1999 | Taylor |
| 5,877,897 A | 3/1999 | Schofield et al. |
| 5,879,074 A | 3/1999 | Pastrick |
| D409,540 S | 5/1999 | Muth |
| 5,900,999 A | 5/1999 | Huizenga et al. |
| 5,910,854 A | 6/1999 | Varaprasad et al. |
| 5,922,176 A | 7/1999 | Caskey |
| 5,923,457 A | 7/1999 | Byker et al. |
| 5,929,786 A | 7/1999 | Schofield et al. |
| 5,938,320 A | 8/1999 | Crandall |

(56) References Cited

U.S. PATENT DOCUMENTS

| | | |
|---|---|---|
| 5,959,367 A | 9/1999 | O'Farrell et al. |
| 5,980,050 A | 11/1999 | McCord |
| 5,986,364 A | 11/1999 | Bingle et al. |
| 6,001,486 A | 12/1999 | Varaprasad et al. |
| 6,002,511 A | 12/1999 | Varaprasad et al. |
| 6,002,544 A | 12/1999 | Yatsu |
| 6,005,724 A | 12/1999 | Todd |
| 6,007,207 A | 12/1999 | Liu |
| 6,007,222 A | 12/1999 | Thau |
| 6,030,084 A | 2/2000 | Schmidt |
| 6,032,323 A | 3/2000 | Smith et al. |
| 6,033,078 A | 3/2000 | Su et al. |
| 6,045,243 A | 4/2000 | Muth et al. |
| D425,466 S | 5/2000 | Todd et al. |
| 6,064,508 A | 5/2000 | Forgette et al. |
| 6,065,840 A | 5/2000 | Caskey et al. |
| D426,506 S | 6/2000 | Todd et al. |
| D426,507 S | 6/2000 | Todd et al. |
| D427,128 S | 6/2000 | Mathieu |
| 6,074,068 A | 6/2000 | Palathingal |
| 6,074,077 A | 6/2000 | Pastrick et al. |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,099,155 A | 8/2000 | Pastrick et al. |
| 6,102,546 A | 8/2000 | Carter |
| 6,109,586 A | 8/2000 | Hoek |
| 6,111,683 A | 8/2000 | Cammenga et al. |
| 6,111,684 A | 8/2000 | Forgette et al. |
| 6,116,743 A | 9/2000 | Hoek |
| 6,124,647 A | 9/2000 | Marcus et al. |
| 6,124,886 A | 9/2000 | DeLine et al. |
| 6,132,072 A | 10/2000 | Turnbull et al. |
| 6,142,656 A | 11/2000 | Kurth |
| 6,146,003 A | 11/2000 | Thau |
| 6,149,287 A | 11/2000 | Pastrick et al. |
| 6,152,590 A | 11/2000 | Furst et al. |
| 6,154,306 A | 11/2000 | Varaprasad et al. |
| 6,163,083 A | 12/2000 | Kramer et al. |
| 6,164,564 A | 12/2000 | Franco et al. |
| 6,166,848 A | 12/2000 | Cammenga et al. |
| 6,170,956 B1 | 1/2001 | Rumsey et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,993 B1 | 3/2001 | Mou |
| 6,201,642 B1 | 3/2001 | Bos |
| 6,206,553 B1 | 3/2001 | Boddy et al. |
| 6,207,083 B1 | 3/2001 | Varaprasad et al. |
| 6,213,612 B1 | 4/2001 | Schnell et al. |
| 6,227,689 B1 | 5/2001 | Miller |
| 6,229,226 B1 | 5/2001 | Kramer et al. |
| 6,229,435 B1 | 5/2001 | Knapp et al. |
| 6,239,898 B1 | 5/2001 | Byker et al. |
| 6,243,218 B1 | 6/2001 | Whitehead |
| 6,244,716 B1 | 6/2001 | Steenwyk et al. |
| 6,245,262 B1 | 6/2001 | Varaprasad et al. |
| 6,250,148 B1 | 6/2001 | Lynam |
| 6,257,746 B1 | 7/2001 | Todd et al. |
| 6,260,608 B1 | 7/2001 | Kim |
| 6,264,353 B1 | 7/2001 | Caraher et al. |
| 6,270,225 B1 | 8/2001 | Goolsby |
| 6,276,821 B1 | 8/2001 | Pastrick et al. |
| 6,280,069 B1 | 8/2001 | Pastrick et al. |
| 6,286,965 B1 | 9/2001 | Caskey et al. |
| 6,294,989 B1 | 9/2001 | Schofield et al. |
| 6,296,379 B1 | 10/2001 | Pastrick |
| 6,299,333 B1 | 10/2001 | Pastrick et al. |
| 6,310,611 B1 | 10/2001 | Caldwell |
| 6,310,738 B1 | 10/2001 | Chu |
| 6,313,454 B1 | 11/2001 | Bos et al. |
| 6,315,419 B1 | 11/2001 | Platzer, Jr. |
| 6,318,870 B1 | 11/2001 | Spooner et al. |
| 6,320,282 B1 | 11/2001 | Caldwell |
| 6,329,925 B1 | 12/2001 | Skiver et al. |
| 6,335,548 B1 | 1/2002 | Roberts et al. |
| 6,336,737 B1 | 1/2002 | Thau |
| 6,340,849 B1 | 1/2002 | Kramer et al. |
| 6,340,850 B2 | 1/2002 | O'Farrell et al. |
| 6,341,523 B2 | 1/2002 | Lynam |
| 6,343,402 B1 | 2/2002 | Smith et al. |
| 6,347,880 B1 | 2/2002 | Furst et al. |
| 6,353,392 B1 | 3/2002 | Schofield et al. |
| 6,356,376 B1 | 3/2002 | Tonar et al. |
| 6,359,274 B1 | 3/2002 | Nixon et al. |
| 6,362,548 B1 | 3/2002 | Bingle et al. |
| 6,363,326 B1 | 3/2002 | Scully |
| 6,379,013 B1 | 4/2002 | Bechtel et al. |
| 6,390,632 B1 | 5/2002 | Palathingal |
| 6,396,397 B1 | 5/2002 | Bos et al. |
| 6,398,377 B1 | 6/2002 | Chou |
| 6,402,328 B1 | 6/2002 | Bechtel et al. |
| 6,416,208 B2 | 7/2002 | Pastrick et al. |
| 6,420,036 B1 | 7/2002 | Varaprasad et al. |
| 6,426,485 B1 | 7/2002 | Bulgajewski et al. |
| 6,428,172 B1 | 8/2002 | Hutzel et al. |
| 6,441,943 B1 | 8/2002 | Roberts et al. |
| 6,441,964 B1 | 8/2002 | Chu et al. |
| 6,445,287 B1 | 9/2002 | Schofield et al. |
| 6,447,130 B2 | 9/2002 | Chu |
| 6,449,082 B1 | 9/2002 | Agrawal et al. |
| 6,467,920 B2 | 10/2002 | Schnell et al. |
| 6,471,362 B1 | 10/2002 | Carter et al. |
| 6,472,979 B2 | 10/2002 | Schofield et al. |
| 6,476,358 B1 | 11/2002 | Lang et al. |
| 6,498,620 B2 | 12/2002 | Schofield et al. |
| 6,501,387 B2 | 12/2002 | Skiver et al. |
| 6,504,142 B2 | 1/2003 | Nixon et al. |
| 6,511,192 B1 | 1/2003 | Henion et al. |
| 6,512,624 B2 | 1/2003 | Tonar et al. |
| 6,521,916 B2 | 2/2003 | Roberts et al. |
| 6,522,451 B1 | 2/2003 | Lynam |
| 6,523,976 B1 | 2/2003 | Turnbull et al. |
| 6,537,138 B2 | 3/2003 | Ohmori et al. |
| 6,582,109 B2 | 6/2003 | Miller |
| 6,595,649 B2 | 7/2003 | Hoekstra et al. |
| 6,598,980 B2 | 7/2003 | Marusawa et al. |
| 6,598,982 B2 | 7/2003 | Witt |
| 6,612,708 B2 | 9/2003 | Chu |
| 6,615,438 B1 | 9/2003 | Franco et al. |
| 6,616,314 B2 | 9/2003 | Thau |
| 6,627,918 B2 | 9/2003 | Getz et al. |
| 6,642,851 B2 | 11/2003 | Deline et al. |
| 6,648,477 B2 | 11/2003 | Hutzel et al. |
| 6,650,457 B2 | 11/2003 | Busscher et al. |
| 6,657,767 B2 | 12/2003 | Bonardi et al. |
| 6,669,109 B2 | 12/2003 | Ivanov et al. |
| 6,669,267 B1 | 12/2003 | Lynam et al. |
| 6,685,864 B2 | 2/2004 | Bingle et al. |
| 6,690,268 B2 | 2/2004 | Schofield et al. |
| 6,700,692 B2 | 3/2004 | Tonar et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,731,205 B2 | 5/2004 | Schofield et al. |
| 6,737,629 B2 | 5/2004 | Nixon et al. |
| 6,742,904 B2 | 6/2004 | Bechtel et al. |
| 6,755,544 B2 | 6/2004 | Schnell et al. |
| 6,757,109 B2 | 6/2004 | Bos |
| D493,131 S | 7/2004 | Lawlor et al. |
| D493,394 S | 7/2004 | Lawlor et al. |
| 6,824,281 B2 | 11/2004 | Schofield et al. |

(56) References Cited

U.S. PATENT DOCUMENTS

| | | |
|---|---|---|
| 6,831,268 B2 | 12/2004 | Bechtel et al. |
| 6,832,848 B2 | 12/2004 | Pastrick |
| 6,855,431 B2 | 2/2005 | Varaprasad et al. |
| 6,882,287 B2 | 4/2005 | Schofield |
| 6,902,284 B2 | 6/2005 | Hutzel et al. |
| 6,916,100 B2 | 7/2005 | Pavao |
| 6,919,796 B2 | 7/2005 | Boddy et al. |
| 6,932,483 B2 | 8/2005 | Strumolo et al. |
| 6,979,090 B1 | 12/2005 | Wnuk |
| 7,004,593 B2 | 2/2006 | Weller et al. |
| 7,005,974 B2 | 2/2006 | McMahon et al. |
| 7,038,577 B2 | 5/2006 | Pawlicki et al. |
| 7,073,914 B2 | 7/2006 | Pavao |
| 7,080,914 B1 | 7/2006 | Boddy |
| 7,097,312 B2 | 8/2006 | Platzer, Jr. |
| 7,106,392 B2 | 9/2006 | You |
| 7,126,456 B2 | 10/2006 | Boddy et al. |
| 7,167,294 B2 | 1/2007 | Ynam et al. |
| 7,167,796 B2 | 1/2007 | Taylor et al. |
| 7,168,830 B2 | 1/2007 | Pastrick et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,267,448 B2 | 9/2007 | Schmidt et al. |
| 7,274,501 B2 | 9/2007 | McCabe et al. |
| 7,289,037 B2 | 10/2007 | Uken et al. |
| 7,293,901 B2 | 11/2007 | Tuttle et al. |
| 7,306,355 B2 | 12/2007 | Walser et al. |
| 7,324,261 B2 | 1/2008 | Tonar et al. |
| 7,334,922 B2 | 2/2008 | Bonardi et al. |
| 7,338,177 B2 | 3/2008 | Lynam |
| 7,339,149 B1 | 3/2008 | Schofield et al. |
| 7,342,707 B2 | 3/2008 | Roberts et al. |
| 7,345,680 B2 | 3/2008 | David |
| 7,349,143 B2 | 3/2008 | Tonar et al. |
| 7,370,983 B2 | 5/2008 | DeWind et al. |
| 7,372,611 B2 | 5/2008 | Tonar et al. |
| 7,377,675 B2 | 5/2008 | Pastrick et al. |
| 7,391,563 B2 | 6/2008 | McCabe et al. |
| 7,400,435 B2 | 7/2008 | Byers et al. |
| 7,420,756 B2 | 9/2008 | Lynam |
| 7,423,522 B2 | 9/2008 | O'Brien et al. |
| 7,492,281 B2 | 2/2009 | Lynam et al. |
| 7,517,099 B2 | 4/2009 | Hannah |
| 7,526,103 B2 | 4/2009 | Schofield et al. |
| 7,581,859 B2 | 9/2009 | Lynam |
| 7,626,749 B2 | 12/2009 | Baur et al. |
| 7,636,188 B2 | 12/2009 | Baur et al. |
| 7,674,025 B2 | 3/2010 | Liesener |
| 7,748,856 B2 | 7/2010 | Zhao |
| 7,760,111 B2 | 7/2010 | Lynam et al. |
| 7,824,045 B2 | 11/2010 | Zhao |
| 7,880,596 B2 | 2/2011 | Lynam et al. |
| 7,887,204 B2 | 2/2011 | Zhao |
| 7,934,844 B1 | 5/2011 | Zhao |
| 7,944,371 B2 | 5/2011 | Foote et al. |
| 8,058,977 B2 | 11/2011 | Lynam |
| 8,102,279 B2 | 1/2012 | Foote et al. |
| 8,164,482 B2 | 4/2012 | Lynam et al. |
| 8,242,896 B2 | 8/2012 | Lynam |
| 8,287,164 B2 | 10/2012 | Fehn et al. |
| 8,466,779 B2 | 6/2013 | Lynam |
| 8,466,780 B2 | 6/2013 | Lynam et al. |
| 9,013,288 B2 | 4/2015 | Foote et al. |
| 9,035,754 B2 | 5/2015 | Lynam |
| 9,302,624 B2 | 4/2016 | Lynam |
| 10,589,686 B2 | 3/2020 | Lynam |
| 11,242,009 B2 | 2/2022 | Lynam |
| 11,498,487 B2 | 11/2022 | Lynam |
| 2002/0003571 A1 | 1/2002 | Schofield et al. |
| 2002/0036828 A1 | 3/2002 | Wong |
| 2002/0105741 A1 | 8/2002 | Platzer |
| 2002/0159169 A1 | 10/2002 | McCord |
| 2002/0159270 A1 | 10/2002 | Fynam et al. |
| 2003/0002179 A1 | 1/2003 | Roberts et al. |
| 2003/0043589 A1 | 3/2003 | Blank |
| 2003/0117731 A1 | 6/2003 | Platzer |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0165291 A1 | 8/2004 | Platzer |
| 2004/0264011 A1 | 12/2004 | Lynam |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2005/0232469 A1 | 10/2005 | Schofield et al. |
| 2005/0248859 A1 | 11/2005 | Platzer |
| 2006/0050018 A1 | 3/2006 | Hutzel et al. |
| 2006/0056086 A1 | 3/2006 | Hannah |
| 2006/0061008 A1 | 3/2006 | Karner et al. |
| 2006/0125919 A1 | 6/2006 | Camilleri et al. |
| 2006/0126150 A1 | 6/2006 | Tonar et al. |
| 2006/0171704 A1 | 8/2006 | Bingle et al. |
| 2006/0181772 A1 | 8/2006 | Byers et al. |
| 2006/0184297 A1 | 8/2006 | Higgins-Luthman |
| 2006/0268440 A1 | 11/2006 | Platzer |
| 2007/0058257 A1 | 3/2007 | Lynam |
| 2007/0285789 A1 | 12/2007 | Lindahl et al. |
| 2008/0212189 A1 | 9/2008 | Baur et al. |
| 2008/0225421 A1 | 9/2008 | Platzer |
| 2008/0304170 A1 | 12/2008 | Zhao |
| 2009/0040306 A1 | 2/2009 | Foote et al. |
| 2009/0115631 A1 | 5/2009 | Foote et al. |
| 2009/0237820 A1 | 9/2009 | McCabe et al. |
| 2010/0026475 A1 | 2/2010 | Hwang |
| 2010/0039691 A1 | 2/2010 | Thomas et al. |
| 2010/0321757 A1 | 12/2010 | Cammenga et al. |
| 2011/0260845 A1 | 10/2011 | Henion et al. |
| 2013/0027952 A1* | 1/2013 | Lynam .................. B60R 1/1207 362/494 |

FOREIGN PATENT DOCUMENTS

| | | |
|---|---|---|
| DE | 3743072 A1 | 7/1989 |
| DE | 4026578 A1 | 4/1992 |
| DE | 10054315 A1 | 5/2002 |
| EP | 0210757 A2 | 2/1987 |
| EP | 0310261 A1 | 4/1989 |
| EP | 0356099 A2 | 2/1990 |
| EP | 0443185 A2 | 8/1991 |
| EP | 0551802 A1 | 7/1993 |
| EP | 0728618 A2 | 8/1996 |
| EP | 0729864 A1 | 9/1996 |
| EP | 0791503 A2 | 8/1997 |
| EP | 0917987 A1 | 5/1999 |
| FR | 2551005 | 3/1985 |
| FR | 2628042 A1 | 9/1989 |
| GB | 1172382 A | 11/1969 |
| GB | 2161440 A | 1/1986 |
| JP | 362075619 | 4/1987 |
| JP | 62105103 | 5/1987 |
| JP | 1186443 | 7/1989 |
| JP | 1208245 | 8/1989 |
| JP | 491539 | 8/1992 |
| JP | 08268188 | 10/1996 |
| JP | 0681836 | 3/1997 |
| JP | 10086899 | 4/1998 |
| KR | 2002092059 | 12/2002 |
| WO | 1995030495 | 11/1995 |
| WO | 2001081956 A1 | 11/2001 |
| WO | 2004026633 A2 | 4/2004 |
| WO | 2004047421 A2 | 6/2004 |
| WO | 2004103772 A2 | 12/2004 |
| WO | 2005086777 A2 | 9/2005 |
| WO | 2006017019 A1 | 2/2006 |
| WO | 2006124682 A2 | 11/2006 |
| WO | 2007005942 A2 | 1/2007 |
| WO | 2008051910 A2 | 5/2008 |

* cited by examiner

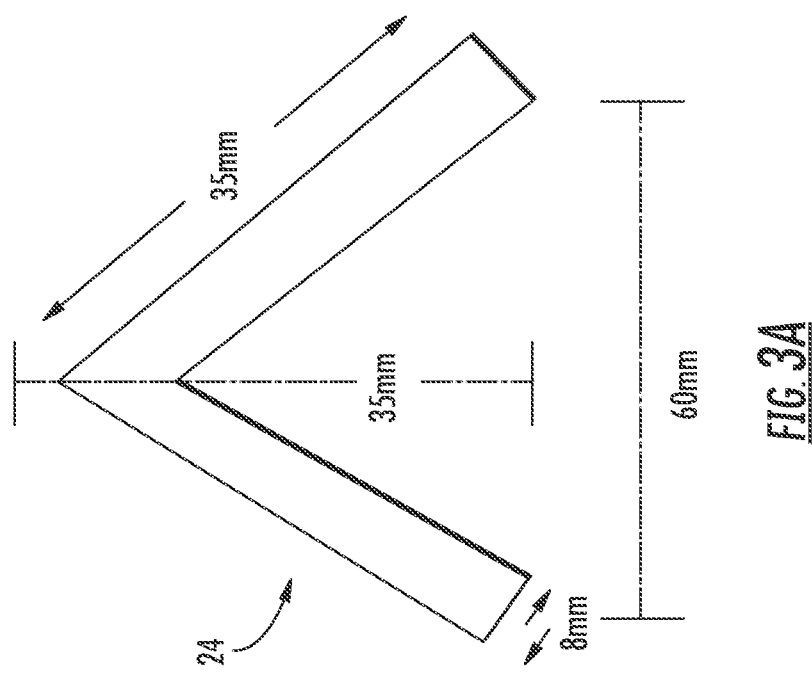
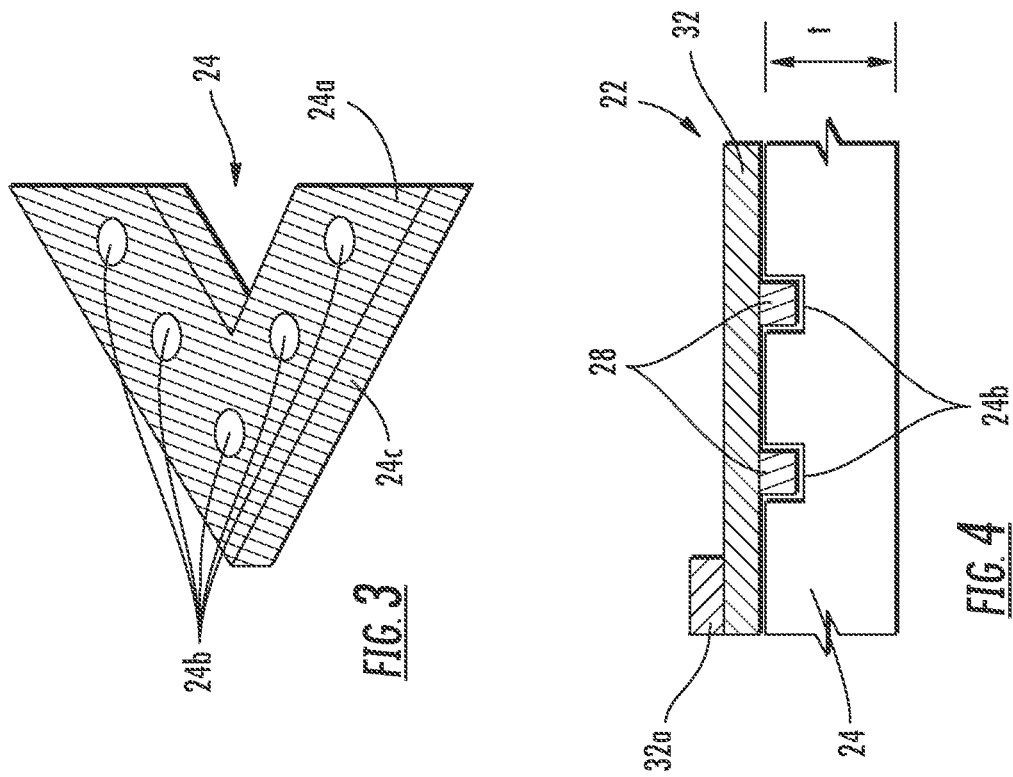

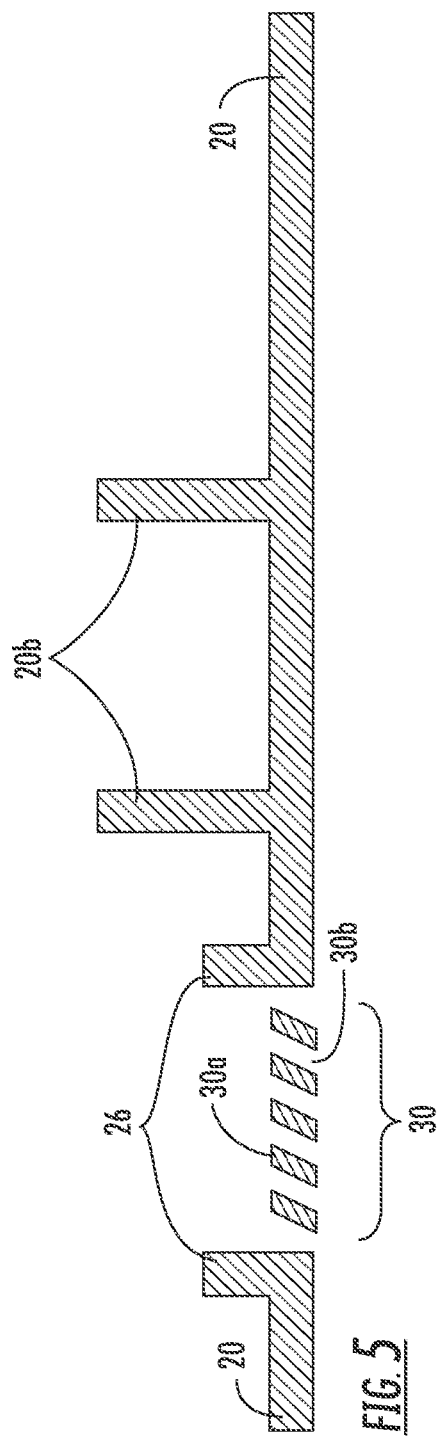
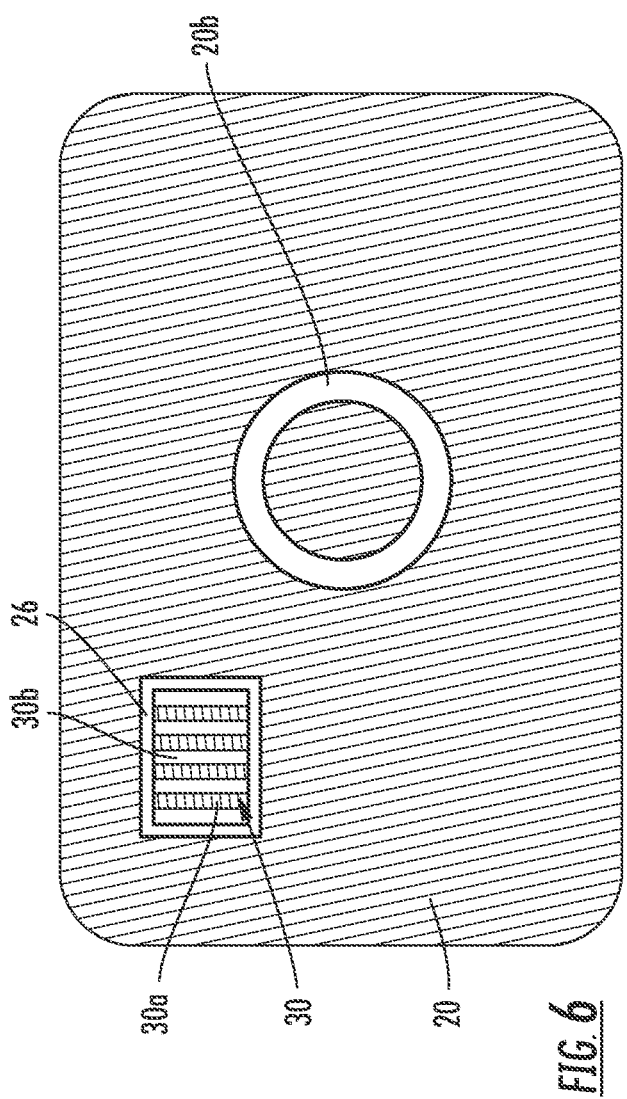

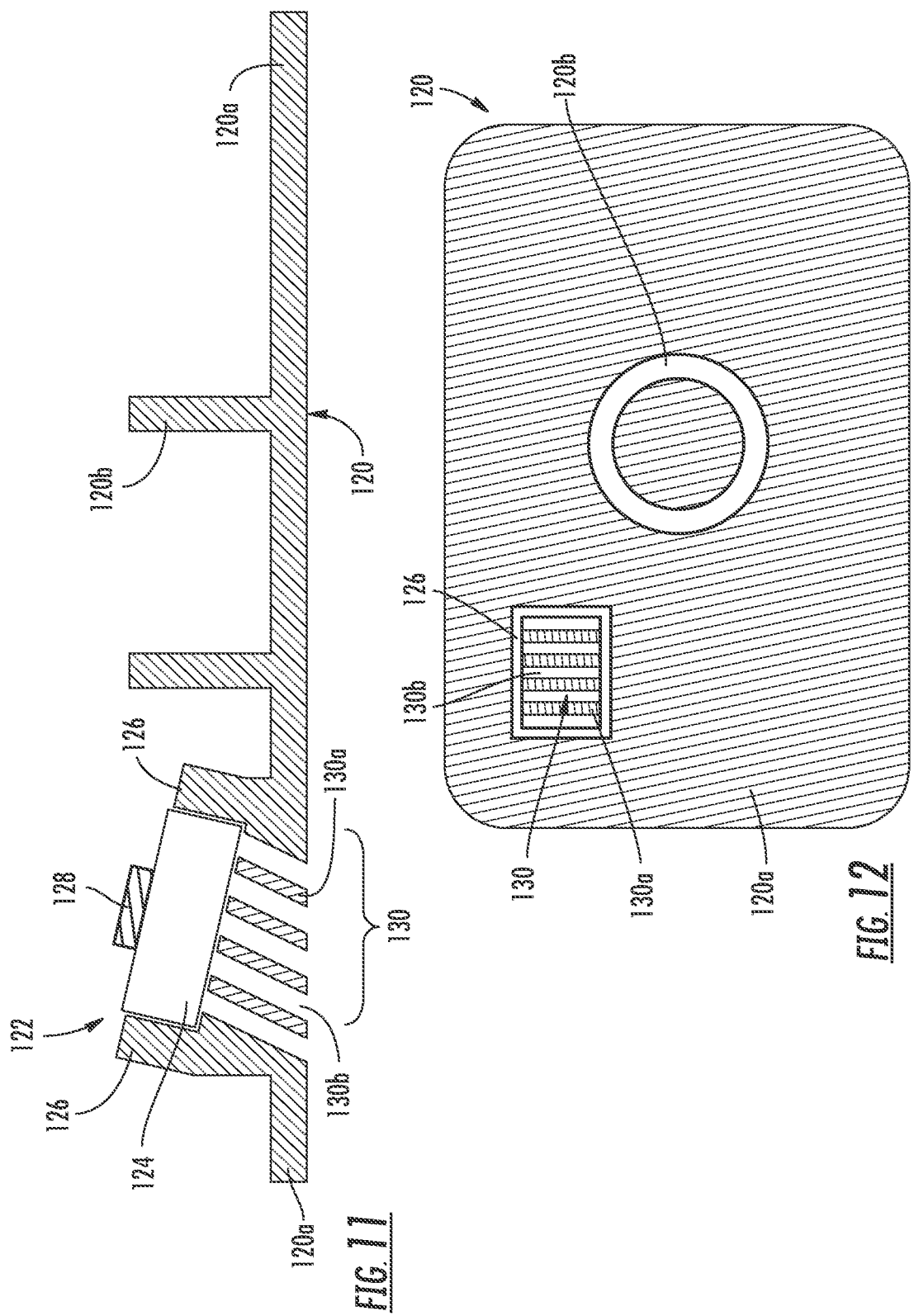

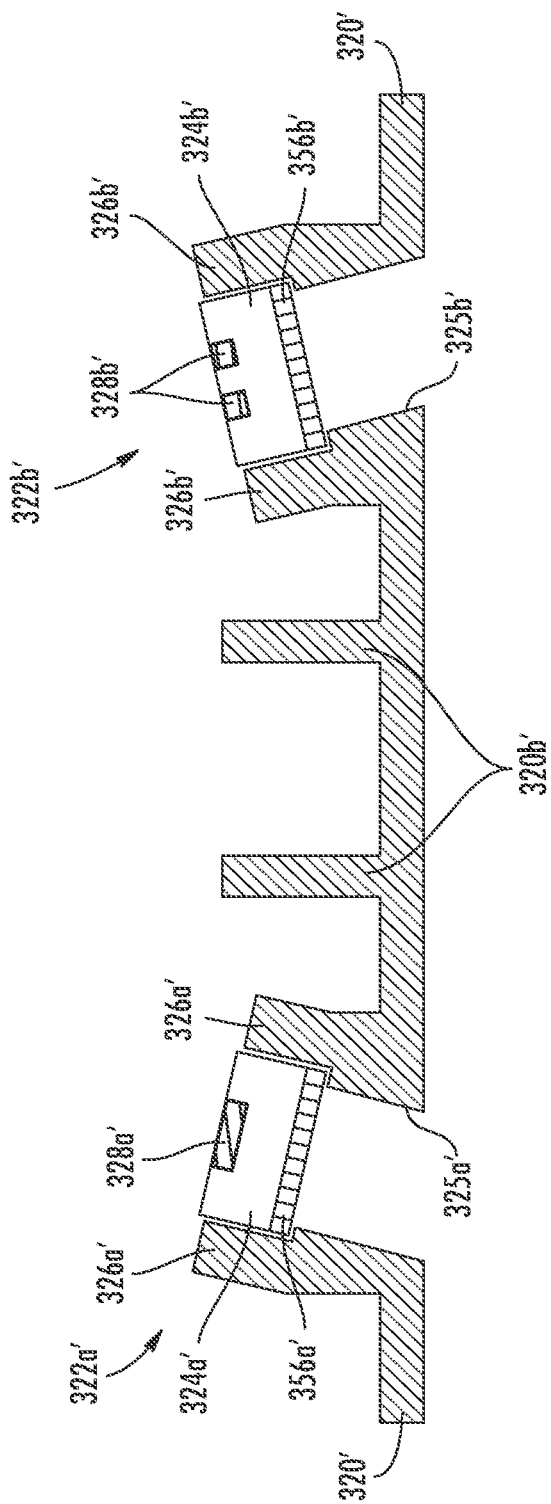

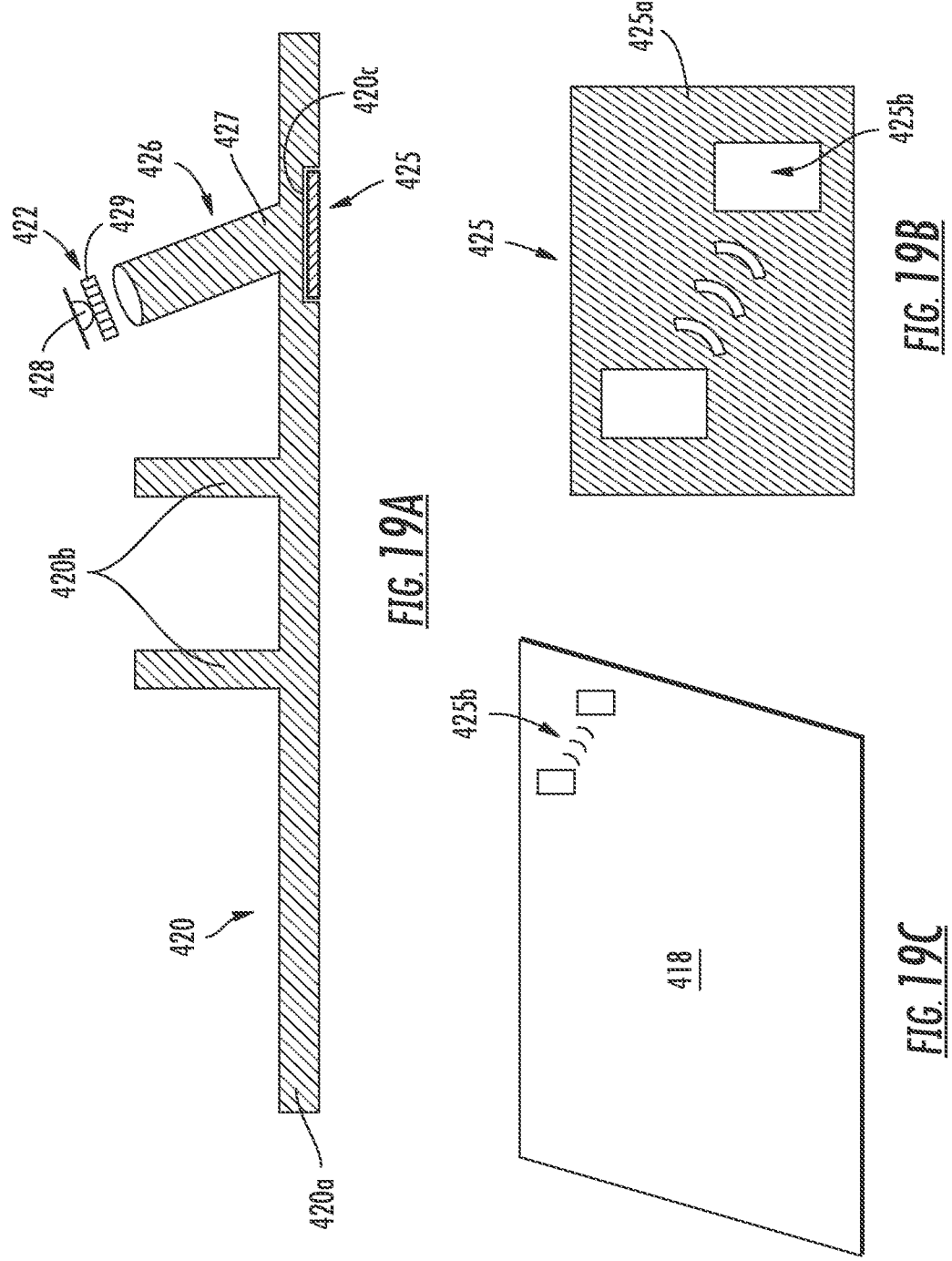

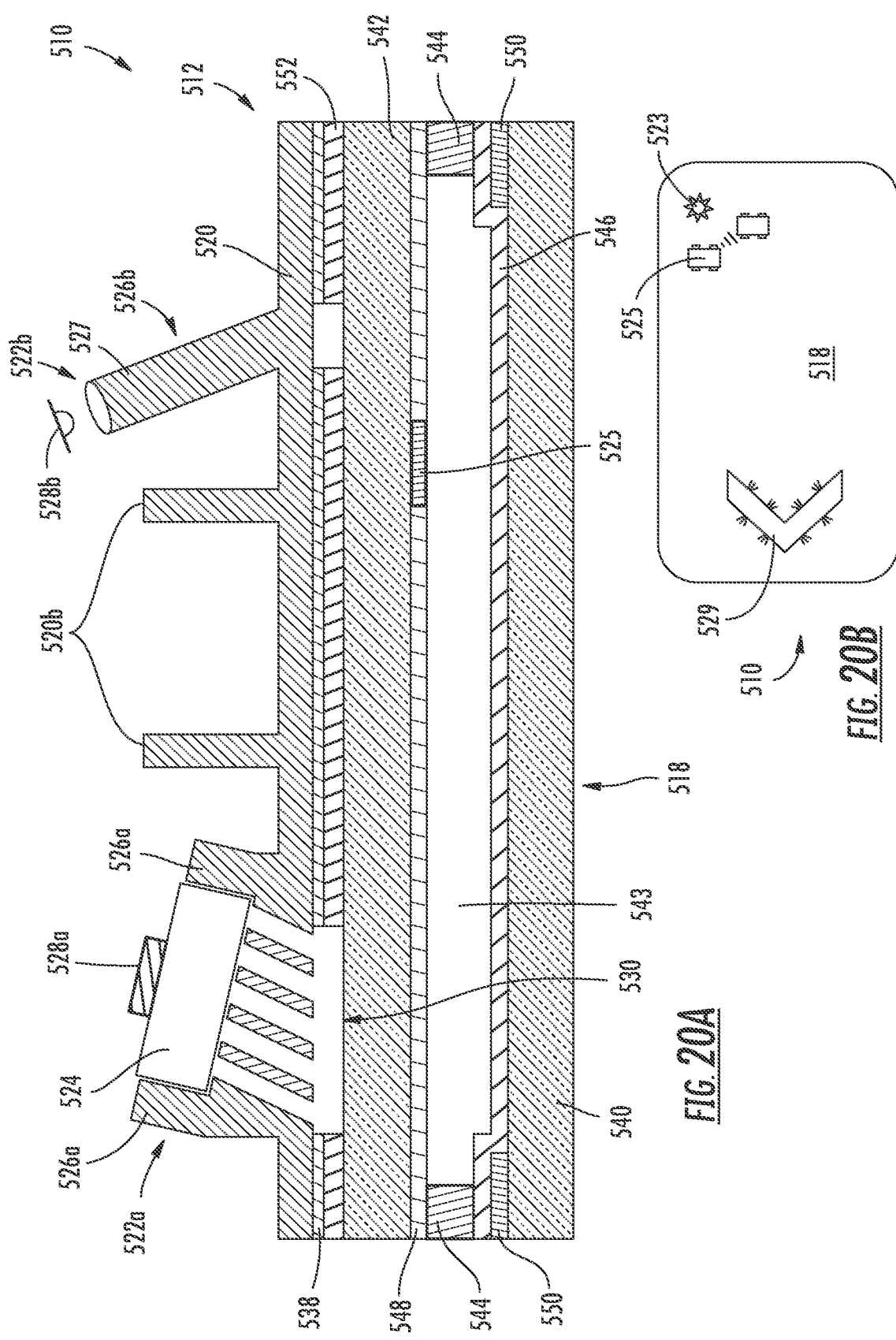

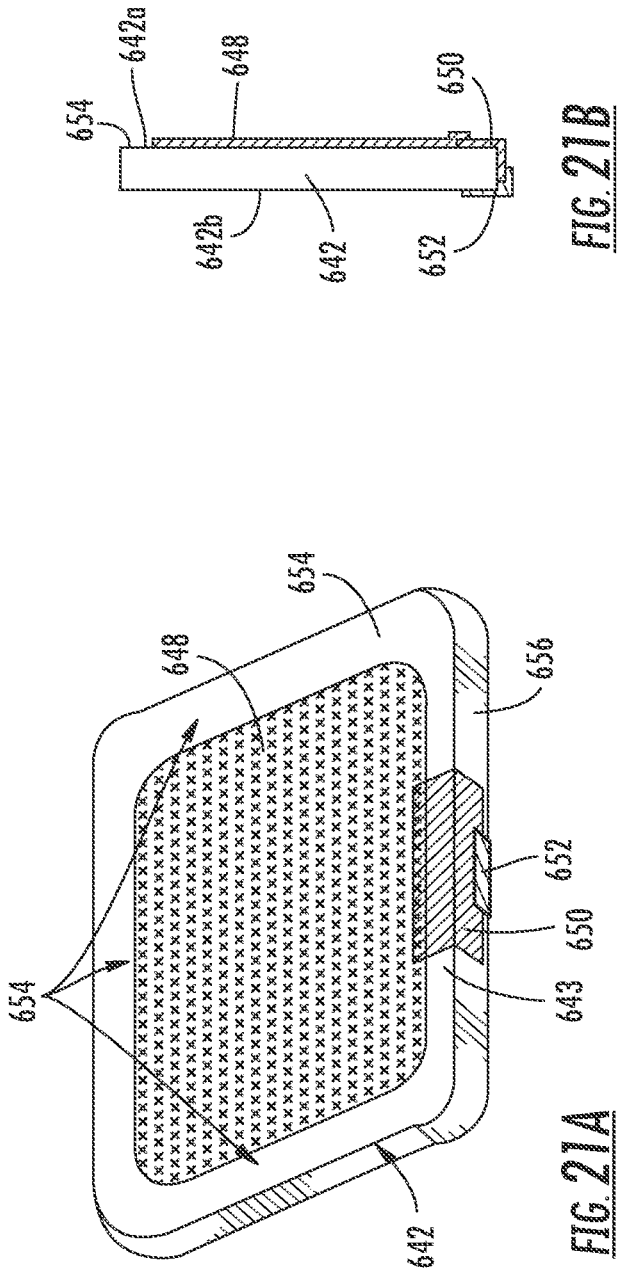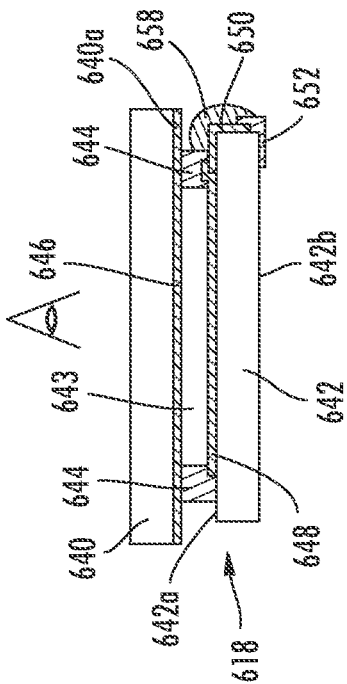

VEHICULAR EXTERIOR REARVIEW MIRROR ASSEMBLY WITH BLIND SPOT INDICATOR

CROSS REFERENCE TO RELATED APPLICATIONS

The present application is a continuation of U.S. patent application Ser. No. 17/649,808, filed Feb. 3, 2022, now U.S. Pat. No. 11,498,487, which is a continuation of U.S. patent application Ser. No. 16/819,693, filed Mar. 16, 2020, now U.S. Pat. No. 11,242,009, which is a continuation of U.S. patent application Ser. No. 15/083,895, filed Mar. 29, 2016, now U.S. Pat. No. 10,589,686, which is a continuation of U.S. patent application Ser. No. 14/714,762, filed May 18, 2015, now U.S. Pat. No. 9,302,624, which is a continuation of U.S. patent application Ser. No. 13/919,489, filed Jun. 17, 2013, now U.S. Pat. No. 9,035,754, which is a continuation of U.S. patent application Ser. No. 13/572,045, filed Aug. 10, 2012, now U.S. Pat. No. 8,466,779, which is a continuation of U.S. patent application Ser. No. 13/290,644, filed Nov. 7, 2011, now U.S. Pat. No. 8,242,896, which is a continuation of U.S. patent application Ser. No. 12/446,507, filed Apr. 21, 2009, now U.S. Pat. No. 8,058,977, which is a 371 national phase application of PCT Application No. PCT/US07/82099, filed Oct. 22, 2007, which claims benefit of U.S. provisional applications, Ser. No. Ser. No. 60/970,687, filed Sep. 7, 2007, Ser. No. 60/918,089, filed Mar. 15, 2007, and 60/853,850, filed Oct. 24, 2006, which are hereby incorporated herein by reference in their entireties. And U.S. patent application Ser. No. 13/919,489 is a continuation-in-part of U.S. patent application Ser. No. 13/452,121, filed Apr. 20, 2012, now U.S. Pat. No. 8,466,780, which is a continuation of U.S. patent application Ser. No. 13/017,346, filed Jan. 31, 2011, now U.S. Pat. No. 8,164,482, which is a continuation of U.S. patent application Ser. No. 12/794,111, filed Jun. 4, 2010, now U.S. Pat. No. 7,880,596, which is a continuation of U.S. patent application Ser. No. 12/370,050, filed Feb. 12, 2009, now U.S. Pat. No. 7,760,111, which is a continuation of U.S. patent application Ser. No. 11/994,471, filed Jan. 2, 2008, now U.S. Pat. No. 7,492,281, which is a 371 national phase application of PCT Application No. PCT/US2006/026148, filed Jul. 5, 2006, which claims benefit of U.S. provisional applications, Ser. No. 60/696,953, filed Jul. 6, 2005, and Ser. No. 60/784,570, filed Mar. 22, 2006. And U.S. patent application Ser. No. 14/714,762 is a continuation-in-part of U.S. patent application Ser. No. 14/486,133, filed Sep. 15, 2014, now U.S. Pat. No. 9,045,091, which is a continuation of U.S. patent application Ser. No. 13/646,960, filed Oct. 8, 2012, now U.S. Pat. No. 8,833,987, which is a continuation of U.S. patent application Ser. No. 13/335,135, filed Dec. 22, 2011, now U.S. Pat. No. 8,282,253, which is a continuation of U.S. patent application Ser. No. 12/550,054, filed Aug. 28, 2009, now U.S. Pat. No. 8,083,386, which is a continuation of U.S. patent application Ser. No. 11/520,193, filed Sep. 13, 2006, now U.S. Pat. No. 7,581,859, which claims the benefit of U.S. provisional application Ser. No. 60/717,093, filed Sep. 14, 2005.

FIELD OF THE INVENTION

The present invention relates to exterior rearview mirror assemblies and, more particularly, to an exterior rearview mirror assembly having a blind spot/object detection indicator and/or a lane change aid (LCA) indicator and/or a turn signal or other indicator at the exterior rearview mirror assembly.

BACKGROUND OF THE INVENTION

It is known to provide an object in a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such an object in a blind spot detection/LCA system often includes a visual indicator that visually indicates the detection of another vehicle or object to the driver of the host vehicle. It is also know to provide a turn signal indicator that is activated when a turn signal is activated by the driver of the host vehicle so as to provide an indication of the vehicle turning or changing lanes to the driver of a vehicle in an adjacent lane to the host or subject vehicle or to another person external to the host or subject vehicle. The visual indicator or indicators (commonly a light emitting diode or the like) of such systems is/are often located at the mirror reflective element of the exterior rearview mirror assembly.

The object/LCA visual indicator or indicators indicate or alert the driver of the host vehicle of the presence or impending presence of another vehicle or object in a blind spot in an adjacent side lane that typically cannot be readily seen within the field of view of the exterior mirror reflective element of the exterior mirror assembly mounted at that side of the vehicle and/or cannot be readily seen by the driver's peripheral vision or the like. The object/LCA visual indicators typically are arranged to be viewable principally or solely by the driver of the host vehicle and not by drivers of other vehicles. Similarly, the turn signal visual indicator or indicators indicate or alert a person external of the host vehicle (such as the driver of another vehicle alongside or approaching the host vehicle) that the turn signal of the host vehicle is activated to indicate that the driver of the host vehicle is contemplating or commencing a turn or lane change or the like. It is desirable that such turn signal visual indicators are not readily viewable by the driver of the host vehicle when they are activated. Because of vehicle regulations and mirror and vehicle configurations and geometries, and because of the need to provide an uninterrupted reflective surface to satisfy the likes of the FMVSS 111 field of view regulation, blind spot/LCA indicators in the prior art are typically located towards or at the outboard edge, and typically towards or at the upper corner/quadrant, of the reflective mirror element of the exterior mirror assembly.

Somewhat costly and complicated indicator constructions have been contemplated that, when placed behind and supported by the mirror reflective element, attempt to have their projected beam of emitted light directed principally to be viewed by the driver of the host vehicle (or other persons external to the host vehicle for turn signal applications) through the mirror reflective element and shielded from view by other drivers in blind spot alert detection systems (or from the driver of the host vehicle for turn signal applications). In some applications, the mirror reflective element may have a transflective reflector coating or may have a window or port formed in a non-transflective reflector coating. For example, transflective mirror coatings (such as, for example, those described in U.S. Pat. Nos. 3,280,701; 6,855,431; 5,724,187; 5,340,503; 6,286,965; 6,196,688; 6,045,023; 5,788,357; 5,535,056; 5,751,489 and 6,065,840, which are hereby incorporated herein by reference in their entireties) may be used, or alternately, a transmissive window or port may be formed in the reflective coating or coatings of the mirror reflective element (such as, for example, those described in U.S. Pat. Nos. 6,005,724; 6,257, 746; 6,111,683, 5,786,772, 5,313,335 and 5,285,060, which are hereby incorporated herein by reference in their entireties). An illumination source or indicator may be positioned so as to direct or emit illumination through the window or display area and toward the driver of the host vehicle so as to be viewable by the driver of the host vehicle (or outwardly away from the vehicle so as to be generally not viewable by the driver of the host vehicle for turn signal applications).

Such a mirror assembly and indicator often include a baffle or other light directing element and an illumination source positioned at the rear of the mirror reflective element (and generally at the transmissive window or port if applicable). The baffle shields from view by an observer or the light directing element directs the light or illumination from the illumination source toward the desired or appropriate viewer (such as the driver of the host vehicle for blind spot/LCA applications or the driver of another vehicle for turn signal applications) and away from others (such as away from other drivers for blind spot/LCA applications or away from the driver of the host vehicle for turn signal applications).

Typically, such baffles or other light directing elements are adhered to the rear surface of the mirror reflective element. In some applications, the illumination source may be provided as a module to the mirror assembly facility and adhered to the rear of the mirror reflective element as a unit or module (for instance, light from LEDs facing and emitting light in the direction away from the mirror element may be reflected back towards the mirror reflector, and hence through the mirror element, using suitably angled or disposed mirrored surfaces). After the baffle or module is attached to the reflective element, the back plate of the mirror assembly may be adhered to the mirror reflective element to complete the mirror reflector sub assembly that is then assembled with the actuator and casing and other components to form the complete mirror assembly for mounting to the side of the vehicle.

A variety of interior and exterior mirror assemblies with indicators are known in the art, such as U.S. Pat. Nos. 5,355,284; 5,788,357; 6,257,746; 6,005,724; 5,481,409; 6,111,683; 6,045,243; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741, 5,587,699; 5,938,320; 6,700,692 and 5,786,772, and Canadian Pat. No. CA 1,063,695, and Great Britain Patent Specification 1,172,382 and Pat. Abstracts of Japan Publication No. 0917573, published Jul. 8, 1997, and PCT Publication WO 95/30495, published Nov. 16 1995, which are all hereby incorporated herein by reference in their entireties.

Therefore, there is a need in the art for an improved object in a blind spot/LCA indicator that is readily viewable by a driver of the host vehicle and not visible or viewable by a driver of another vehicle and/or an improved turn signal indicator that is readily viewable by the driver of another vehicle and not visible or viewable by the driver of the host vehicle.

SUMMARY OF THE INVENTION

The present invention provides an object in a blind spot indicator or lane change assist (LCA) indicator or turn signal indicator or other indicator that is integral with the mirror reflector carrier or back plate of the mirror reflector sub-assembly so as to be positioned at and attached to the mirror reflective element as the back plate is adhered or otherwise attached at the back of the mirror reflective element. Preferably, the signal indicator is provided as a sealed or substantially sealed unit or module that can be snapped into or otherwise attached or secured (preferably mechanically but optionally adhesively) at the mirror back plate (and does so substantially or wholly sealingly to limit or substantially preclude water ingress to the module so that the module and back plate are substantially water impervious), preferably at the mirror sub-assembly manufacturing operation when the mirror reflective element (and any associated heater or other item or element) is joined to the mirror back plate, such as by utilizing aspects of the indicators described in U.S. patent application Ser. No. 11/520,193, filed Sep. 13, 2006, now U.S. Pat. No. 7,581,859, and/or PCT Application No. PCT/US2006/018567, filed May 16, 2006 and published Nov. 23, 2006 as International Publication No. WO 2006/124682, which are hereby incorporated herein by reference in their entireties. The present invention thus provides a mirror reflector carrier or back plate with an integrated blind spot indicator/indicators and/or turn signal indicator/indicators and/or other indicator/indicators.

According to an aspect of the present invention, an exterior rearview mirror assembly for a vehicle includes a mirror reflective element, a back plate and an indicator or display device. The back plate is molded or formed with a baffle having a plurality of light baffle elements that define a plurality of slots through the back plate. The back plate is attached to the rear surface of the reflective element (the surface opposite the front surface, with the front surface facing generally rearward and toward the driver of the vehicle when the mirror assembly is mounted to the vehicle) and includes an indicator mount or mounting portion for mounting the indicator at the back plate and generally at the light baffle. The indicator mounting portion extends rearward away from the reflective element and may be integrally formed with the back plate, preferably by injection molding. The indicator mounting portion is formed to receive a transparent or translucent block or glow element, and one or more light sources are disposed at the block, such that light emitted by the light source or sources is transmitted through the block and through the slots at the light baffles and through the reflective element for viewing by a person viewing the reflective element at an angle that generally corresponds to the angle established by the light baffles and/or the indicator mounting portion, while shielding or shading the light from viewing by a person viewing the reflective angle at another angle that does not generally correspond to the angle established by the light baffles and/or indicator mounting portion.

The indicator thus is mounted at the indicator mounting portion and is activatable so that illumination from the indicator is directed through the slots at the light baffles and is thus viewable through the reflective element by a person viewing the mirror reflective element at a desired or generally corresponding angle. The angle of the light direction may be established by an angle of the light baffles of the back plate and/or an angle of the transparent or translucent block established by the block itself and/or the indicator mounting portion of the back plate.

The mirror back plate, including the light baffles and/or the indicator mounting portion or display receiving portion, may be configured to orient the block or display element at a predetermined angle so that light exiting the block when the light source is activated is directed one of (a) generally away from the vehicle when the mirror assembly is mounted to the vehicle so as to be principally viewed by drivers of other vehicles and so as to be substantially not viewed by the driver of the host vehicle, and (b) generally toward the driver of the vehicle when the mirror assembly is mounted to the vehicle so as to be principally viewed by the driver of the host vehicle and so as to be substantially not viewed by drivers of other vehicles.

Optionally, the display element is associated with a blind spot detection system of the vehicle. Optionally, the display element is associated with a turn signal of the vehicle. Optionally, the display element may comprise first and second display elements, with a first display element being associated with a turn signal of the vehicle and a second display element being associated with a blind spot detection system of the vehicle.

For applications of a turn signal indicator, the baffle protects or shields the driver from seeing the light or illumination from the illumination source by shading or direct line of sight occlusion (like a Venetian blind). The baffle thus allows illumination to be viewed by a targeted viewer (such as the driver of the host vehicle for blind spot/LCA applications or the driver of another vehicle for turn signal applications) and limits viewability (or provides direct line of sight occlusion) by others (such as away from other drivers for blind spot/LCA applications or away from the driver of the host vehicle for turn signal applications).

The back plate may comprise a plastic molding, such as a plastic molding formed by injection molding or co-injection molding or the like. The back plate may be formed with an attaching portion, such as a raised annular ring or annular prongs or annular snaps or the like at its rear surface (opposite from the mounting face or surface that attaches to the mirror reflective element) for attaching the back plate to a mirror actuator (for manually or electrically adjusting an angle of the mirror reflective element relative to the mirror casing).

Therefore, the present invention provides a display device or indicator at the back plate of a mirror reflector sub-assembly. The mirror reflector sub-assembly thus may achieve enhanced assembly processes, and may be supplied or provided to a mirror manufacturer or assembler as a unit that includes the indicator mounting portion (and that may also include the indicator) and display. The integrally formed back plate and indicator mount or mounting portion and light baffles may be readily attached to the mirror reflective element, and the indicator may be readily plugged into or connected to or received in the indicator mount to assemble the mirror reflector sub-assembly. The back plate may include one or more indicator mounts or mounting portions and associated light baffles for providing one or more displays at the reflective element, such as a blind spot/LCA display and/or a turn signal display and/or the like.

These and other objects, advantages, purposes and features of the present invention will become apparent upon review of the following specification in conjunction with the drawings.

BRIEF DESCRIPTION OF THE DRAWINGS

FIG. 3 is a perspective view of a display element or block suitable for use with the indicator element of the present invention;

FIG. 3A is a plan view of a display element or block of the present invention;

FIG. 4 is a partial sectional view of the block and a circuit element at a rear surface of the block in accordance with the present invention;

FIG. 5 is a sectional view of the back plate of the mirror reflector sub-assembly of FIG. 2;

FIG. 6 is a plan view of the back plate of FIG. 5;

FIG. 11 is a sectional view of another back plate of the present invention, having an angled attachment element for receiving an indicator element thereat;

FIG. 12 is a plan view of the back plate of FIG. 11;

FIG. 18 is a sectional view of another back plate and indicator modules in accordance with the present invention;

FIG. 19A is a sectional view of another back plate and indicator module in accordance with the present invention;

FIG. 19B is a plan view of an indicator stencil or mask for use with the back plate and indicator module of FIG. 19A;

FIG. 19C is a plan view of a mirror reflective element having the back plate and indicator module and indicator mask of FIGS. 19A and 19B;

FIG. 20A is a sectional view of another mirror reflector sub-assembly having a back plate and indicator modules in accordance with the present invention;

FIG. 20B is a plan view of the mirror reflector subassembly of FIG. 20A;

FIG. 21A is a perspective view of a rear substrate coated with a metallic reflector in accordance with the present invention;

FIG. 21B is a side elevation of the coated rear substrate of FIG. 21A;

FIG. 22 is a sectional view of a mirror reflective element assembly incorporating the coated rear substrate of FIGS. 21A and 21B;

DESCRIPTION OF THE PREFERRED EMBODIMENTS

Figure 1:
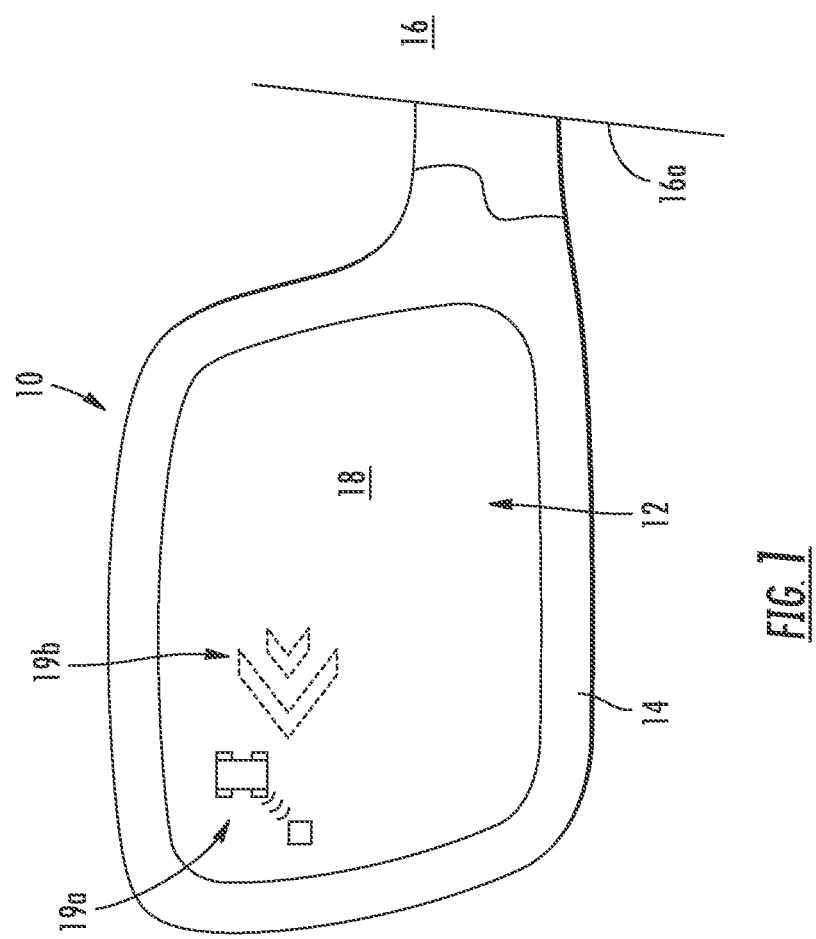
FIG. 1 is a view of an exterior mirror assembly with a display device or indicator in accordance with the present invention, shown as viewed in the direction of travel of the vehicle.
Figure 2:
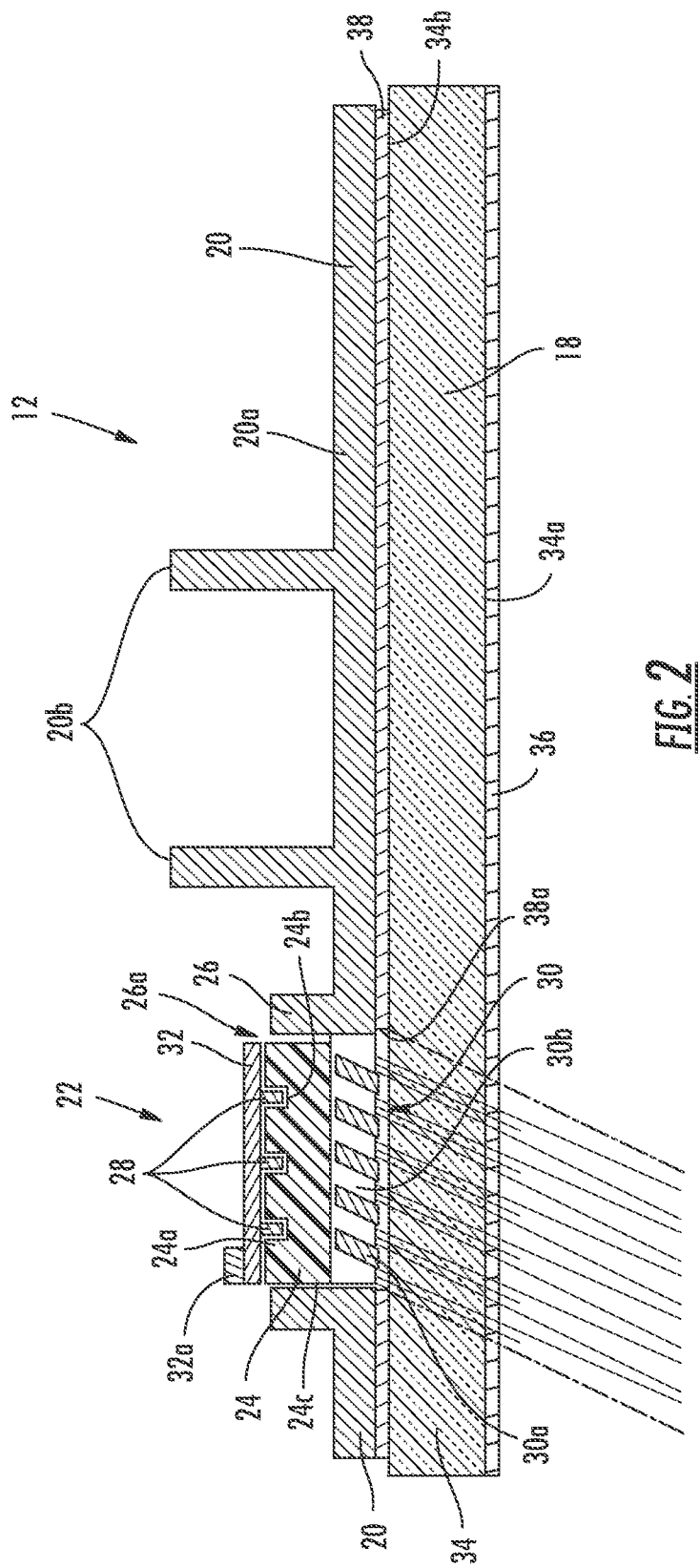
FIG. 2 is a sectional view of a mirror reflector sub-assembly having a back plate and indicator element in accordance with the present invention.

Referring now to the drawings and the illustrative embodiments depicted therein, an exterior rearview mirror assembly 10 for a vehicle includes a mirror reflector sub-assembly 12 and a mirror shell or casing 14 (FIG. 1). Mirror assembly 10 is mounted at the side 16a of a host or subject vehicle 16. As shown in FIG. 2, mirror reflector sub-assembly 12 includes a mirror reflective element 18 and a mirror reflector carrier or back plate 20 attached to or mounted to or adhered to a rear surface 18a of mirror reflective element 18. Mirror assembly 10 includes an indicator or display element or device or signal indication module 22 that is disposed at back plate 20 and behind reflective element 18, and that is operable to provide a display or indication at the reflective element for viewing the display or indication through the mirror reflective element. Signal indication module 22 includes a transparent or translucent polymeric block or element or indicating light source or element 24 (that is received into or attached to an indicator receiving portion or mounting portion or structure 26 of back plate so as to be disposed generally at a rear surface 20a of back plate 20) and an illumination source or indicator 28, such as one or more light emitting diodes (LEDs) or other suitable illumination source. Signal indication module 22 is attached to or mounted to or received in or at the indicator mounting portion 26 of back plate 20 so as to be disposed generally at and behind a light baffle 30 (FIGS. 2, 5 and 6) integrally formed with back plate 20. In the illustrated embodiment of FIGS. 2-6, the mirror assembly includes a signal indication module 22 for an object detection in a blind spot detection system or LCA system, as discussed below, but could also or otherwise include a display device for a turn signal indicator or signal indication module or other indicator device (as also discussed below). The indicator element or signal indication module thus may be readily mounted to or attached to a unitary back plate (including an indicator mounting portion), such as by utilizing aspects of the indicators described in U.S. patent applications, Ser. No. 11/520,193, filed Sep. 13, 2006, now U.S. Pat. No. 7,581,859; and/or Ser. No. 11/226,628, filed Sep. 14, 2005 and published Mar. 23, 2006 as U.S. Publication No. US-2006-0061008, and/or PCT Application No. PCT/US2006/018567, filed May 16, 2006 and published Nov. 23, 2006 as International Publication No. WO 2006/124682, which are hereby incorporated herein by reference in their entireties.

Optionally, the mirror assembly may include multiple display elements or devices or signal indication modules (such as two or more display elements or devices or signal indication modules) for providing both an object in a blind spot/LCA indicator and display area 19a and a turn signal indicator and display area 19b, such as shown in FIG. 1. The two or more signal indication modules may be incorporated together into a single unitary display module or unit (and thus with a common connector incorporated in the single unitary module and servicing, for example, a commonly housed turn signal indicator element and blind spot indicator element), or the two or more signal indication modules may be separate display devices (for example, a LCA blind spot indicator unitary module may be disposed at a bottom/lower inward portion of the mirror sub-assembly and a separate turn signal indicator unitary module may be disposed at an upper outward portion of the mirror sub-assembly), while remaining within the spirit and scope of the present invention. Optionally, for example, a turn signal indicator or device or element or module of the present invention may be incorporated into a mirror sub-assembly, and the exterior rearview mirror assembly may include a blind spot or lane change assist indicating device or element at a portion of the mirror casing (such as at an inboard facing portion of the casing that faces generally inboard toward the side of the vehicle so as to be readily viewable by the driver of the vehicle), such as by utilizing aspects of the indicating elements described in PCT Application No. PCT/US2006/026148, filed Jul. 5, 2006 and published Jan. 11, 2007 as International Publication No. WO 2007/005942, which is hereby incorporated herein by reference in its entirety.

As shown in FIGS. 2 and 4, signal indication module 22 includes a circuit element 32, such as a printed circuit board or the like (such as a rigid or flexible circuit board or element), with illumination sources or LEDs 28 disposed thereat (such as surface mounted or otherwise disposed LEDs or other suitable or equivalent light sources). Circuit element 32 is attachable to a rear surface 24a of indicating light source or block 24, whereby the illumination sources 28 are located at the rear surface and preferably at or partially within light source receiving apertures or recesses 24b at the rear surface 24a of indicating light source or block 24. The signal indication module 22 may be purchased as a display element assembly (including the circuit element and circuitry, which are attached at the rear of the indicating light source or block 24) and assembled to the mirror reflective element sub-assembly 12, such as at a mirror assembly facility, such as described below. Circuit element 32 preferably includes an electrical connector 32a or lead or terminal for electrically connecting the circuitry and light source to electrical power or electrical control at the mirror assembly when the signal indication module is attached to the back plate and installed at the mirror casing.

Indicating light source or block 24 of signal indication module 22 comprises a transparent or translucent polymeric block, such as may be cast or injection molded from an optical light transmitting polymeric resin, such as a polycarbonate or an acrylic, or an acrylate, or a polystyrene, or a CR-39 or a COC olefin or other suitable material. The block may be molded as a translucent element, and may comprise a material that is at least partially crystalline, or the material may have a light scattering material mixed therein, or may be otherwise selected so as to provide a diffuse block, whereby the illumination emitted by the illumination source or LED will emanate from the forward surface of the block as a substantially uniform glow. The translucent diffuse block or element may be formed to a desired or suitable shape, such as an arrow or chevron shape (such as shown in FIG. 3), so as to provide the desired form for viewing by the driver of the vehicle. Preferably, the block comprises a translucent block, and thus transmits and diffuses light passing therethrough so that the light sources are not clearly or readily seen through the block by a person viewing the block. The block thus provides substantially uniform light distribution and provides a glowing indicating light source or block when the illumination source or LED/LEDs are activated or energized. Thus, the light emanating from the signal indicating module will not be seen as one or more point sources of light (i.e., the LED or LEDs will not be seen as individual point sources of light), but the light will be provided via a substantially uniformly glowing light source or indicating light source via the diffuse, translucent block or element.

Preferably, the indicating light source or block is partially or substantially coated or painted or covered or sleeved or formed so as to have a light reflecting rear surface 24a and side surfaces 24c (FIG. 3) so that light emitted by illumination sources 28 at the receiving apertures 24b is directed through the block and toward and through the light baffle 30 and through the reflective element 18, and is not transmitted through the side walls or surfaces 24c and rear wall or surface 24a of the indicating light source or block 24, such that light is not emitted into the cavity of the mirror casing. For example, the rear surface (excluding the light source receiving apertures) and side surfaces of the block may be formed or coated to have white diffuse or silvery specular surfaces, such as via application of a reflective tape or a reflective coating or paint or a white tape or coating or paint (such as a diffuse coating such as a white paint or argon paint or titanium paint or the like) at the side and rear surfaces of the block (in other words, the block may be covered or coated at all of its surfaces except its front surface that faces generally toward the reflective element). Optionally, and desirably, the color of the coating or paint (or other material or surface layer or characteristic) may be selected to provide enhanced reflectivity depending on the color and/or type of illumination source or LED of the signal indicating module. For example, if a red LED is used as the illumination source, the indicating light source or block may have a red coating or paint at its side surfaces and rear surface so as to enhance reflectivity of the red light emitted by the red LED at the sides and rear of the block so that the light is reflected and transmitted through the block and toward the reflective element for viewing as a substantially uniform glowing block or indicating light source (if other color LEDs are used, then other correspondingly colored coatings may be used to generally correspond to the wavelengths of light emitted by the colored LEDs). Thus, light emitted by the illumination sources 28 is emitted into the block where the light may pass through the block (and toward the reflective element) or may reflect off of the sides and rear of the block and toward the reflective element so as to provide a substantially uniform glow to the indicating light source or block when the illumination sources are activated.

Back plate 20 is molded or formed, such as by injection molding, so as to provide the display receiving portion 26 and a generally planar backing portion 20a that attaches to the rear surface of the reflective element 18 (such as via adhesive or other suitable attachment means). Preferably, back plate 20, including display receiving portion 26 and light baffle 30, is molded of a substantially dark or opaque or black material, such as from an ABS or polycarbonate polymeric resin material or from any other suitable material such as known in the exterior rearview mirror art, so as to be substantially opaque such that light does not pass through the opaque back plate and the indicator mounting portion.

As shown in FIGS. 2, 5 and 6, indicator mounting portion 26 is unitarily or integrally formed with back plate 20 and may be formed with a pocket 26a for receiving or partially receiving block 24 to locate indicating light source or block 24 at the generally planar backing portion 20a of back plate 20. For example, the pocket 26a may receive indicating light source or block 24 at least partially therein, and the indicator mounting portion 26 may secure (such as by snapping or the like) the block at or in the pocket 26a of indicator mounting portion 26 of back plate 20.

Back plate 20 is formed (such as via injection molding or the like, such as injection molding of ABS or polypropylene or the like) with light baffle 30 at the pocket defined by mounting portion 26. As can be seen with reference to FIGS. 2 and 5, light baffle 30 comprises a plurality of angled or slanted ribs or vanes or baffle elements 30a that are separated or defined by gaps or slots or slits 30b formed through the back plate 20, whereby light from the light sources 28 is transmitted through the block 24 and through the gaps or slots 30b at the back plate 20. The baffle elements thus may be integrally formed with the back plate, with the slots being formed as openings or apertures or passageways through the generally planar back plate and between the baffle elements 30a. As can be seen in FIGS. 2 and 5, baffle elements 30a are integrally formed or molded with back plate 20 and are angled to direct or angle the light or allow the light passing through the slots to be viewed from a desired or appropriate direction, while shielding or shading the light or providing line of sight occlusion of the light so that the light is substantially not viewed from another direction. Optionally, the surfaces of the baffle elements 30a (such as the surfaces facing partially toward the reflective element when the back plate is attached to the rear of the reflective element) may be textured or stippled to diffuse or absorb light so as to reduce visibility of the baffle elements to a person viewing the reflective element when the signal indicating module is deactivated.

Optionally, and desirably, and as can be seen in FIG. 6, the baffle elements 30*a* and slots or slits 30*b* are substantially vertically oriented so as to be substantially vertical when the mirror assembly is mounted at the side of a vehicle (so as to shade or shield or limit viewability of light emanating from the indicator module in a generally horizontal direction). However, it is envisioned that the baffle elements and slots may be angled or canted (or non-vertical) depending on the particular application and desired shielding by the light baffle. In the illustrated embodiment of FIGS. 5 and 6, the generally vertical baffle elements are angled or slanted so that light emanating from indicator module 22 is viewable from a location outboard of the vehicle (such as for viewing of a turn signal indicator by a driver of a vehicle at the side of or rearward of the host vehicle), and is substantially non-viewable by the driver of the host vehicle. The angle or slant of the baffle elements may be selected depending on the particular application of the indicator module and on the location of the indicator module at the mirror assembly. For example, the baffle elements may be slanted so as to allow light to pass through the slots or gaps at an angle of about 65 degrees (or more or less) relative to the generally vertical plane of the back plate and reflective element (i.e., about 25 degrees outboard from a line extending perpendicularly from the plane of the back plate and reflective element). The baffle thus allows a person to view the indicator from an angle around 25 degrees outboard, yet substantially shields or provides direct line of sight occlusion to a person viewing the reflective element from another angle such as from within the vehicle, such as from a typical location of a driver's head.

Optionally, and desirably, the baffle elements may be formed to provide a minimum or reduced thickness while the gaps or slots are formed to allow a substantial amount of light from the glow block to pass therethrough, in order to enhance the viewability of the indicator along the targeted direction when the indicator is activated. For example, the baffle elements may be formed with a wall thickness of about 0.75 mm to about 1.1 mm (or more or less depending on the particular application), while the slots or gaps may be sized to each provide a passageway that is wider than the thickness of the baffle elements, such as about 1 mm to about 1.3 mm (or more or less depending on the particular application). The particular width of the baffle elements and slots or gaps may be selected to provide the desired viewability of light emanating from the indicator module in one direction, while shading or shielding or limiting viewability of the light from another direction, and thus may vary depending on the particular application of the indicator module and light baffle while remaining within the spirit and scope of the present invention.

Although shown in FIG. 6 as being a generally rectangular-shaped display region, the light baffle 30 and mounting portion 26 may be formed to provide the desired icon or indicator or display, such as a chevron shape or arrow shape or the like. Optionally, the light baffle and mounting portion may be formed as shown in FIG. 6, while the glow block or indicating light source may be formed to the desired shape such that the glow emanating from the indicating light source is viewable as the desired shape and from the desired or targeted direction (such an application may include a dark or opaque layer or element at the rear of the light baffle and around the glow block to limit passage of light therethrough).

For example, and as shown in FIG. 3, the glow block or indicating light source may have an arrow or chevron shape (and may be mounted at the mounting portion with the arrow pointing generally outward and away from the vehicle as shown in FIG. 1). The size of the block may be selected so that the light emanating therefrom (when the illumination source is activated) is readily viewable by the targeted viewer. For example, and as shown in FIG. 3A, the block may have a length (from the left tip in FIG. 3A to the right end of the block in FIG. 3A) of about 35 mm and a height of about 60 mm, with each leg being about 35 mm long and about 8 mm wide. The thickness of the block may be selected to provide the desired diffusion of the light from the illumination source so as to provide the desired glow by the block when the illumination source is activated. For example, the block may have a thickness t of about 15 mm (as shown in FIG. 4) so as to emanate the desired or appropriate diffuse light or glow when the illumination source is activated. Other size dimensions may be selected and may depend on the particular application of the block, without affecting the scope of the present invention.

Thus, the unitary back plate provides the mounting structure for mounting the signal indication module at the rear of the back plate and provides the light baffles or ribs or elements for directing the light from the signal indication module at a desired or appropriate direction toward and through the reflective element when the back plate (with the signal indication module attached thereto) is attached to the reflective element. As shown in FIG. 6, the indicator mounting portion 26 of back plate 20 is formed around the light baffle 30 of back plate 20, so as to generally frame or surround the light baffle, whereby the signal indication module is generally at or aligned with the light baffle when received in or mounted at the indicator mounting portion.

As shown in FIGS. 2, 5 and 6, an attachment element or elements 20*b* (such as an annular ring or tab or annular prongs or annular snaps or the like) may be formed or established at the rear of the backing portion 20*a* for attaching the back plate 20 and reflective element 18 to a mirror actuator (such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and 5,900,999, which are hereby incorporated herein by reference herein in their entireties), which is adjustable or operable to adjust a viewing angle of mirror reflective element 18. When the mirror reflective element is canted or angled partially toward the driver of the host vehicle (which is typically the orientation of the reflective element during use so as to provide a generally rearward field of view to the driver of the host vehicle), there is sufficient space within the mirror casing at or near the outboard portion of the mirror assembly for the indicator mounting portion and signal indication module. The back plate and signal indication module of the present invention thus utilizes the space within the mirror head or casing that is already available and typically not used or occupied by other components.

Illumination source or sources 28 is/are operable or activatable or energizable to provide illumination at and through indicating light source or block 24, whereby the illumination is transmitted through indicating light source or block 24 and through the slots 30*b* of light baffle 30 of back plate 20 and through the reflective element 18 so as to be viewable through mirror reflective element 18 by a person viewing the mirror assembly 10. Preferably, the width of the slots are made so as to enhance or optimize light transmission through the light baffle of the back plate, whereby the baffle elements may be formed to be substantially thin. The signal indication module 22 may comprise a blind spot or object detection indicating device or module that is operable to indicate to the driver of the subject or host vehicle that an object or other vehicle is detected at the side or blind spot region of the host vehicle by a blind spot detection system (or may comprise a turn signal indicating device or module that is operable to indicate to the driver or passenger of another vehicle that the vehicle is turning or changing lanes, or may comprise other forms or types of display or illumination or indicating devices or modules, as discussed below).

Illumination source 28 (such as one or more light emitting diodes (LEDs) or organic light emitting diodes (OLEDs) or the like) is/are energized to direct or emit illumination through indicating light source or block 24 so that the indicator/light is viewable through the reflective element. The indicating light source or block 24 and/or light baffle 30 may be formed to provide a desired shape for viewing of the light passing through the reflective element or the mirror reflective element may include one or more iconistic display areas so that the illumination is viewable and discernible at the reflective element by the desired or targeted viewer, depending on the angle of the ribs or baffle elements 30a of light baffle 30. The mirror assembly thus may provide an iconistic display for an object detection/LCA system and/or an iconistic display for a turn signal indication, and/or may provide other displays or illumination devices, without affecting the scope of the present invention. Optionally, the baffle elements may be painted or coated with a diffuse reflecting layer or paint or coating to enhance the intensity of the light emanating from the light baffle and through the reflective element. Optionally, and desirably, however, the baffle elements may be dark colored and may include textured surfaces to substantially absorb light so as to reduce visibility of the light baffle through the reflective element when the illumination source is deactivated.

Preferably, the mirror reflective element 18 comprises a transflective display on demand reflective element that is partially transmissive and partially reflective, so that the light emanating or glowing from the block may be transmitted through the reflective element when the illumination source is activated, but the indicator and light baffle is substantially non-visible or viewable when the illumination source is deactivated. Optionally, the mirror reflective element 18 may comprise a single substrate or non-electro-optic reflective element (such as shown in FIG. 2), which has a glass substrate 34 with a transflector coating or layer 36 at its forward surface 34a. For example, the transflector coating or layer 36 may comprise an elemental semiconductor coating, such as a silicon-based coating, or may comprise a multilayer stack of non-conducting or poorly conducting but highly transparent thin film coatings (such as metal oxides, such as silicon dioxide or titanium dioxide or zirconium oxide, or metal halides, such as magnesium fluoride), and where the outermost layer of such a stack that is in contact with any electro-optic medium, such an electrochromic medium, is electrically conducting, and preferably comprises a indium tin oxide layer of sheet resistance in the range of about 5 ohms·square to about 20 ohms·square range, or the transflector coating or layer 36 may comprise a metal oxide/metal/metal oxide stack (with at least one of the metal oxide layers comprising a conducting or semiconducting layer), such as an IMI (such as ITO/silver/ITO or ITO/silver alloy/ITO or other suitable alternating layers of materials or the like) stack of layers or coatings such as by utilizing aspects of the reflective elements described in U.S. Pat. Nos. 6,690,268; 5,668,663 and/or 5,724,187, and/or in U.S. patent application Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 11/021,065, filed Dec. 23, 2004, now U.S. Pat. No. 7,255,451, which are all hereby incorporated herein by reference in their entireties. Optionally, the reflective element may comprise an electro-optic, such as electrochromic, reflective element, such as discussed below.

Optionally, a heater pad 38 may be provided at the rear surface 34b of the glass substrate 34 of reflective element 18 and between the backing portion 20a of back plate 420 and the reflective element 18 to provide an anti-fogging of de-fogging feature to the exterior mirror assembly (such as by utilizing aspects of the heater elements or pads described in U.S. patent application Ser. No. 11/334,139, filed Jan. 18, 2006, now U.S. Pat. No. 7,400,435, which is hereby incorporated herein by reference in its entirety). The back plate and/or heater pad may include suitable electrical connectors and connections incorporated therein (such as by utilizing aspects of the mirror assembly described in U.S. patent application Ser. No. 11/334,139, filed Jan. 18, 2006, now U.S. Pat. No. 7,400,435, which is hereby incorporated herein by reference in its entirety) for electrically connecting the heater pad and/or display element (or other suitable electrical connectors may be utilized, such as electrical leads or wire harnesses or pigtails or other separate connectors or cables or the like). The heater pad 38 includes a hole or opening or aperture 38a therethrough (or optionally a window or transparent or translucent or diffuse portion of the heater pad, such as a clear or diffusing transparent polyester flexible plastic film or element) that generally corresponds to the light baffle 30 of back plate 20 when the heater pad 38 is attached to the rear surface 34b of glass substrate 34 and when the back plate 20 is attached to the rear surface of the heater pad 38. Optionally, and desirably, the heater pad 38 may include an adhesive layer (such as a pressure sensitive adhesive layer) at its rear surface for adhering the back plate 20 to the heater pad 38 and thus to the rear surface 34b of the glass substrate 34 of the reflective element 18. As shown in FIG. 2, back plate 20 is adhered to heater pad 38 such that indicator mounting portion 26 and light baffle 30 are positioned or located generally at the aperture 38a of heater pad 38 so as to be generally at the display area of the reflective element.

Optionally, the back plate may include a perimeter framing portion or bezel portion that extends around the perimeter edges of the reflective element to support the reflective element and frame the reflective element at the mirror assembly (such as by utilizing aspects of the mirror assemblies described in U.S. patent application Ser. No. 11/520, 193, filed Sep. 13, 2006, now U.S. Pat. No. 7,581,859, which is hereby incorporated herein by reference in its entirety). The perimeter bezel portion may be narrow or small depending on the particular application of the reflective element and mirror reflector sub-assembly. Optionally, the mirror reflector sub-assembly may comprise a bezelless or frameless reflective element (such as the types described in U.S. patent application Ser. No. 11/226,628, filed Sep. 14, 2005 and published Mar. 23, 2006 as U.S. Publication No. US-2006-0061008; Ser. No. 10/533,762, filed May 4, 2005, now U.S. Pat. No. 7,184,190; and/or Ser. No. 11/021,065, filed Dec. 23, 2004, now U.S. Pat. No. 7,255,451, and/or PCT Application No. PCT/US2006/018567, filed May 15, 2006 and published Nov. 23, 2006 as International Publication No. WO 2006/124682, which are hereby incorporated herein by reference in their entireties), whereby the back plate may not include a perimeter framing portion or bezel portion around the perimeter of the reflective element.

Optionally, and preferably, indicator element or display element or signal indication module 22 may snap into or may be threaded into the end or pocket of the indicator mounting portion 26 or may otherwise be attached or stuck at the indicator mounting portion, and may have a gasket or seal at the signal indication module to provide a substantially water proof or water resistant or water tight seal at the signal indication module, whereby the signal indication module may be sealed at the indicator mounting portion, such as by gluing or pressing or screwing or gasketing or hermetically sealing or otherwise substantially sealing the signal indication module at the indicator mounting portion. The signal indication module may comprise a self-contained, unitary, sealed or substantially sealed, indicator module that includes the translucent block, an illumination source (such as one or more LEDs or the like), a DC converter with a voltage dropping resistor (such as described in U.S. Pat. Nos. 6,902,284 and 6,690,268 and/or U.S. patent application Ser. No. 10/054,633, filed Jan. 22, 2002, now U.S. Pat. No. 7,195,381, which are hereby incorporated herein by reference in their entireties). The signal indication module thus may be connected to a power source and may be activated or energized to illuminate the display for viewing by the driver of the vehicle. Optionally, the electrical connections to the signal indication module may be made while the signal indication module is attached to the mirror assembly, such as via a plug and socket type arrangement or configuration, and such as by utilizing aspects of the mirror assembly described in U.S. Pat. No. 6,669,267, which is hereby incorporated herein by reference in its entirety. The unitary signal indication module may include or utilize aspects of various light modules or systems or devices, such as the types described in U.S. Pat. Nos. 6,227,689; 6,582,109; 5,371,659; 5,497,306; 5,669,699; 5,823,654; 6,176,602 and/or 6,276,821, and/or U.S. patent application Ser. No. 11/520,193, filed Sep. 13, 2006, now U.S. Pat. No. 7,581,859, and/or PCT Application No. PCT/US2006/018567, filed May 16, 2006 and published Nov. 23, 2006 as International Publication No. WO 2006/124682, which are hereby incorporated herein by reference in their entireties.

Optionally, the signal indication module may be supplied or provided to an assembly facility (such as a mirror assembly facility or the like) from a module supplier while the back plate may be supplied or provided to the assembly facility from a back plate supplier. An operator at the assembly facility may attach the module to the back plate, preferably by snapping or pressing the module to the back plate to assemble the module to the back plate (whereby the module may have a snug fit within the receiving portion or pocket such that the module and back plate are preferably substantially water impervious). Optionally, and desirably, electrical connection (such as to a power supply or 12 volt power wire of the vehicle battery/ignition system or to a power feed from a LIN bus controller) to the module may be made when the module is snapped or otherwise attached (preferably mechanically but optionally adhesively) to the back plate (such as by making electrical contact between the module and mirror circuitry [including circuitry associated with the reflective element and/or mirror assembly, such as electrochromic mirror circuitry, mirror lights and display circuitry and the like, typically disposed at a printed circuit board of the mirror assembly] when the module is snapped to the back plate, such as by press attaching the display module into receiving fingers or clips or snaps or the like that are integrally formed with the back plate in the injection molding operation that manufactures or forms the back plate itself) or alternately, electrical connection to the module may be made via other means, such as wires or leads or the like before or after the module is snapped or attached to the back plate.

Figure 7:
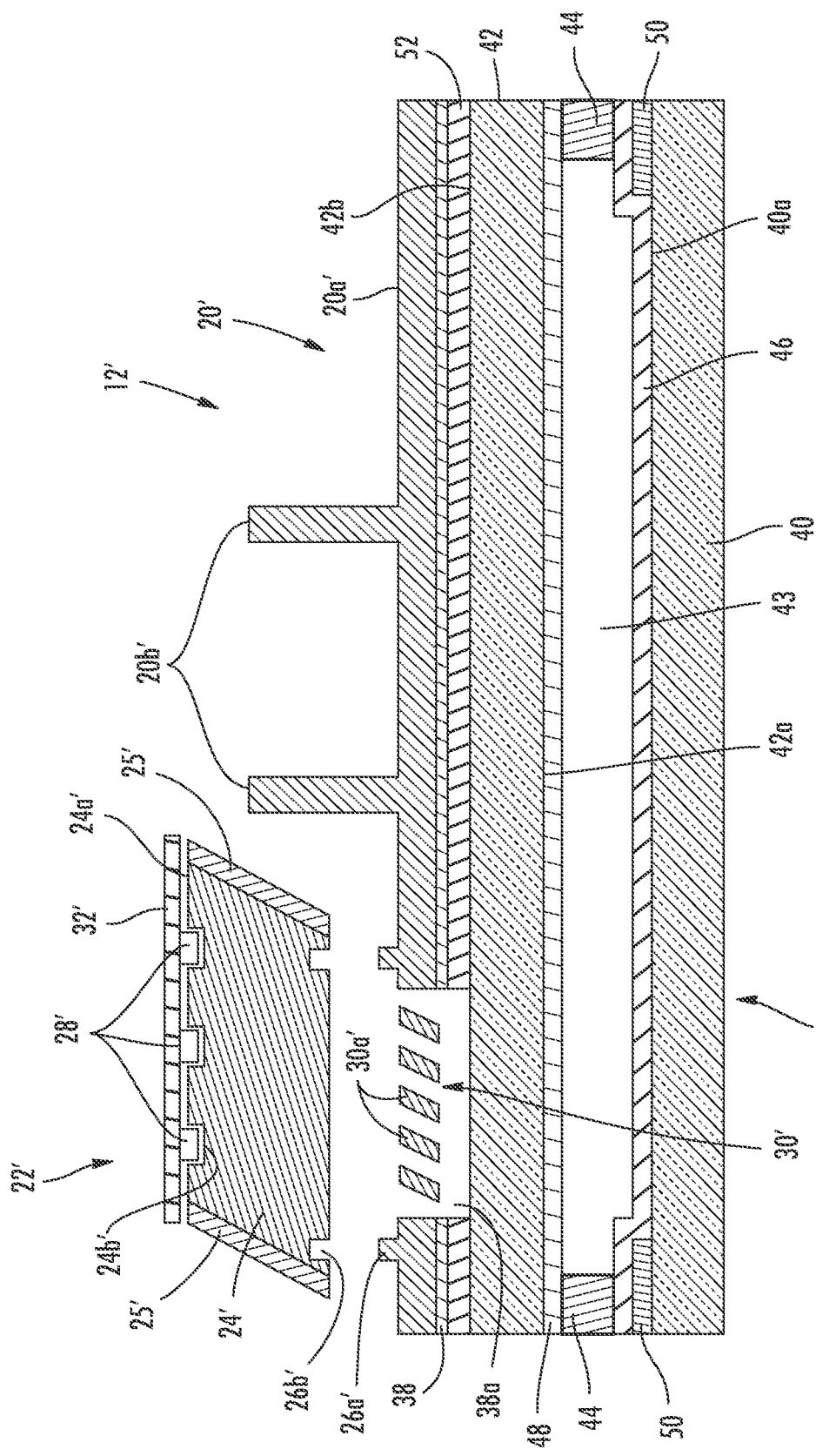
FIG. 7 is a sectional view of another mirror reflector sub-assembly having a back plate and indicator element in accordance with the present invention, shown with the indicator element detached from the back plate.
Figure 8:
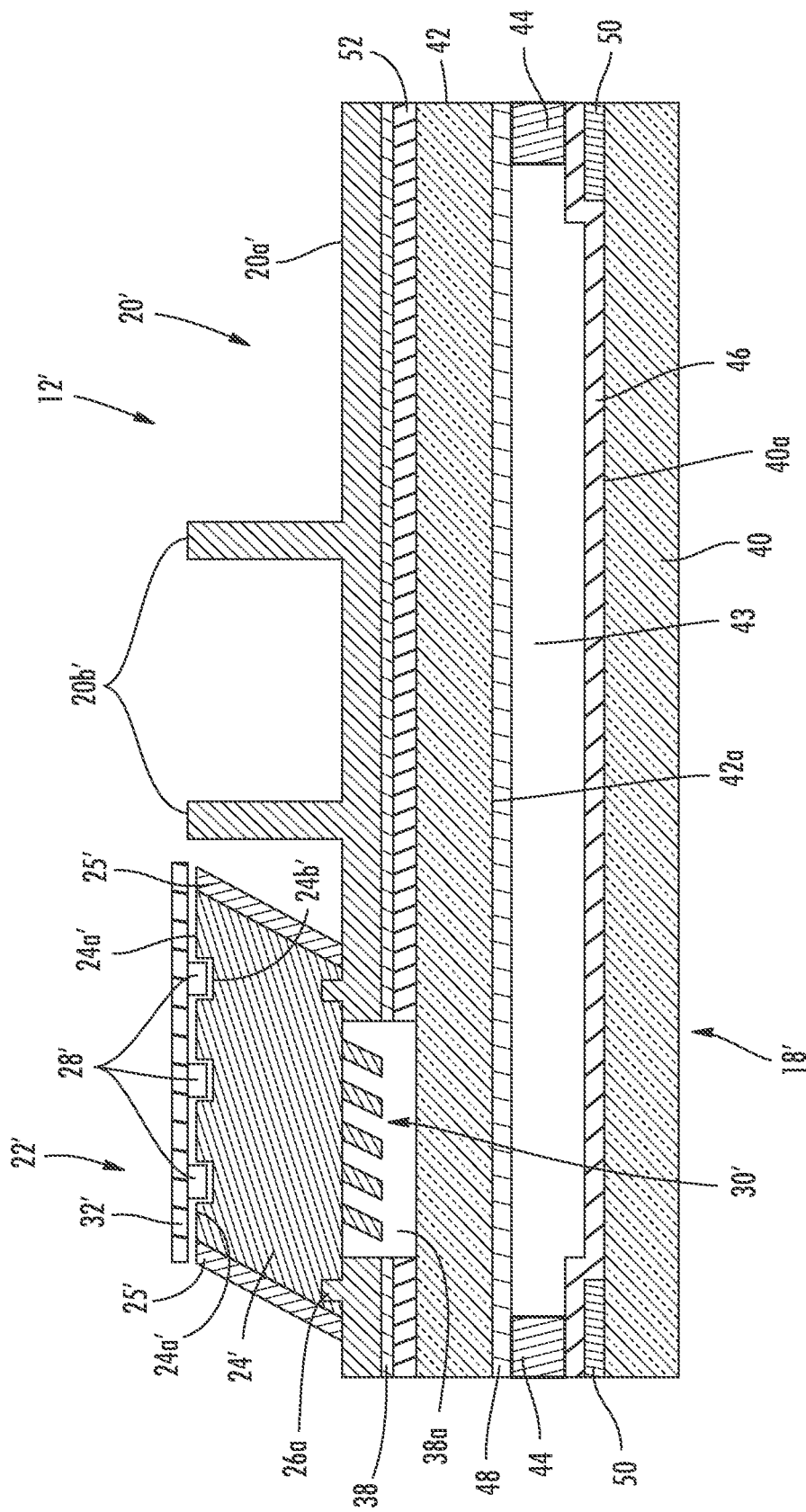
FIG. 8 is another sectional view of the mirror reflector sub-assembly of FIG. 7, shown with the indicator element attached to the back plate.

Optionally, and as shown in FIGS. 7 and 8, a reflective element assembly 12' includes a reflective element 18' and a back plate 20', which includes a plurality of angled baffle elements 30a' of a light baffle 30'. Back plate 20' includes an attachment element or snap element 26a' for attaching to or snapping to a corresponding attachment element or snap element 26b' of a signal indicating module 22' to attach or support signal indicating module 22' at the rear of back plate 20' and at and rearward of light baffle 30'. The attachment element 26a' may be integrally formed at the rear of the back plate 20' (such as during the integral molding formation of the back plate itself and such as via an injection molding tool or the like) and at or near baffle elements 30a' of light baffle 30' of back plate 20', while attachment elements 26b' may be integrally formed or otherwise established at a forward surface of signal indicating module 22'. Although described as snaps or snap elements, other mechanical or adhesive means may be utilized to attach the signal indicating module to the back plate, while remaining within the spirit and scope of the present invention. Thus, the signal indicating module 22' may be mounted to or supported at the rear surface of the light baffle 30' (and may be substantially parallel to the rear surface of the reflective element 18' or to the generally planar portion 20a' or rear surface of the back plate 20'). Back plate 20' may also include a mounting portion 20b' for mounting or attaching the back plate 20' to a mirror actuator (not shown), such as described above.

Signal indication module 22' includes a transparent or translucent polymeric block or element or indicating light source or element 24' and an illumination source or indicator 28', such as one or more light emitting diodes (LEDs) or other suitable illumination source, such as described above. In the illustrated embodiment, signal indicating module 22' comprises a rhombus-shaped or parallelogram shaped element having a transparent or translucent optical plastic block 24' at least partially surrounded by or encased by side walls 25'. The optical block 24' may be light reflecting or light absorbing or light diffusing depending on the particular application and desired lighting effect for the signal indicating module. Optionally, the optical block may be cast or injection molded from an optical light transmitting polymeric resin, such as a polycarbonate or an acrylic, or an acrylate, or a polystyrene, or a CR-39 or a COC olefin or other suitable material. The block may be molded as a translucent element, and may comprise a material that is at least partially crystalline, or the material may have a light scattering material mixed therein, or may be otherwise selected so as to provide a diffuse block, whereby the illumination emitted by the illumination source or LED will emanate from the forward surface of the block as a substantially uniform glow. The translucent diffuse block or element may be formed to a desired or suitable shape, such as described above, so as to provide the desired form for viewing by the driver of the vehicle.

Signal indication module 22' includes a circuit element 32', such as a printed circuit board or the like (such as a rigid or flexible circuit board or element), with illumination sources or LEDs 28' disposed thereat (such as surface mounted or otherwise disposed LEDs or other suitable or equivalent light sources). Circuit element 32' is attachable to a rear surface 24a' of indicating light source or block 24', whereby the illumination sources 28' are located at the rear surface and preferably at or partially within light source receiving apertures or recesses 24b' at the rear surface 24a' of indicating light source or block 24'. The signal indication module 22' may be purchased as a display element assembly or module (including the circuit element and circuitry, which are attached at the rear of the indicating light source or block 24') and assembled to the mirror reflective element sub-assembly 12', such as at a mirror assembly facility, and such as via snapping the attachment elements 26a' and 26b' together to attach the signal indicating module 22' at the rear of the back plate 20' and generally at light baffle 30' molded or formed as part of the back plate 20'. Circuit element 32' preferably includes an electrical connector or lead or terminal for electrically connecting the circuitry and light source to electrical power or electrical control at the mirror assembly when the signal indication module is attached to the back plate and installed at the mirror casing.

Thus, signal indicating module 22' provides an angled shape with the side walls 25' being angled generally along a similar angle as the angle of the baffle elements or vanes 30a' of light baffle 30'. For application as a turn signal indicator, the angle of the vanes 30a' is selected so that the vanes 30a' are generally canted toward or directed toward the portion of the roadway adjacent to the side of the vehicle to which the exterior rearview mirror assembly utilizing signal indicating module 22' is mounted, and where the driver of an overtaking vehicle generally adjacent to the equipped vehicle would readily observe the indication. Alternatively, should the indicator be a blind spot indicator, the angle of the vanes or baffle elements may be selected so that the vanes are generally canted toward or directed toward the side of the vehicle to which the exterior rearview mirror assembly utilizing the signal indicating module is mounted, and where the driver of the equipped vehicle would readily observe the indication or alert provided by the indicating module.

The parallelogram shape of signal indicating module 22' provides the angled side walls 25' while providing a rear surface 24a' of optical block 24' that is generally parallel to the generally planar back plate 20', such that the non-angled rear surface of the optical block 24' may have a reduced depth into the mirror casing so as to be more readily packaged within the mirror assembly. The optical block 24' may be formed to the desired shape and the outer side walls 25' may be formed or established or coated therearound, such as via overmolding techniques or painting or the like, or the outer side walls 25' may be formed and the optical block 24' may be molded or injected or established therein, such as via a separate molding process or co-injection molding process or the like. The inner surfaces of the outer side walls 25' may have a surface treatment or characteristic, such as by decoration or treatment, such as by coatings or paints or the like, or such as by physical establishment, such as grain, stipple, pits/light traps or the like established during the molding of the plastic elements themselves, to provide the desired reflectivity/diffusivity of the signal indicating module 22'. Optionally, a cover or seal or the like may be provided at least partially around the signal indicating module to cover and/or substantially seal the circuit element and optical block at and within the signal indicating module. The signal indicating module thus provides a self-contained module or device that may be readily attached to the mirror back plate and readily connected to electrical wiring or leads of the mirror assembly.

In the illustrated embodiment, reflective element 18' comprises an electrochromic reflective element (but could comprise a non-electrochromic reflective element without affecting the scope of the present invention) having a front substrate 40, a rear substrate 42 and an electrochromic medium 43 (such as a solid polymer matrix electrochromic medium or the like) sandwiched therebetween and sealed via a perimeter seal 44. Front substrate 40 has a transparent conductor coating 46 (such as an indium tin oxide (ITO) coating or layer) disposed at its rear surface 40a, while rear substrate 42 has a transflector coating 48 (such as a non-dichroic transflector, such as an ITO/Ag/ITO stack of layers or coatings or the like) disposed at its front surface 42a. Optionally, the reflective element may include a perimetal metallic reflector band 50 (such as chromium or other suitable material), such as by utilizing aspects of the reflective elements described in U.S. patent application Ser. No. 10/528,269, filed Mar. 17, 2005, now U.S. Pat. No. 7,274, 501; Ser. No. 10/533,762, filed May 4, 2005, now U.S. Pat. No. 7,184,190; Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. US-2006-0061008, which are all hereby incorporated herein by reference in their entireties. In the illustrated embodiment, the metallic reflector band 50 is disposed at the rear surface 40a of front substrate 40, with the transparent conductor coating 46 overlapping the band 50 at the perimeter regions of the reflective element, but the reflector band may otherwise be disposed over the transparent conductor, depending on the particular or selected or desired tint or appearance of the metallic perimeter band.

Mirror reflector sub-assembly 12' also includes a heater pad 38 disposed between back plate 20' and the rear surface 42b of rear substrate 42. As shown in FIGS. 7 and 8, heater pad 38 has an aperture 38a formed therethrough that generally corresponds with the light baffle 30' of back plate 20' when the heater element is attached or adhered to the back plate. Optionally, and desirably, an opacifying element or layer or coating or film 52 (such as black or dark color, such as dark blue or dark grey, paint or ink or film or coating or tape or lacquer or the like, and preferably a dark, light-absorbing layer that is printed or screened onto the fourth or rear surface of the electrochromic reflective element or cell) may be disposed between heater element 38 and rear surface 42b of rear substrate 42. The dark or opacifying layer may be established via any suitable establishing methods or means, such as painting, printing, ink jet printing, pad printing, screening or the like.

Figure 9:
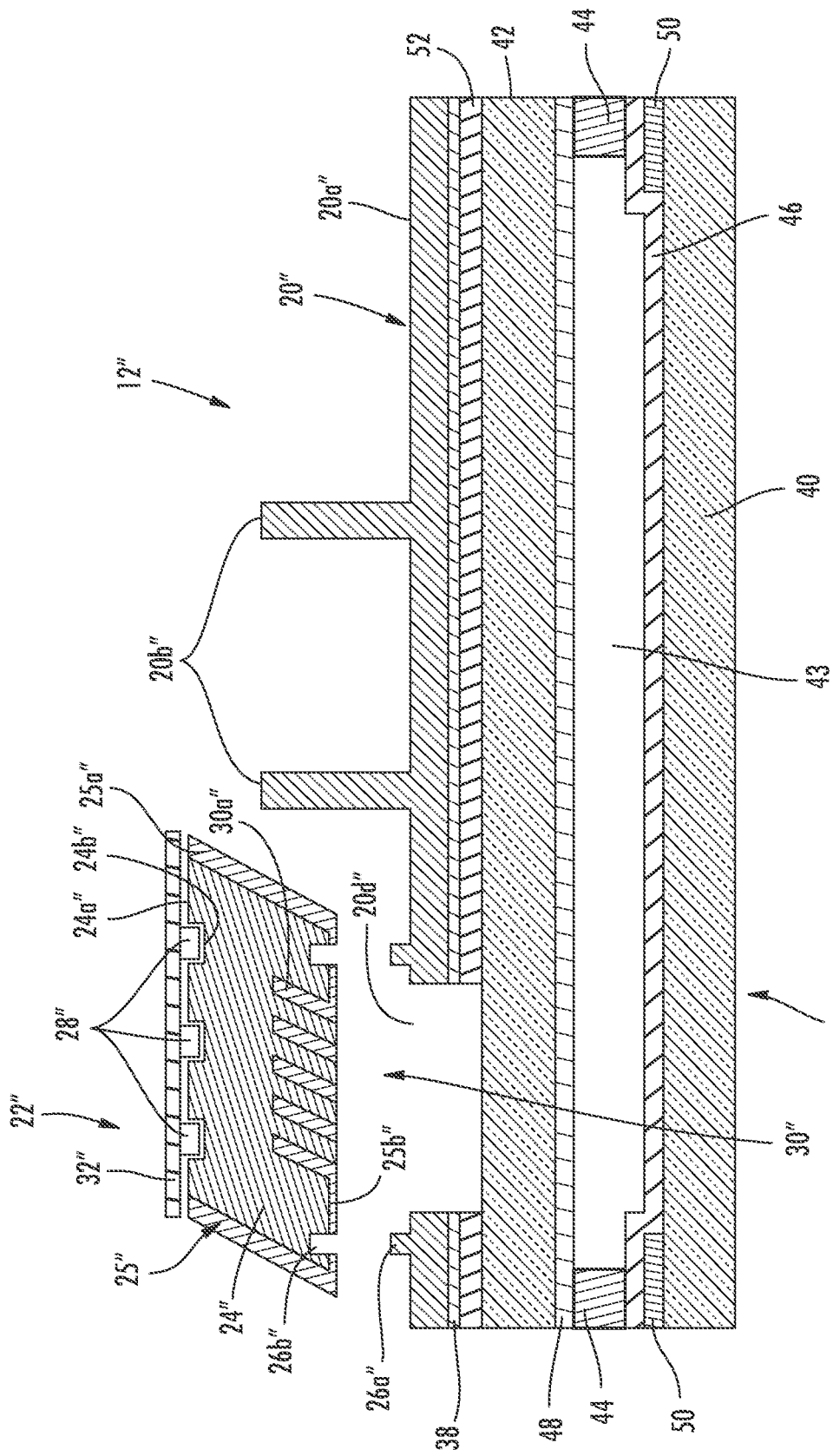
FIG. 9 is a sectional view of another mirror reflector sub-assembly having a back plate and indicator element in accordance with the present invention, shown with the indicator element detached from the back plate.
Figure 10:
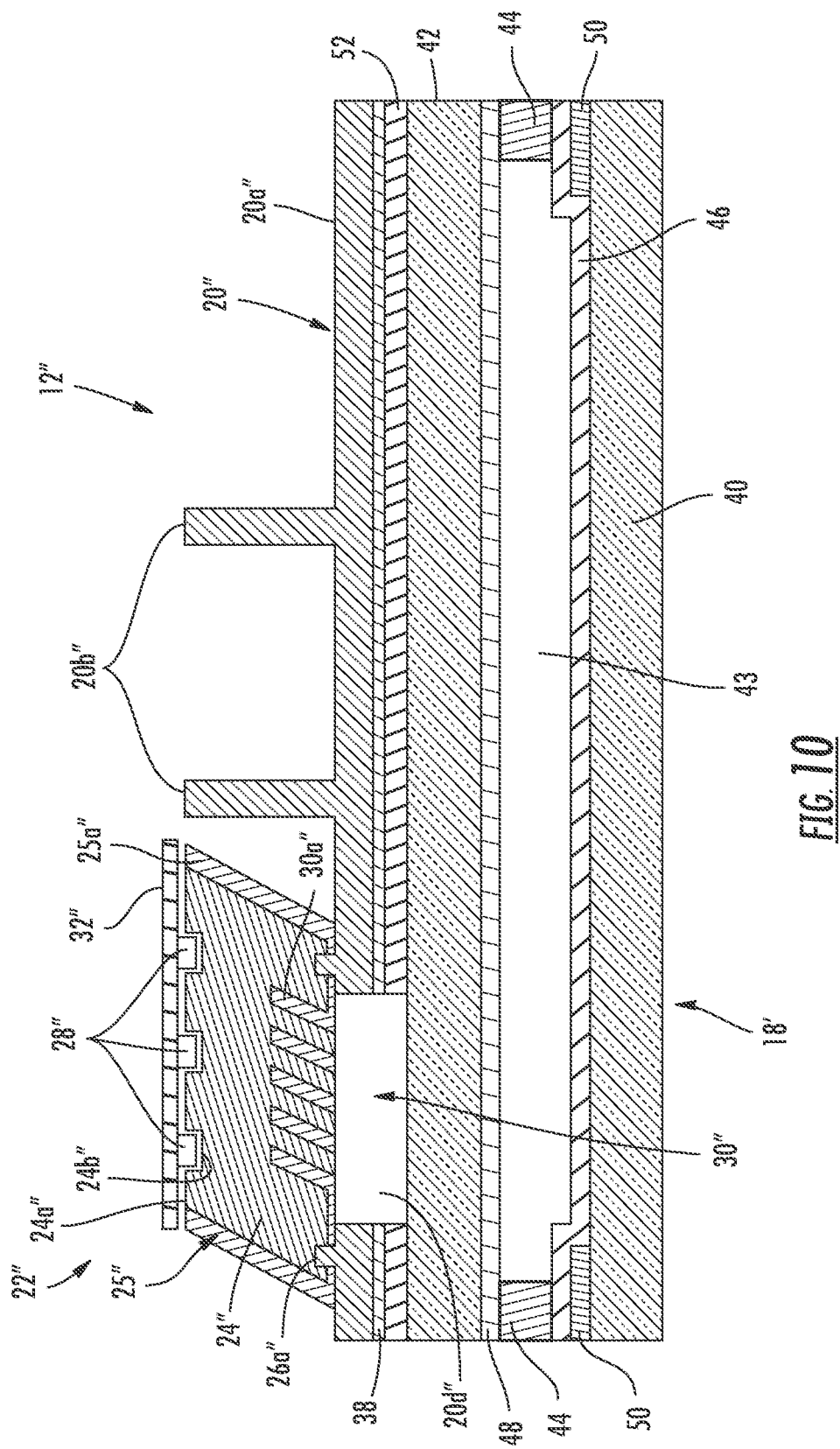
FIG. 10 is another sectional view of the mirror reflector sub-assembly of FIG. 9, shown with the indicator element attached to the back plate.

Optionally, and with reference to FIGS. 9 and 10, a reflective element assembly 12" includes a reflective element 18' (such as similar to the reflective element described above) and a back plate 20". Back plate 20" includes an attachment element or snap element 26a" for attaching to or snapping to a corresponding attachment element or snap element 26b" of a signal indicating module 22" to attach or support signal indicating module 22" at the rear of back plate 20" and at and rearward of an aperture 20d" formed through back plate 20". The attachment element 26a" may be integrally formed at the rear of the back plate 20" and at or near aperture 20d" of back plate 20", while attachment elements 26b" may be integrally formed or otherwise established at a forward surface of signal indicating module 22". Thus, the signal indicating module 22" may be mounted to or supported at the rear surface of the back plate 20" (and may be substantially parallel to the rear surface of the reflective element 18' or to the generally planar portion 20a" or rear surface of the back plate 20"). Back plate 20" may also include a mounting portion 20b" for mounting or attaching the back plate 20" to a mirror actuator (not shown), such as described above.

As shown in FIGS. 9 and 10, signal indicating module 22" includes a transparent or translucent polymeric block or element or indicating light source or element 24" disposed at least partially within an outer casing or shell 25", and an illumination source or indicator 28", such as one or more light emitting diodes (LEDs) or other suitable illumination source, disposed at the rear surface 24a" of the optical block 24". Similar to signal indicating module 22', discussed above, signal indicating module 22" comprises a rhombus-shaped or parallelogram shaped element having a transparent or translucent optical plastic block 24" at least partially surrounded by or encased by outer shell 25". Optionally, the signal indicating module or shell or element may be any suitable or desirable or appropriate shape (at least at its terminal portion closest to the rear of the reflective mirror element) to provide a desired indicator or icon as seen by a person viewing from the front of the reflective mirror element when the signal indictor is activated. For example, the signal indicating module or tube or shell or element may comprise a triangular-shaped tube or element for providing a triangular-shaped indicator or icon, such as for a signal indicative of a hazard signal of the vehicle being activated, or may be any other shape as desired.

In the illustrated embodiment, outer shell 25" includes side walls 25a" and a forward surface or portion 25b", which includes a light baffle 30" molded as part of the outer shell. As shown in FIGS. 9 and 10, forward portion 25b" of outer shell 25" has the light baffle 30" (which includes a plurality of baffle elements or vanes 30a" formed at an angle relative to the planar forward surface of the forward portion 25b" with slots formed between the vanes for light from the illumination source 28" to pass therethrough) integrally formed therewith. Although shown in FIGS. 9 and 10 as extending partially along the depth of the outer shell 25", the baffle elements 30a" may extend substantially the entire depth of the shell 25" so that a rearward end or region of the baffle elements is generally at or near the rear surface of the optical block 24" when the optical block 24" is established within shell 25", as discussed below. Optionally, the baffle elements or vanes 30a" may be formed with apertures or holes therethrough to allow light from within optical block 24" (such as at the sides of the baffle) to pass through the vanes 30a" to enhance the light emanating from the forward portion of the signal indicating module when the illumination source is activated. The vanes at either or both sides of the baffle portion may have more holes or apertures therethrough, while the inner vanes may not have holes therethrough, in order to provide the desired degree of light emanating from the signal indicating module. The forward portion 25b" of shell 25" further includes attachment elements 26b", such as receiving portions for receiving the attachment elements 26a" of back plate 20".

Optionally, the outer shell 25" may be molded of a plastic or polymeric material, such as a dark plastic resin or a light or white plastic resin or the like, and the inner surfaces of the side walls 25a" may have a surface treatment or characteristic, such as stippling or texturing or coating or the like (such as discussed above), established thereon. The optical block 24" may be formed via a separate injection molding process or a co-injection molding process, wherein the polymeric material of the optical block (such as a polycarbonate or acrylic material or the like) may be injected or established within the side walls 25a" of outer shell 25" and within the slots between the baffle elements 30a". Optionally, the tube or shell or element or side walls of the tube or shell or element may be lined with a visible light highly reflecting material (such as by being formed at least partially of a bright reflecting material and/or by being coated or painted or decorated with a bright reflecting material and/or by being sleeved with a highly reflecting metal thin film or foil or coating) so as to enhance passage of light down along the tube or shell or element and so as to enhance the luminance of the displayed hazard or other indication as viewed by a person viewing the mirror assembly when the illumination source is activated and when being viewed such as on a bright sunny day where display wash-out might be a concern, or the tube or shell or side walls of the tube or shell or element may only have the distal part or portion (the portion or end region of the shell that is further away from the rear surface of the reflective element and toward or at the illumination source) be reflective (which may be specularly reflective, such as from a metal coating or foil, and/or may be diffusely reflective, such as from a white paint or pigment or from an Argent paint or coating), while the rest of the tube or shell or element, or side walls of the shell or tube or element, closest to the terminal end at the rear of the mirror reflective element are substantially not reflecting or are light absorbing or black or the like, in order to enhance the directionality of the light emitted by the indicator module.

The illumination source 28" or circuit element 32" (such as a printed circuit board or the like) may be attached or snapped to the rear of the module, such as to the rear surface 24a" of the optical block 24" or to a rear attachment portion of the outer shell, whereby the illumination sources 28" are located at the rear surface of the optical block and preferably at or partially within light source receiving apertures or recesses 24b" at the rear surface 24a" of optical block 24". The circuit element 32" may include electrical connectors or terminals for connecting the signal indicating module 22" to electrical leads of the mirror assembly when the reflective element assembly 12" is installed at or in a mirror assembly.

Optionally, a cover or seal or the like may be provided at least partially around the signal indicating module to cover and/or substantially seal the circuit element and optical block at and within the signal indicating module (or the signal indicating module may be otherwise substantially sealed) so that the signal indicating module may be substantially water impervious. The signal indicating module thus provides a self-contained module or device that may be readily attached to the mirror back plate and readily connected to electrical wiring or leads of the mirror assembly. Advantageously, the substantially sealed signal indicating module may be brought in or installed as a single or unitary module with sealed elements and mechanical connections and electrical connectors pre-established as part of the sealed unitary signal indicating module. Thus, the mechanical connectors or elements or connections may mechanically connect to the mirror back plate, and the electrical connectors may be electrically connected to electrical wiring or leads of the mirror assembly when the sealed, self-contained signal indicating module is installed at or in or at least partially in the exterior rearview mirror assembly.

Thus, signal indicating module 22" provides an angled shape with the side walls 25a" of the outer shell 25" being angled generally along a similar angle as the angle of the baffles or vanes or elements 30a" of light baffle 30" of outer shell 25" of signal indicating module 22". The parallelogram shape of signal indicating module 22" provides the angled side walls 25" while providing a rear surface 24a" of optical block 24" that is generally parallel to the generally planar back plate 20", such that the non-angled rear surface of the optical block 24" may have a reduced depth into the mirror casing so as to be more readily packaged within the mirror assembly with a reduced packing density within the mirror assembly.

The signal indicating module of the present invention (such as, for example, as shown in FIGS. 9 and 10) provides an economical and effective signal indicator without requiring the expense or complexity of providing a lens or other optical device that receives the light from the light assembly and emits it in a given direction as parallel rays. Thus, no collimating optical element, or equivalent thereof, is utilized or needed in the construction of the signal indicating module of the present invention. The present invention provides a semi-transparent mirror reflective element (having a substrate with a coating on one surface that is substantially transparent and reflective at any given point, e.g., a half-silvered or one way mirror) without any discreet apertures or individual apertures in the substantially continuous and uninterrupted reflector utilized. Thus, there are no identifiable gaps in the mirror coating through which light from the light assembly transmits.

Accordingly, the signal indication module 22" may be purchased as a display element assembly or module (including the circuit element and circuitry, which is/are attached at the rear of the block 24") and assembled to the mirror reflective element sub-assembly 12", such as at a mirror assembly facility, and such as via snapping the attachment elements 26a" and 26b" together to attach the signal indicating module 22" at the rear of the back plate 20" and generally at aperture 20d" of back plate 20". Circuit element 32" preferably includes an electrical connector or lead or terminal for electrically connecting the circuitry and light source to electrical power or electrical control at the mirror assembly when the signal indication module is attached to the back plate and installed at the mirror casing.

Optionally, and as shown in FIGS. 11 and 12, a back plate 120 may include an attachment element or indicator receiving portion 126 that has an angled or canted or slanted surface for receiving or supporting a signal indicating module 122 thereat. The indicator receiving portion 126 is integrally formed at the rear of the angled baffle elements 130a of a light baffle 130 of back plate 120. Thus, the signal indicating module 122 may be mounted to or supported at the canted surface 120c of the light baffle 130, such that the indicating light source or block 124 is angled relative to the generally planar backing portion 120a of back plate 120. Back plate 120 may also include a mounting portion 120b for mounting or attaching the back plate 120 to a mirror actuator (not shown), such as described above.

In the illustrated embodiment of FIGS. 11 and 12, the signal indicating module 122 includes a transparent or translucent indicating light source or glow block 124 (such as similar to block 24 described above) and a light source 128 at the rear of indicating light source or block 124. The light source 128 is preferably a power LED, such as of the types described in U.S. patent application Ser. No. 10/054,633, filed Jan. 22, 2002, now U.S. Pat. No. 7,195,381, which is hereby incorporated herein by reference in its entirety. Illumination emitted by the power LED is directed through indicating light source or block 124 (which may have reflecting rear and side surfaces as described above) and is transmitted through slots 130b of light baffle 130, and is shaded or shielded from view from another angle via baffle elements 130a, such as in a similar manner as described above. Because the signal indicating module 122 and back plate 120 may be otherwise substantially similar to the signal indicating module 22 and back plate 20 described above, a detailed discussion of the modules and back plates need not be repeated herein. Because the block comprises a translucent diffusing block, the illumination emitted by the power LED is transmitted through the block (and preferably reflected off of the sides and rear of the block as described above) such that the light emanating from the block is viewed as a substantially uniform glow and not as a point source of light.

In the illustrated embodiment, the slots 130b and baffle elements 130a are angled through indicator mounting portion 126 and are generally normal to block 124. As can be seen in FIG. 11, the slots and baffle elements are angled outward and away from the host vehicle and away from the driver of the host vehicle. The light source 128 is located at block 124 (such as at a circuit element or board or the like), which is at or near the end of the slots 130b so that light emitted by light source 128 is emitted through slots 130b and away from the view of the driver of the host vehicle sitting in the vehicle cabin. The angle of the rear surface and/or the slots and baffle elements may be selected to provide the desired angle of the light path as the light exits the indicator receiving portion, depending on the particular application of the signal indicating module and reflective element sub-assembly. The light baffle may be established to provide the desired indicator form or shape, such as a chevron shape or arrowhead shape or other suitable shape or form, and may be readily viewable and discernible and recognizable when the light source is activated. Because the back plate 120 and indicator receiving portion 126 of back plate 120 are substantially opaque, the slots and block and light source are not readily viewable and discernible when the light source is deactivated. Optionally, the surfaces of the baffle elements 130a (such as the surfaces facing partially toward the reflective element when the back plate is attached to the rear of the reflective element) may be textured or stippled to diffuse or absorb light so as to reduce visibility of the baffle elements to a person viewing the reflective element when the signal indicating module is deactivated.

Figure 13:
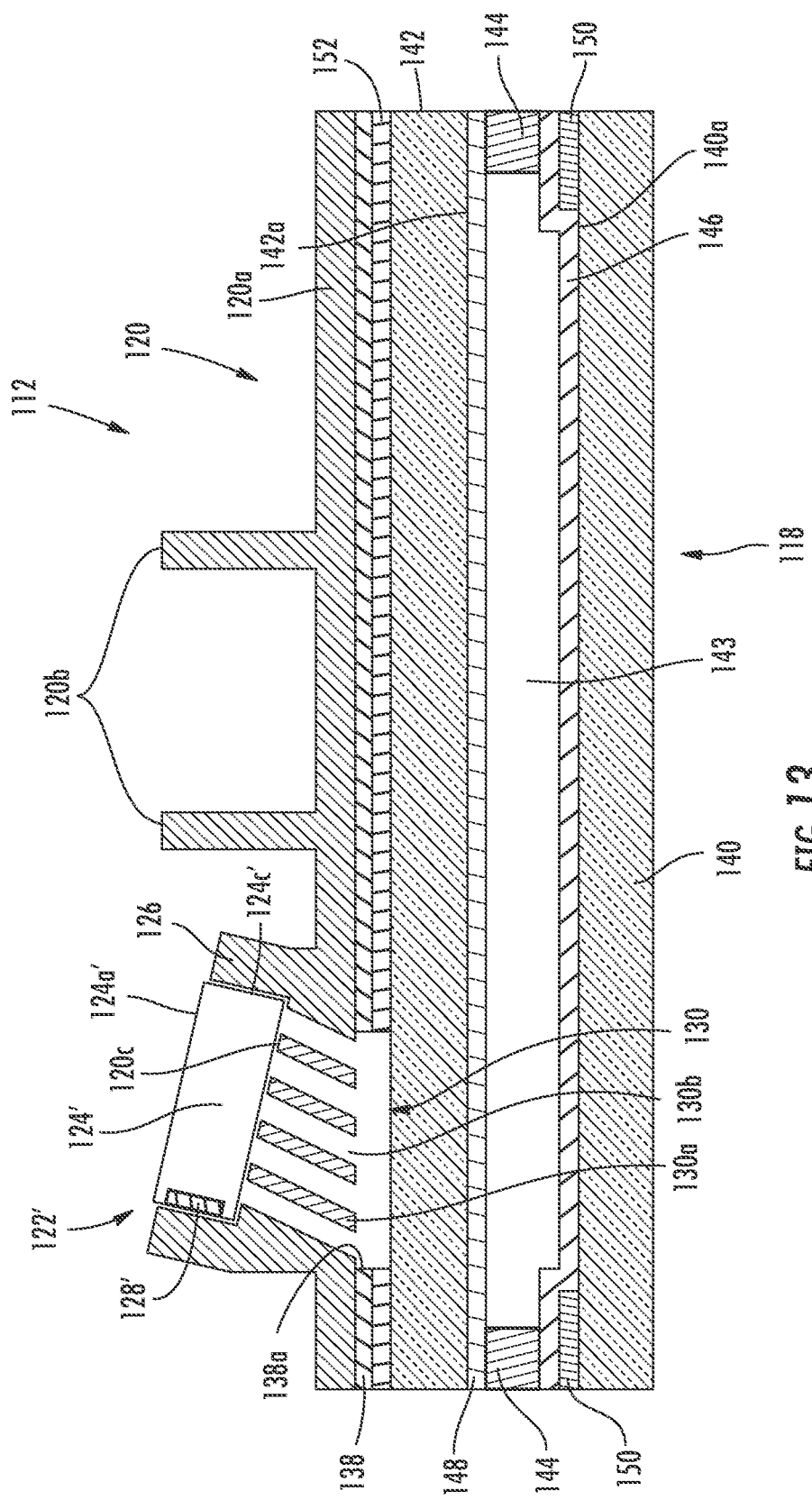
FIG. 13 is a sectional view of another mirror reflector sub-assembly in accordance with the present invention.

Optionally, and with reference to FIG. 13, a mirror reflector sub-assembly 112 may comprise back plate 120, a signal indicating module 122' and an electro-optic (such as electrochromic) reflective element 118. Back plate 120 is substantially similar to the back plate of FIGS. 11 and 12, and receives or supports signal indicating module 122' at the angled or canted surface 120c of the back plate 120 at the rear of the light baffle 130. In the illustrated embodiment, signal indicating module 122' includes a indicating light source or block 124' and an illumination source 128', which may comprise a power LED or the like. As shown in FIG. 13, illumination source 128' may be located at or in (such as recessed in) a side portion or surface 124c' of indicating light source or block 124'. The rear surface 124a' and side surfaces 124c' of indicating light source or block 124' may be coated or painted so as to have reflective surfaces, such as described above. Thus, the light emitted by the light source 128' at the side of the indicating light source or block 124' is reflected off of the side and rear surfaces of the block and is transmitted through the block and through and along the slots 130b of light baffle 130 and through the reflective element 118.

In the illustrated embodiment, reflective element 118 comprises an electrochromic reflective element having a front substrate 140, a rear substrate 142 and an electrochromic medium 143 (such as a solid polymer matrix electrochromic medium or the like) sandwiched therebetween and sealed via a perimeter seal 144. Front substrate 140 has a transparent conductor coating 146 (such as an indium tin oxide (ITO) coating or layer) disposed at its rear surface 140a, while rear substrate 142 has a transflector coating 148 (such as a non-dichroic transflector, such as an ITO/Ag/ITO stack of layers or coatings or the like) disposed at its front surface 142a. Optionally, the reflective element may include a perimetal metallic reflector band 150 (such as chromium or other suitable material), such as by utilizing aspects of the reflective elements described in U.S. patent application Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. US-2006-0061008, which are all hereby incorporated herein by reference in their entireties. In the illustrated embodiment, the metallic reflector band 150 is disposed at the rear surface 140a of front substrate 140, with the transparent conductor coating 146 overlapping the band 150 at the perimeter regions of the reflective element, but the reflector band may otherwise be disposed over the transparent conductor, depending on the particular or selected or desired tint or appearance of the metallic perimeter band.

Mirror reflector sub-assembly 112 also includes a heater pad 138 disposed between back plate 120 and the rear surface 142b of rear substrate 142. As shown in FIG. 13, heater pad 138 has an aperture 138a formed therethrough that generally corresponds with the light baffle 130 of back plate 120 when the heater element is attached or adhered to the back plate. Optionally, and desirably, an opacifying element or layer or coating or film 152 (such as black or dark color, such as dark blue or dark grey, paint or ink or film or coating or tape or lacquer or the like, and preferably a dark, light-absorbing layer that is printed or screened onto the fourth or rear surface of the electrochromic reflective element or cell) may be disposed between heater element 138 and rear surface 142b of rear substrate 142. The dark or opacifying layer may be established via any suitable establishing methods or means, such as painting, printing, ink jet printing, pad printing, screening or the like.

Figure 14:
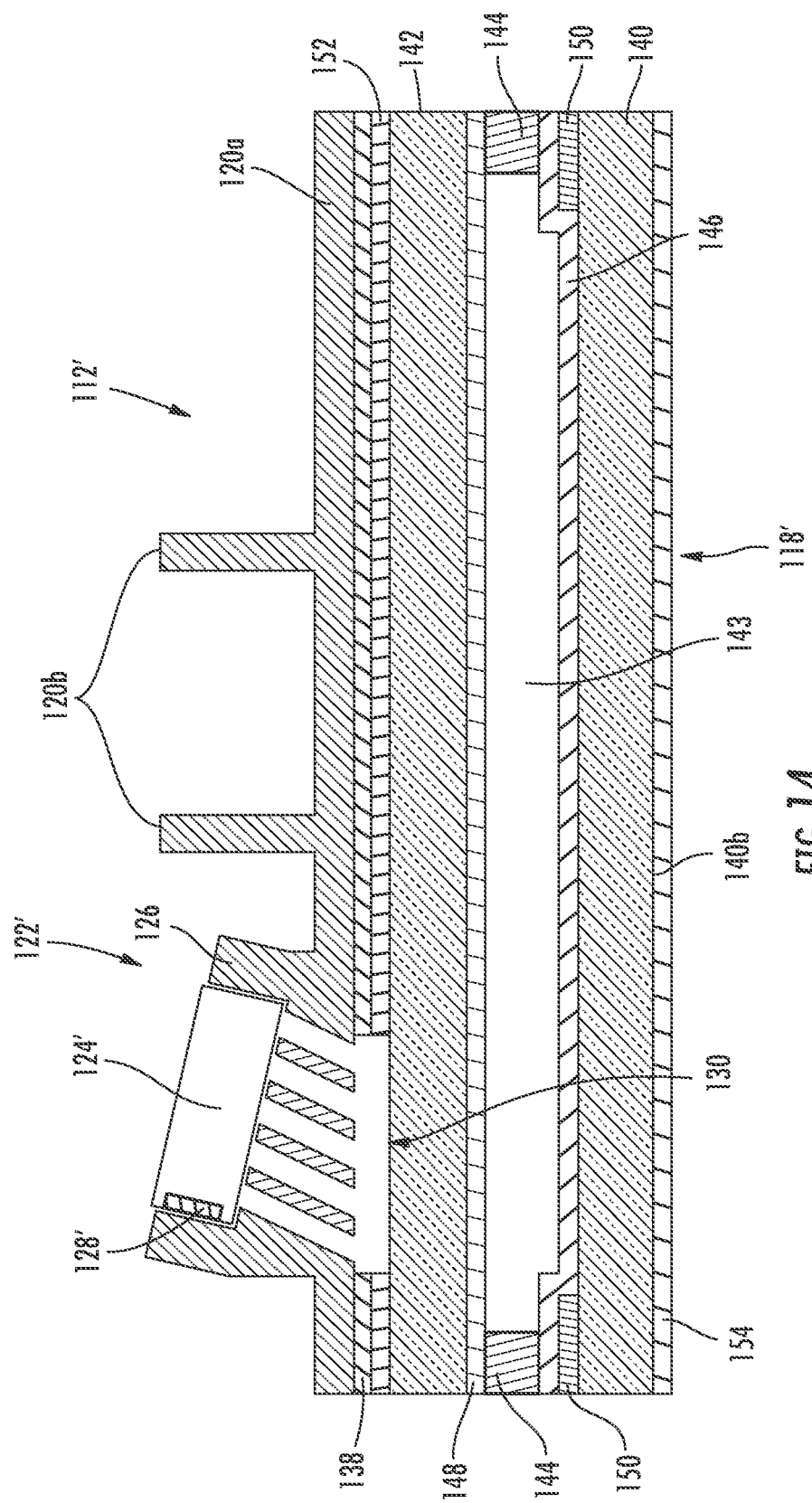
FIG. 14 is a sectional view of another mirror reflector sub-assembly similar to the mirror reflector sub-assembly of FIG. 13, with an anti-reflection coating at a front surface of the reflective element.

Optionally, and with reference to FIG. 14, the reflective element 118' may include an anti-reflection layer or layers 154 disposed at the front surface 140b of front substrate 140 to reduce reflection of light incident on the reflective element. The anti-reflection layer/layers 154 may be deposited at the front surface of the front substrate during a pyrolytic deposition process. For example, the anti-reflection layer (such as an OPTIVIEW™ layer such as commercially available from Pilkington) may be deposited pyrolytically in a glass manufacturing plant where the anti-reflection layer may be formed by deposition onto the glass surface at the glass float-line itself when the glass ribbon is first being formed from the molten glass raw materials (where the red-hot molten glass exiting the glass furnace is floated onto a tin bath and where the coating materials or gasses or precursors are blown onto the red hot glass ribbon prior to it cooling to form the glass sheet, i.e., while the glass exits the tin bath and while it is still in a very hot condition to form the anti-reflection coatings on the glass surface by pyrolytic chemical reaction of the gaseous precursors as they are incident on the red-hot glass surface). It is envisioned that the conductive coating may also or otherwise be disposed or deposited at the surface of the glass via a pyrolytic deposition process, such as by utilizing aspects described in PCT Application No. PCT/US2006/018567, filed May 15, 2006 and published Nov. 23, 2006 as International Publication No. WO 2006/124682, which is hereby incorporated herein by reference in its entirety. Because the other components or elements of mirror reflective element 118' and mirror reflector sub-assembly 112' may be substantially similar to those of reflective element 118 and sub-assembly 112, discussed above, a detailed discussion of the reflective elements and sub-assemblies need not be repeated herein. The similar or common elements of the reflective elements and sub-assemblies are shown in FIGS. 13 and 14 with like reference numbers.

Although it is known to dispose an anti-reflection coating or layer at a first surface of a reflective element (such as described in U.S. Pat. No. 5,076,674, which is hereby incorporated herein by reference in its entirety), such coatings have not to date achieved commercial success due to the costs associated with such coatings. The prior concerns can be overcome utilizing a glass substrate or sheet that is coated with a durable and preferably bendable and most desirably temperable anti-reflective means. Preferably, such material is deposited pyrolytically in a glass manufacturing plant and as the glass ribbon being formed (and while still a red hot glass ribbon) is exiting the float bath (typically floating on molten tin). The bendability and temperability of the coated glass so formed via an in-float pyrolytic deposition process when the flat glass sheet is itself being made at the glass sheet manufacturing plant also allows the glass to be purchased in flat glass sheets and formed or cut and bent at a later time, such as by the mirror manufacturer.

Such pyrolytically coated glass provides a durable, bendable and temperable substrate that provides reduced reflectance of light incident thereon when the so-coated surface is used as the first surface in an EC mirror cell construction. For example, such coated glass preferably transmits at least 90 percent of visible light and has a first surface reflectance of less than 2 percent, more preferably less than 1 percent and more preferably less than 0.75 percent (broadly across the visible light spectrum). Such pyrolytic deposited coatings and coated substrates provide durable, bendable and temperable anti-reflection means, and preferably also have a low ultraviolet (UV) light transmission. For example, such coated glass may typically pass less than about 1 percent of solar UV energy therethrough (by comparison, clear float glass typically passes about 62 percent of solar UV energy therethrough).

Because the coated glass is durable, bendable and temperable, the mirror reflector manufacturer may purchase the coated glass in flat sheets and may cut and/or form and/or bend and/or temper the glass to make the desired or appropriately shaped mirror substrates or shapes. Also, because the coated glass provides a reduced reflectance at the first surface of the reflective element, a reflectance of light incident on the mirror reflective element of only about 4 to 5 percent (as measured in accordance with SAE J964a, which is hereby incorporated herein by reference in its entirety) can be achieved when the electrochromic mirror is dimmed to its maximum level (according to the applied voltage for the particular unit, typically about 1.2 to 1.4 volts and typically about 1.25 volts, when applied to the conductive coatings of the substrates of the reflective element). By comparison, typical interior and exterior rearview mirrors may dim to a minimum reflectance of light incident thereon that is at about 5 to 8 percent when the electrochromic mirror is dimmed to its maximum level. Optionally, the anti-reflection coating or layer may be disposed at the first or front surface of the reflective element utilizing aspects of the reflective elements described in U.S. Pat. No. 5,076,674, which is hereby incorporated herein by reference in its entirety.

Thus, the mirror reflective element of the present invention may provide a reduced reflectivity at the reflective element when the electro-optic reflective element is at its maximum dimming state. The mirror reflective element may be configured to provide the desired reflectivity at the maximum dimmed state (such as a photopic reflectance of light incident thereon of at least about 4 percent and at most about 5 percent), and the optical characteristics or properties may be selected or configured to attain the desired range of reflectivity. For example, the first surface anti-reflectivity coating (such as properties thereof) may be selected or adjusted, and/or the thickness of the transparent conductor coating (such as ITO) may be selected or adjusted, and/or the reflectivity of the third surface transflector coating may be selected or adjusted, and/or the type or thickness of the electrochromic medium itself may be selected or adjusted to adjust or reduce the reflectivity of the mirror to the desired range when the mirror reflector is at its fully dimmed state. For example, if a mirror reflective element provides about 3 percent reflectance of light incident thereon, the mirror manufacturer may reduce the thickness of the electrochromic medium to increase the reflectance to about 4 percent or more, while keeping the reflectance at or below 5 percent of light incident thereon.

Optionally, the back plate may have two or more indicator display elements or modules mounted thereto, such as in a similar manner as described above. For example, a light baffle may be formed at an outboard portion of the back plate (away from the vehicle when the mirror assembly is mounted at the side of the vehicle) and may have the baffle elements angled so as to direct the light or glow from the block generally outwardly so as to not be readily viewable by the driver of the vehicle and, thus, to provide a turn signal indicator at the exterior mirror assembly, while another light baffle may be formed at an inboard portion of the back plate (toward the vehicle when the mirror assembly is mounted at the side of the vehicle) and may have the baffle elements angled so as to direct the light or glow from the block generally inwardly so as to be readily viewable by the driver of the vehicle and, thus, to provide a blind spot alert or indicator for a side object detection system or blind spot detection system or lane change assist system or the like. The indicators or display modules may be substantially similar to those described above, or may utilize aspects of the indicator modules described in U.S. patent application Ser. No. 11/520,193, filed Sep. 13, 2006, now U.S. Pat. No. 7,581,859, and/or PCT Application No. PCT/US2006/018567, filed May 16, 2006 and published Nov. 23, 2006 as International Publication No. WO 2006/124682, and/or U.S. provisional application Ser. No. 60/857,025, filed Nov. 6, 2006, which are hereby incorporated herein by reference in their entireties.

Figure 15:
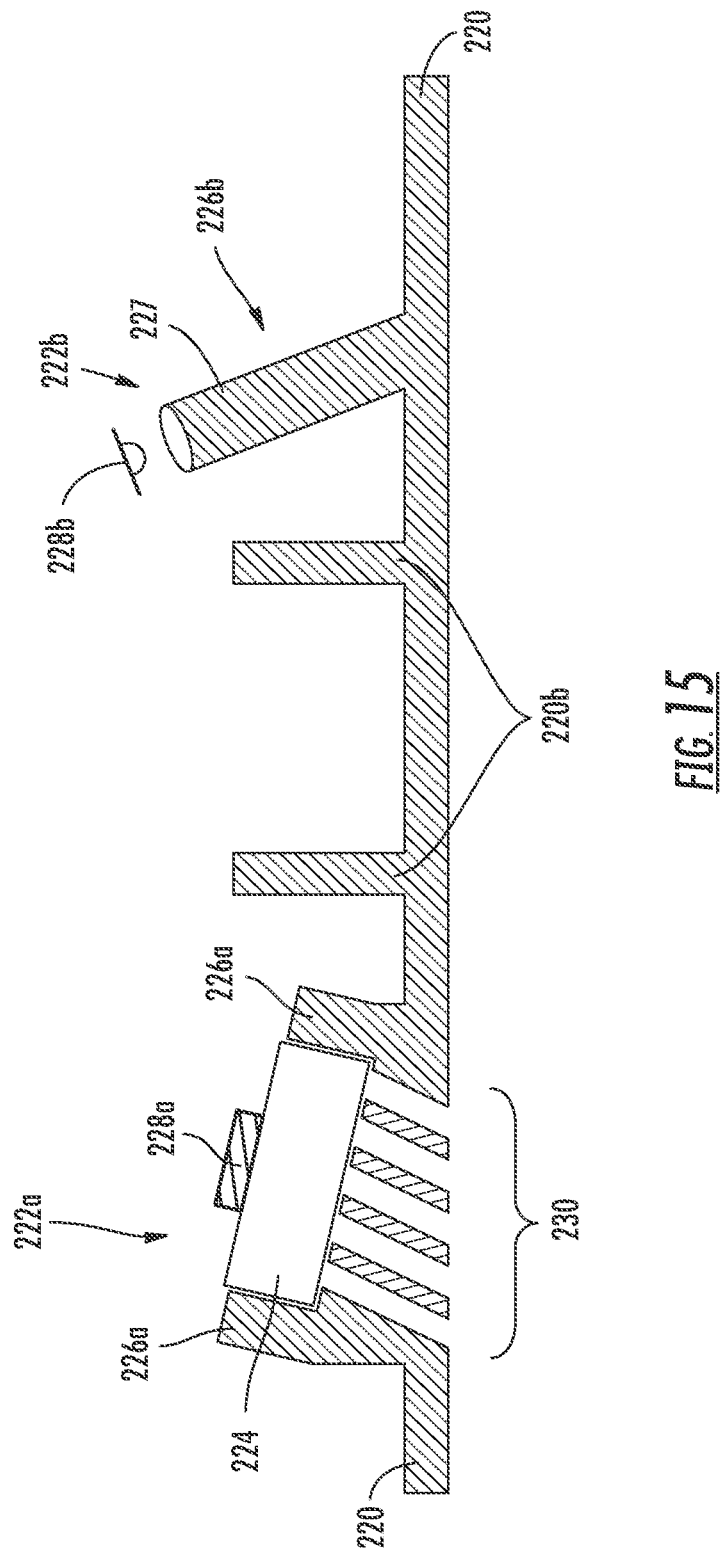
FIG. 15 is a sectional view of a back plate and indicator modules in accordance with the present invention.
Figure 16:
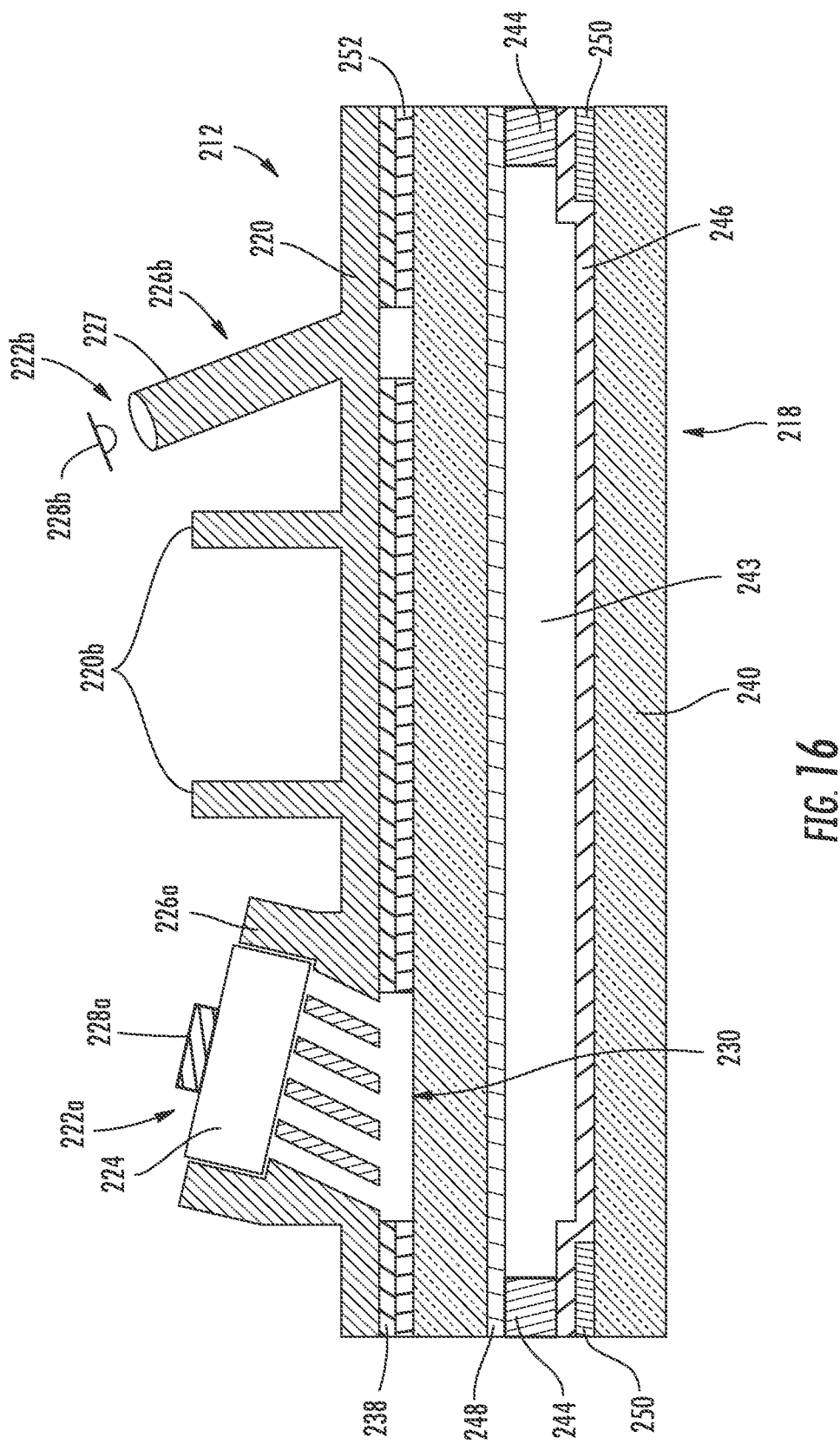
FIG. 16 is a sectional view of a mirror reflector sub-assembly having the back plate and indicator modules of FIG. 15.

For example, and with reference to FIGS. 15 and 16, a back plate 220 may include a turn signal indicator mounting portion 226a (such as at an outboard portion or region of the back plate) and a blind spot indicator mounting portion 226b (such as at an inboard portion or region of the back plate). In the illustrated embodiment, the turn signal indicator mounting portion 226a and signal indicating module 222a may be similar to mounting portion 126 and module 122 described above with respect to FIG. 11, and may include a translucent block or indicating light source or element 224 and illumination source 228a at a rear portion of the mounting portion 226a and generally at a light baffle 230 of back plate 220. Optionally, the blind spot indicator or alert module or element 222b at mounting portion 226b may utilize aspects of the indicator modules and mounting portions described in U.S. patent application Ser. No. 11/520,193, filed Sep. 13, 2006, now U.S. Pat. No. 7,581,859, which is hereby incorporated herein by reference in its entirety. Briefly, such a mounting portion 226b may comprise a hollow tube 227 integrally formed with and extending from the rear of the back plate 220, and with a passageway extending therethrough or therealong, whereby the indicator module 222b is mounted at the rearward portion of the hollow tube 227. The indicator module 222b includes an illumination source or LED 228b that is operable to emit light into and along and through the passageway of the hollow tube 227 and toward and through the reflective element 218 (FIG. 16) for viewing by the driver of the vehicle. Back plate 220 also includes an actuator mounting portion 220b for attaching the back plate and reflective element to a mirror actuator for providing adjustment of the reflective element by the driver of the vehicle.

The reflective element 218 may comprise any type of reflective element, preferably a transflective or display on demand type reflective element such as described above. In the illustrated embodiment, reflective element 218 comprises a transflective electrochromic reflective element having a first or front substrate 240 and a second or rear substrate 242 with an electrochromic medium 243 sandwiched therebetween and sealed with a perimeter seal 244. The front substrate 240 includes a transparent conductor coating 246 at its rear surface and may include a perimeter metallic band 250 at the perimeter of the rear surface, such as described above. The rear substrate 242 includes a transflective coating or a metal oxide/metal/metal oxide stack (with at least one of the metal oxide layers comprising a conducting or semiconducting layer), such as an IMI stack of coatings or layers 248, at its front surface. The back plate 220 is adhered or attached at the rear surface of the rear substrate, and the mirror reflective element sub-assembly 212 may include a heater element 238 and an opacifying element or layer or coating or film 252 disposed between the back plate and rear substrate. As can be seen in FIG. 16, the heater element 238 and opacifying layer 252 include apertures therethrough at the location of the light baffle 230 and the passageway of the indicator mounting portion 226b of the back plate 220, so that light emanating from the signal indicating modules 222a, 222b is transmitted through the apertures in the heater element and opacifying layer and through the reflective element for viewing by a person viewing the reflective element at the appropriate angle.

Thus, the blind spot indicator mounting portion 226b may be angled so as to direct the light toward the vehicle and toward a driver or occupant of the host vehicle. More particularly, the light beam emitted from the blind spot signal indicating module 222b and transmitted through the reflective element is angled so as to have its principle beam axis directed generally toward the eyes of a driver seated in the interior cabin of the host vehicle. The indicator mounting portion thus may extend from the rear of the back plate at an acute angle (such as approximately about 25 to about 30 degrees or thereabouts) relative to the plane defined by the back plate so as to direct or guide light through the passageway and in the desired direction toward the side of the equipped/host vehicle for viewing the object/LCA indication principally or solely by the driver of the host vehicle. Should, however, the signal module be a turn signal module, then the indicator mounting portion may extend from the rear of the back plate at an acute angle (such as approximately about 55 to about 60 degrees or thereabouts) relative to the plane defined by the back plate so as to direct or guide light through the passageway and in the desired direction away from the side of the equipped/host vehicle for viewing the turn indication principally or solely by the drivers of overtaking vehicles and principally other than by the driver of the host vehicle.

The indicator may be activated or energized in response to a detection of an object or other vehicle approaching or adjacent to the host vehicle in order to alert or warn the driver of the host vehicle not to attempt or initiate a lane change that moves the subject or host vehicle into the already occupied (or soon to be occupied) side lane or region adjacent either the driver side or the passenger side of the host vehicle. The inboard display area may be for displaying or indicating to the driver of the host vehicle that an object has been detected in the blind spot, while the outboard display area may be for displaying or indicating a turn signal activation to the driver of another vehicle. Optionally, the inboard display area may comprise an industry standard icon, such as an ISO icon (showing icons representing the host vehicle and another vehicle at the side and/or rearward of the host vehicle) or the like, to indicate to the driver of the host vehicle that another vehicle has been detected at the side and/or rearward of the host vehicle. The iconistic display may be established at the reflective element, such as by providing indicia at the reflective element such as by utilizing aspects of the reflective elements described in PCT Application No. PCT/US2006/018567, filed May 15, 2006 and published Nov. 23, 2006 as International Publication No. WO 2006/124682, which is hereby incorporated herein by reference in its entirety.

Optionally, however, the display area may comprise other forms, such as, for example, a multi-stage indicator having multiple indicating portions or elements or devices for indicating a degree of hazard or the like of an object or vehicle detected alongside and/or rearward of the host vehicle (such as an indicating display of the types described in PCT Application No. PCT/US2006/026148, filed Jul. 5, 2006 and published Jan. 11, 2007 as International Publication No. WO 2007/005942; and U.S. provisional applications, Ser. No. 60/696,953, filed Jul. 6, 2005, and Ser. No. 60/784,570, filed Mar. 22, 2006, which are hereby incorporated herein by reference in their entireties), or other types of indicating means, such as by utilizing aspects of the displays or indicators described in U.S. Pat. No. 6,598,982, issued to Witt; U.S. patent application Ser. No. 11/226,628, filed Sep. 14, 2005 and published Mar. 23, 2006 as U.S. Publication No. US-2006-0061008; and/or PCT Application No. PCT/US2006/018567, filed May 15, 2006 and published Nov. 23, 2006 as International Publication No. WO 2006/124682, which are hereby incorporated herein by reference in their entireties, without affecting the scope of the present invention.

For example, the icons or pattern that define the display may be established at the rear of the rear substrate and between the rear surface of the rear substrate and the back plate. The icons or pattern that define the display may be established through or defined by the dark layer or opacifying layer so that icons or iconistic portions of the dark layer form the icon or icons of the iconistic display area. Optionally, the iconistic portions of the display area may be established by etching the dark layer or by a mask or the like positioned at the rear surface of the substrate during the painting or screening or coating process that applies the dark layer. Optionally, the iconistic portions of the display area may be established by etching or masking at a fourth surface conductive busbar or coating (such as a fourth surface conductive busbar of the types described in U.S. patent application Ser. No. 11/021,065, filed Dec. 23, 2004, now U.S. Pat. No. 7,255,451; and/or Ser. No. 11/334,139, filed Jan. 18, 2006, now U.S. Pat. No. 7,400,435; and/or U.S. provisional applications, Ser. No. 60/644,903, filed Jan. 19, 2005; and Ser. No. 60/667,049, filed Mar. 31, 2005, which are hereby incorporated herein by reference in their entireties). Optionally, the icons or pattern may be established via cutouts or holes or patterns or indicia portions formed in and through or partially through a heater pad (that may be attached to or adhered to the dark or opacifying layer at the rear surface of the reflective element, as discussed below), with the dark layer having an opening or aperture formed therethrough and generally corresponding with the indicia portions of the heater pad when the heater pad is adhered to the dark layer at the rear surface of the reflective element.

As described in U.S. provisional application Ser. No. 60/696,953, incorporated above, the present invention provides a blind spot indicator or lane change assist (LCA) indicator that is fixedly located at the mirror shell or casing and/or at a support arm of an exterior rearview mirror assembly, so as not to move or adjust when the mirror reflective element is moved or adjusted to set its field of view. Preferably, the blind spot indicator is fixedly located at the inboard wall or portion of the mirror shell or casing, so as to be readily viewed by the driver of the host vehicle, while being substantially non-visible or non-viewable by a driver of another vehicle. The blind spot/LCA indicator is preferably located at an angled, outwardly extending rearward portion of the mirror assembly that is angled so as to slope or extend at an angle away from the body side of the vehicle, so that the blind spot/LCA indicator is generally facing the driver of the host vehicle and is readily viewable by the driver of the host vehicle and substantially non-visible or non-viewable by a driver of another vehicle at or approaching the host vehicle.

According to an aspect of the present invention, an exterior rearview mirror assembly for a vehicle includes a reflective element, a mirror shell or casing and a blind spot indicator. The shell or casing has an inboard portion that is inboard of the reflective element relative to the position of the reflective element with respect to the body side of the vehicle when the exterior mirror assembly is mounted thereto, and thus is between the reflective element and the body side of the vehicle to which the mirror assembly is attached. The blind spot indicator is located at and oriented at the inboard portion of the mirror shell or casing so as to be viewable by the driver of the vehicle and so as to be substantially to totally non-viewable by the drivers of other vehicular traffic, such as other vehicular traffic rearward of, sideward of, approaching, overtaking, forward of or otherwise at or near the host vehicle.

The inboard portion of the mirror shell or casing (which at least in part defines a cavity within which the mirror reflective element is disposed and within which the mirror reflective element is adjustable) may comprise an inboard wall of the mirror shell or casing. Typically, the exterior mirror assembly comprises a stalk or support arm or member of the mirror assembly that extends from the side of the vehicle to where the mirror shell is disposed.

The blind spot indicator may include a light source or illumination source (such as one or more light emitting diodes (LEDs) or the like), and may include a lens or other optic or light directing/guiding device or element or means or a light channel, conduit or means, or a light baffle or means, or a light louver or blind or means, or a light directing element or means, preferably at the mirror shell or casing (and substantially disposed therein so as not to overly protrude to create aerodynamic drag and so as to provide an aesthetically pleasing exterior appearance) for directing the light emitted by the light source toward the driver for viewing by the driver of the host vehicle and, if required, for limiting or restricting viewing by drivers of other vehicles.

Thus, the present invention provides an exterior rearview mirror assembly for a vehicle that includes a mirror shell portion and a blind spot or lane change assist (LCA) indicator. A cavity of the mirror shell portion is formed or defined at least partially by the walls of the shell portion. A variety of suitable mirror shells are known in the exterior mirror assembly art, such as skull-cap mirror shells (such as described in U.S. Pat. Nos. 6,612,708; 6,447,130 and 6,310,738), uni-body mirror shells, and the like. A reflective element is disposed within the cavity, along with any accessories or displays and associated adjustment device or actuator associated with the reflective element or mirror assembly. The mirror shell consists of an inner or inboard wall or side or portion that, when the mirror assembly is mounted at the side of the vehicle, preferably proximate to or at the driver or passenger side front door and proximate to or at the join of the door to the front portion of the vehicle body side (often referred to as the A-pillar region of the vehicle), the inner wall portion is at or near to the vehicle side body and readily viewable by the driver of the host vehicle. The mirror shell also includes an outer or outboard side or wall or portion that is further from the side of the vehicle and outward or outboard from the inner or inboard wall or portion. The mirror reflective element is disposed within the mirror shell and between the inner wall or portion or side and the outer wall or portion or side of the mirror shell. The blind spot or LCA indicator is located at the inboard or inner wall or side or portion of the mirror shell and, thus, is readily viewable by the driver of the host vehicle.

The mirror assembly is mounted to the body side of the vehicle (such as to a front door portion or to a vehicle body portion, depending on the particular application of the mirror assembly). The mounting portion of the mirror assembly often includes a stalk or mounting arm or member or support arm or member that extends from the mounting area of the vehicle body side to where the mirror shell is disposed. The mounting arm may extend from the vehicle body side by about an inch or more, and often about two to three inches or thereabouts, depending on the styling, type or size of the vehicle and associated exterior mirror assembly.

Note that, the inner portion of the driver side mirror assembly is most readily visible/viewable to the driver of the vehicle, as compared to the inner portion of the passenger side mirror assembly. The blind spot/LCA indicator of the present invention is thus highly suited for applications where the blind spot indicator is on the driver side only. However, it is envisioned that a blind spot/LCA indicator of the present invention may also or otherwise be located at the inner or inboard portion or wall or side of the passenger side exterior rearview mirror assembly, without affecting the scope of the present invention.

Therefore, the present invention provides a blind spot indicator at an inboard wall or portion of an exterior rearview mirror assembly. The blind spot indicator is located at an inboard wall or portion of the mirror casing or shell or at an inboard support arm or the like of the mirror assembly and, thus, is readily viewable by the driver of the host vehicle, and without the driver having to look across to the outboard dimension of the mirror reflective element to see or notice actuation or illumination of the blind spot indicator. The blind spot indicator thus may be readily viewable by the driver and may be so viewable without the driver having to look at the reflective element of the exterior mirror to see the blind spot indicator. Also, because the blind spot indicator is located at the inboard portion of the mirror assembly, the blind spot indicator is viewable principally or solely by the driver of the host vehicle, and is not readily viewable or visible to a driver of another vehicle. Because the blind spot indicator is not located at a primary viewing area, the curb-side appeal or appearance of the vehicle is not adversely impacted by the choice and styling of the blind spot indicator. Also, because the blind spot indicator of the present invention is not located behind a window in the reflective element, or behind a transflective portion of the reflective element, the blind spot indicator may be fixedly placed and may provide a low cost indicator that may be readily incorporated into an exterior rearview mirror assembly of a vehicle.

Figure 26:
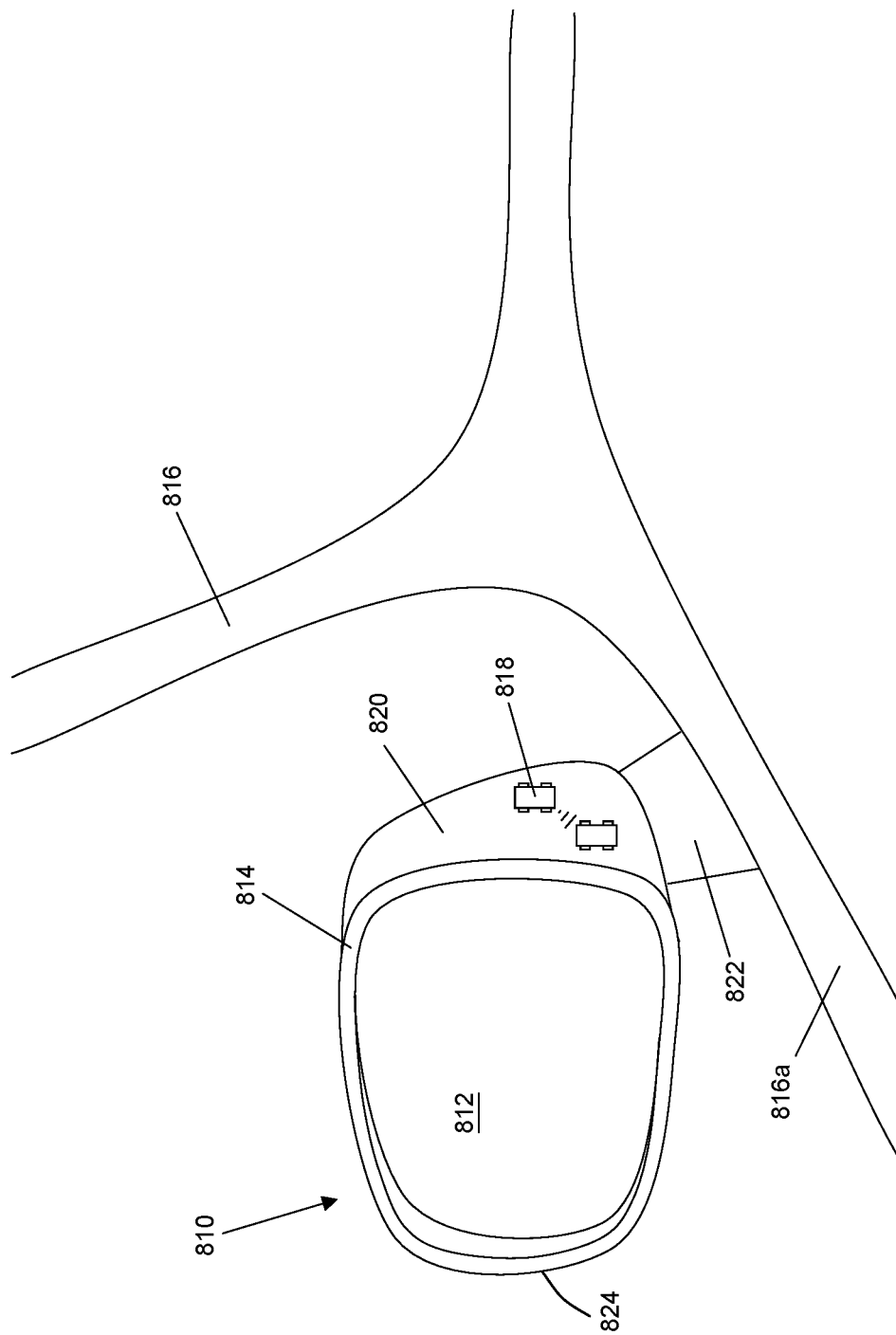
FIG. 26 is a perspective view of an exterior mirror assembly with a blind spot indicator in accordance with the present invention, shown with the indicator as an ISO icon.

As shown in FIG. 26, an exterior rearview mirror assembly 810 for a vehicle includes a reflective element 812 and a mirror shell or casing 814. Mirror assembly 810 is mounted at the side 816a of a host or subject vehicle 816, and includes a blind spot indicator 818 at an inboard portion 820 of mirror assembly 810. The blind spot indicator 818 is operable by illumination to indicate to the driver of the subject or host vehicle that an object or other vehicle is detected at the side or blind spot region of the host vehicle by a blind spot detection system, as discussed below. The indicator may be activated or energized in response to a detection of an object or other vehicle approaching or adjacent to the host vehicle in order to alert or warn the driver of the host vehicle not to attempt or initiate a lane change that moves the subject or host vehicle into the already occupied (or soon to be occupied) side lane or region adjacent either the driver side or the passenger side of the host vehicle.

Mirror assembly 810 is connected at the side 816a of vehicle 816 and includes a mounting arm or stem 822 or the like, which is mounted to or extends from the side 816a of vehicle 816. In the illustrated embodiment of FIG. 26, the inboard portion 820 of mirror assembly 810 comprises the inboard wall or side of the mirror shell or casing 814. The inboard portion or wall is at the inboard side of the mirror assembly and generally faces the side 816a of the vehicle 816. As can be seen in FIG. 26, the inboard portion 820 is spaced from and opposite from an outboard portion or side 824 of the mirror assembly 810.

Typically, side exterior rearview mirror assemblies for vehicles extend from the side of the vehicle and are angled to reduce aerodynamic drag and to provide an aesthetically pleasing appearance. Thus, the inboard portion of the exterior rearview mirror may be angled outwardly from the vehicle and thus slopes away from vehicle and provides a surface at which to mount/install the blind spot indicator, whereby the blind spot indicator is generally facing the driver of the host vehicle while being generally or substantially or entirely hidden from the view of drivers of other vehicles encountered by the host vehicle. Also, because the indicator is located at the inboard portion of the mirror shell or casing, the indicator may be selected to be substantially large, since the size of the indicator is not constrained by the field of view regulations of the mirror reflective element. The blind spot indicator of the present invention thus may be located at the mirror inboard wall or portion or side, which is contoured so that the wall or surface slopes away from the body side of the vehicle. By positioning the indicator at this location, the presence of the indicator at the inboard or inner wall or side of the exterior mirror is substantially or totally obscured from the view of drivers of trailing or side overtaking vehicles by the very body and structure of the exterior mirror. Also, because of the natural aerodynamic styling and structure of the inboard wall portion or section, operation of the blind spot indicator is substantially or totally non-viewable by the drivers of leading vehicles (traveling in front of the host vehicle) or vehicles approaching the host vehicle from in front of the host vehicle.

Blind spot/LCA indicator 818 may include an illumination or light source (such as one or more light emitting diodes (LEDs) or organic light emitting diodes (OLEDs) or the like that is/are energized to direct or emit illumination toward the driver of the host vehicle. The illumination source may be positioned within or behind the inboard wall or portion of the mirror assembly and the indicator may include an iconistic display area (such as transparent or substantially transparent or translucent windows or apertures formed or established at the inboard wall so that the illumination passes through the windows for viewing and discerning by the driver of the host vehicle). The iconistic display may be established or formed at a lens or element that attaches to the shell or casing or may be formed or established at the shell or casing wall itself. The indicator may include baffles or light piping or tubing or electroluminescent foil or other light direction means or occluding means, such as louvers or shutters or filters or light directing film or the like for directing or guiding the illumination from the illumination source at the desired angle and through the inboard wall or portion so as to be principally or solely viewable by the driver of the host vehicle. Because the blind spot indicator is located at an area or region that is not readily viewable by a person outside of the vehicle cabin, the indicator may be located at the surface of the inboard wall or portion (and may protrude partially therefrom), and need not be recessed within the casing surface, without adversely affecting the appearance of the exterior mirror assembly. The location and degree of recess or inset of the blind spot indicator may be selected depending on the particular application of the blind spot indicator and on the location of any internal mirror content (such as an actuator, security light or other indicators or accessories or the like) located within the mirror shell.

Figure 27:
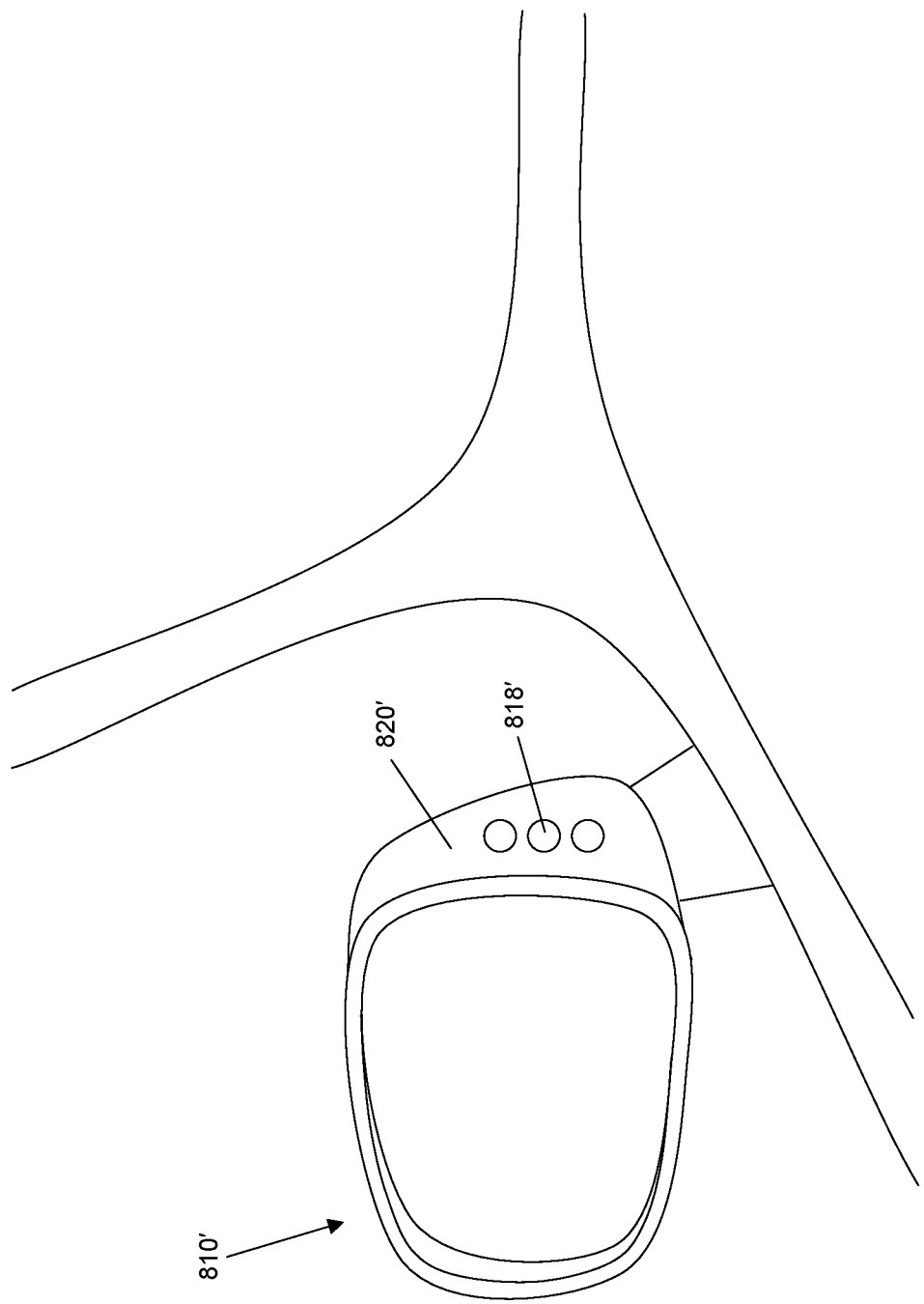
FIG. 27 is a perspective view of an exterior mirror assembly similar to FIG. 26, shown with the indicator as a multi-stage indicator.
Figure 27A:
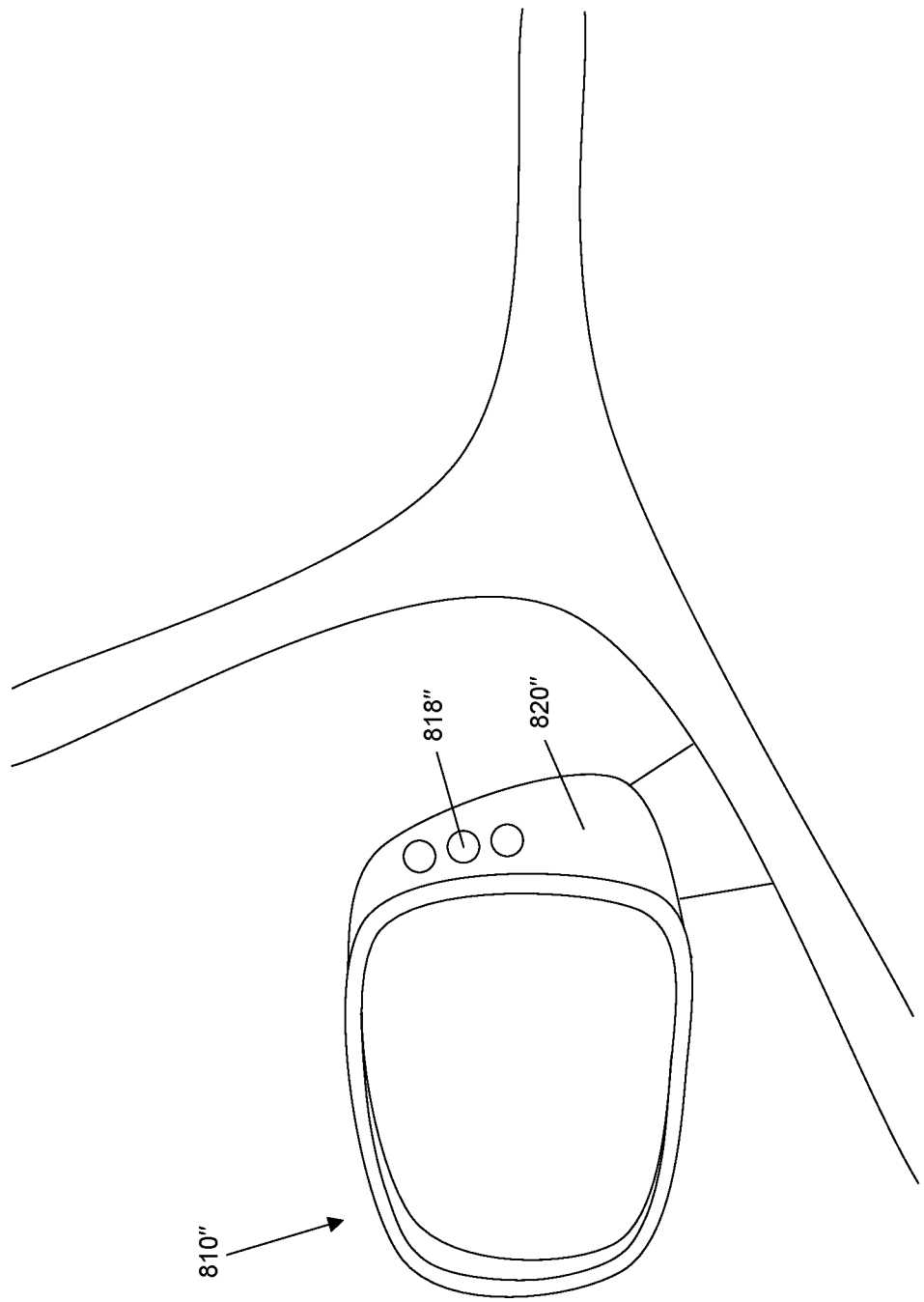
FIG. 27A is a perspective view of another exterior mirror assembly similar to FIG. 27, with the indicator located at an upper region of the inboard portion of the mirror assembly.
Figure 28:
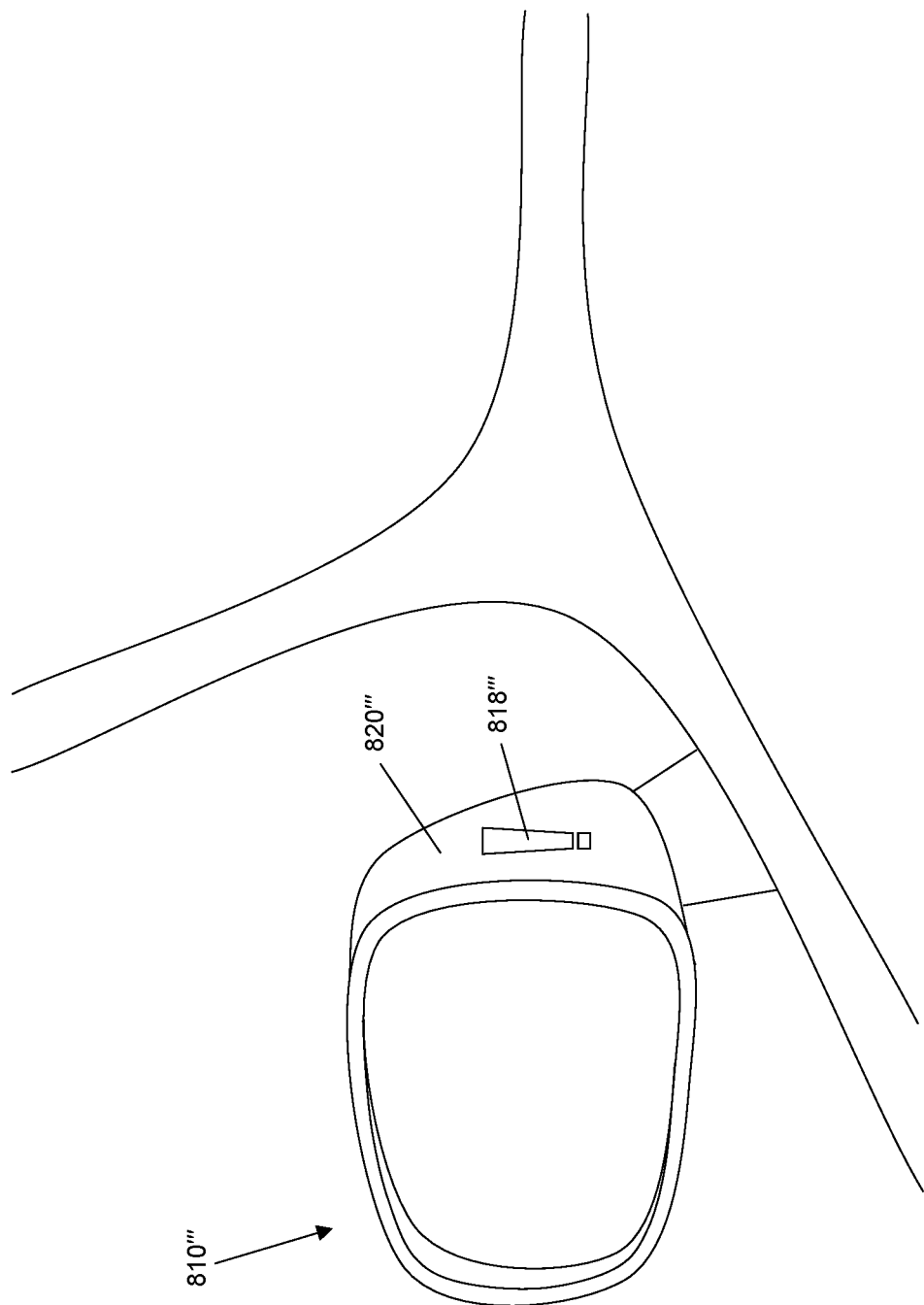
FIG. 28 is a perspective view of another exterior mirror assembly similar to FIG. 26, shown with the indicator as a hazard icon.

As shown in FIG. 26, blind spot indicator 818 may comprise an ISO icon (showing icons representing the host vehicle and another vehicle at the side and/or rearward of the host vehicle) to indicate to the driver of the host vehicle that another vehicle has been detected at the side and/or rearward of the host vehicle. The iconistic representation may be formed as a translucent window or portion of the inboard wall or portion or may be otherwise established at the inboard wall or portion of the mirror assembly. Optionally, however, the indicator may comprise other forms, without affecting the scope of the present invention. For example, and with reference to FIG. 27, a blind spot indicator or LCA indicator 818' of an exterior mirror assembly 810' may comprise a multi-stage indicator having multiple indicating portions or elements or devices for indicating a degree of hazard or the like of an object or vehicle detected alongside and/or rearward of the host vehicle. The indicating portions or elements or devices may comprise different color indicators, such as green, amber and red or the like, to indicate the degree of hazard detected. Such an indicator is suitable for use with a lane change assist (LCA) system, and may provide a green indication when the adjacent side lane is clear, an amber indication when a vehicle approaches the side lane area, and a red indication when another vehicle is occupying the side lane area adjacent to the host vehicle. As shown in FIG. 27, the blind spot indicator or LCA indicator 818' may be positioned at a lower region of the inboard portion 820' of the mirror assembly 810', or (and as shown in FIG. 27A), the blind spot indicator 818" may be positioned at an upper region of the inboard portion 20" of the mirror assembly 810" (where the indicator may be more readily visible/viewable to the driver of the host vehicle). Optionally, for example, and with reference to FIG. 28, a blind spot indicator 818''' of an exterior rearview mirror assembly 810''' may comprise a hazard indicator or the like at the inboard portion 820''' to provide a hazard indication or warning or alert signal to the driver of the host vehicle when an object or vehicle is detected at the side and/or rearward of the host vehicle, and when the driver of the host vehicle is attempting a lane change or the like (such as when the driver activates the turn signal of the host vehicle). Other iconistic images or indicia or the like may be used for the blind spot/LCA indicator, without affecting the scope of the present invention.

Figure 29:
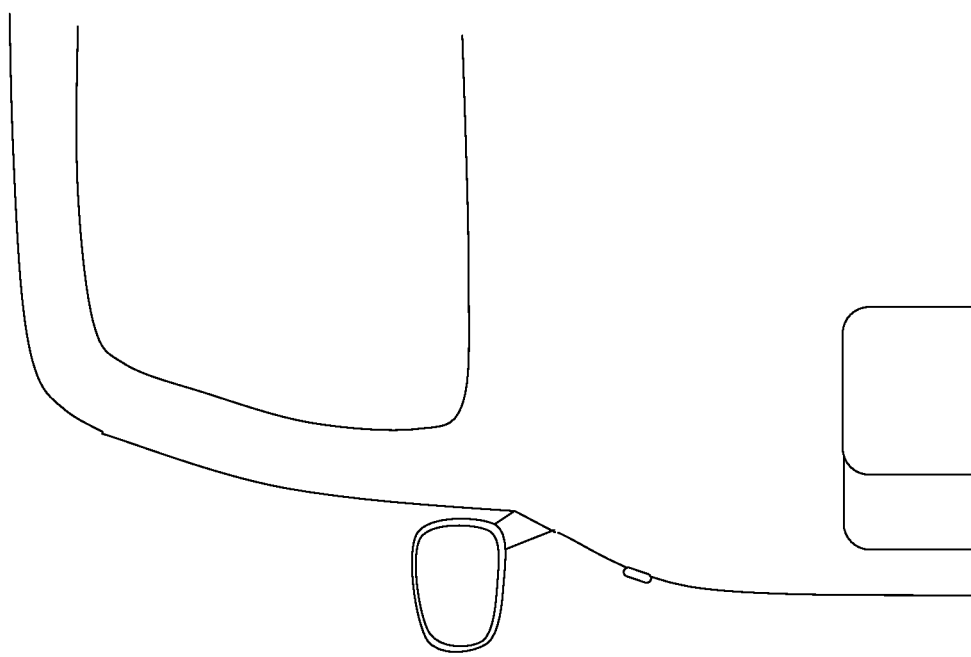
FIG. 29 is a perspective view of a vehicle with an exterior mirror assembly and blind spot indicator of the present invention, shown as the driver of a trailing vehicle may view the vehicle and exterior mirror assembly.
Figure 30:
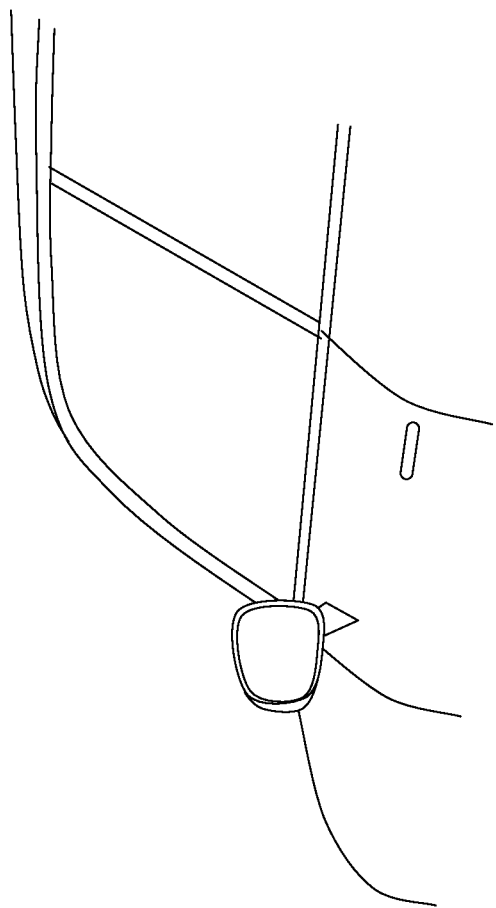
FIG. 30 is a perspective view of the vehicle of FIG. 29, shown as the driver of an overtaking vehicle may view the vehicle and exterior mirror assembly.

As can be seen in FIGS. 29 and 30, the blind spot indicator of the present invention is not readily viewable or discernible by a driver of a vehicle approaching the host vehicle from the rear of the host vehicle (as shown in FIG. 29) or a driver of a vehicle approaching and overtaking the host vehicle along a side of the host vehicle (as shown in FIG. 30). Although not shown, the blind spot indicator is also substantially not viewable by or visible to a driver of a vehicle ahead of or leading the host vehicle. The blind spot indicator of the present invention thus may be sufficiently large to enhance viewability and discernibility of the indicator by the driver of the host vehicle, without detracting from the appearance of the mirror assembly and without being readily viewable/discernible by the driver of another vehicle, thereby limiting or substantially precluding confusion (to the driver of the other vehicle) between a turn signal indicator (not shown) of the mirror assembly and the blind spot indicator.

Figure 31B:
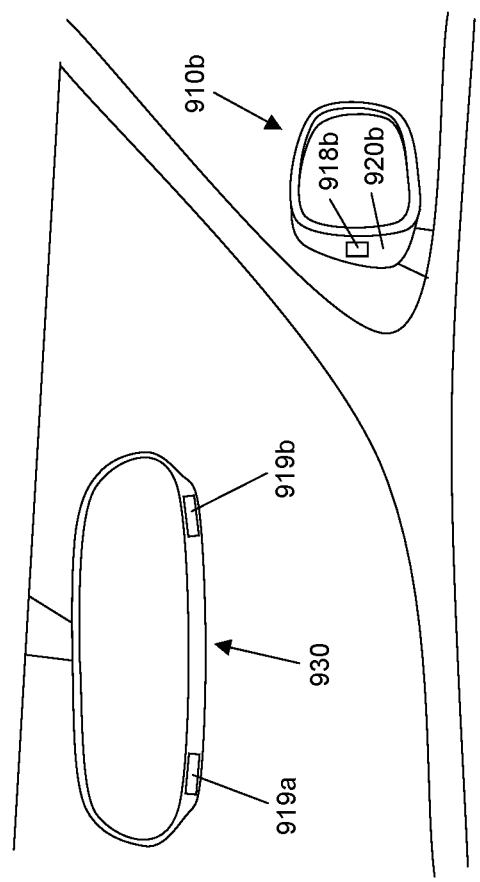
FIGS. 31A and 31B are perspective views of the driver and passenger side exterior mirror assemblies and of the interior rearview mirror assembly, with blind spot indicators in accordance with the present invention.
Figure 31A:
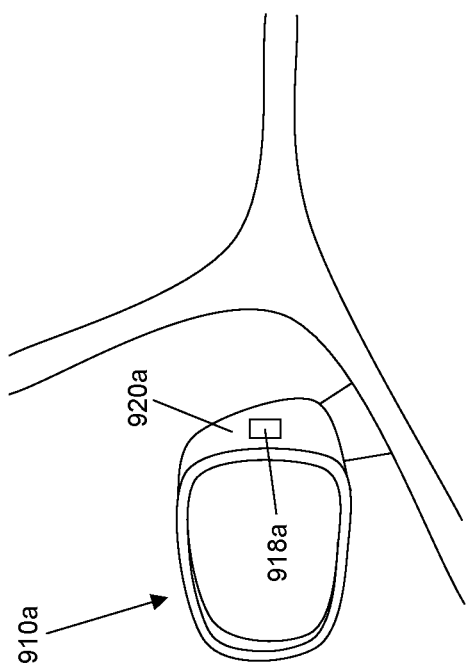

Although shown in FIGS. 26-30 and described above as being located at a driver side exterior mirror, the blind spot/LCA indicator of the present invention may also or otherwise be located at the passenger side exterior mirror, if desired. Optionally, the blind spot indicator of the present invention may be located at both the driver side mirror assembly and the passenger side mirror assembly of the host vehicle. The indicator at either side may be selectively activated or illuminated to indicate to the driver of the host vehicle that an object or other vehicle has been detected at that particular side lane region of the host vehicle. Optionally, the blind spot indicator may be associated with a blind spot detection and indication system that includes one or more indicators at the interior rearview mirror assembly of the host vehicle. For example, and with reference to FIG. 31, a blind spot indicator 918a may be located at an inboard portion or wall 920a of a driver side exterior rearview mirror assembly 910a, while a blind spot indicator 918b may be located at an inboard portion or wall 920b of a passenger side exterior rearview mirror assembly 910b. Also, an interior rearview mirror assembly 930 may include one or more indicators 919a, 919b that provide further indication to the driver of the host vehicle of a detection of an object or other vehicle at either side and/or rearward of the host vehicle, so that the driver of the host vehicle has a cognitive association of the indicators. The blind spot indicators may provide a redundant indication at both the interior and exterior mirrors in order to assist the driver in recognizing the conditions surrounding the host vehicle, such as by utilizing aspects of the blind spot detection system described in U.S. Pat. Nos. 6,198,409; 5,929,786 and 5,786,772.

Figure 32:
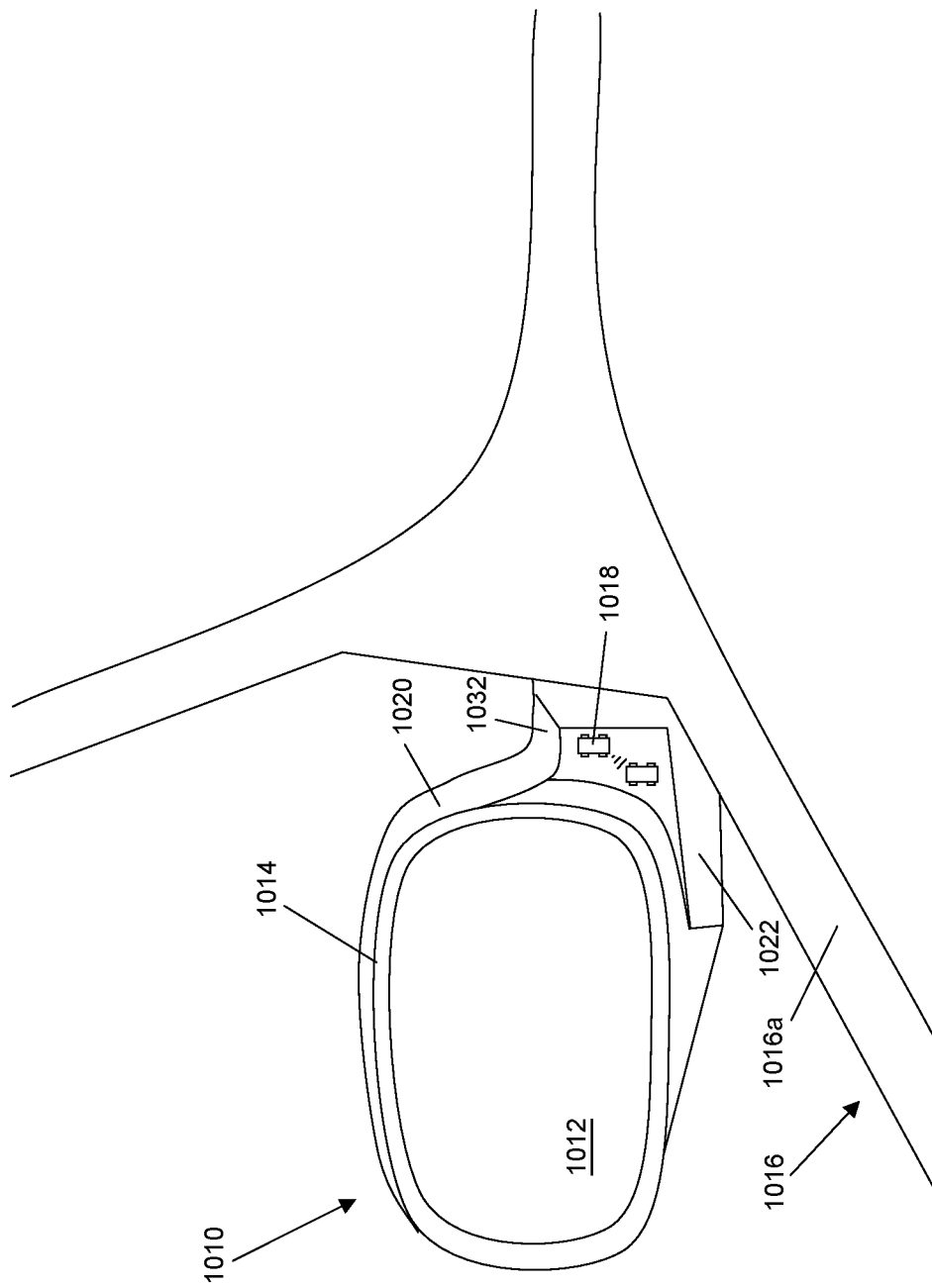
FIG. 32 is a perspective view of another exterior mirror assembly with a blind spot indicator in the support arm of the mirror assembly in accordance with the present invention, shown with the indicator as an ISO icon.

Optionally, and with reference to FIG. 32, an exterior rearview mirror assembly 1010 may include a reflective element 1012 and a mirror casing or shell 1014 supported on a mounting arm 1032 that is mounted to and/or that extends from the side 1016a of the host vehicle 1016. The blind spot indicator 1018 may be located at an inboard portion 1020 of the casing 1014, such as at a support arm or portion or stem 1032 of the casing which mounts to the mounting arm 1022. In the illustrated embodiment, the casing 1014 is pivotally mounted to the mounting arm 1022, such as for a powerfold exterior mirror or a breakaway exterior mirror or the like. The inboard portion 1020 thus may be positioned along the support arm and/or mounting portion (and preferably along a surface that is angled outwardly with respect to the vehicle side) so as to be directed generally toward the driver of the host vehicle and not readily viewable by drivers of other vehicles at or near the host vehicle.

Figure 33:
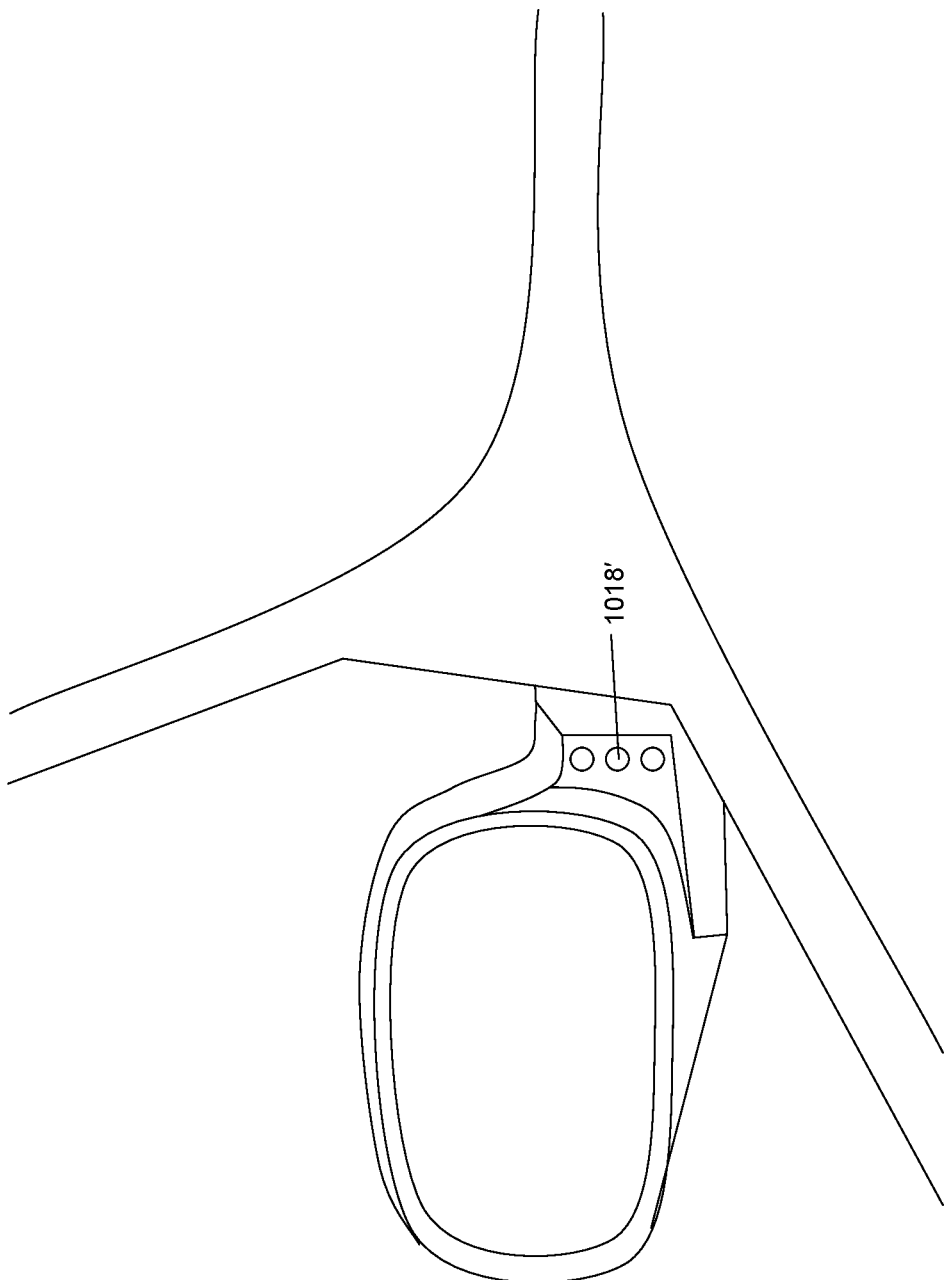
FIG. 33 is a perspective view of an exterior mirror assembly similar to FIG. 32, shown with the indicator as a multi-stage indicator.
Figure 34:
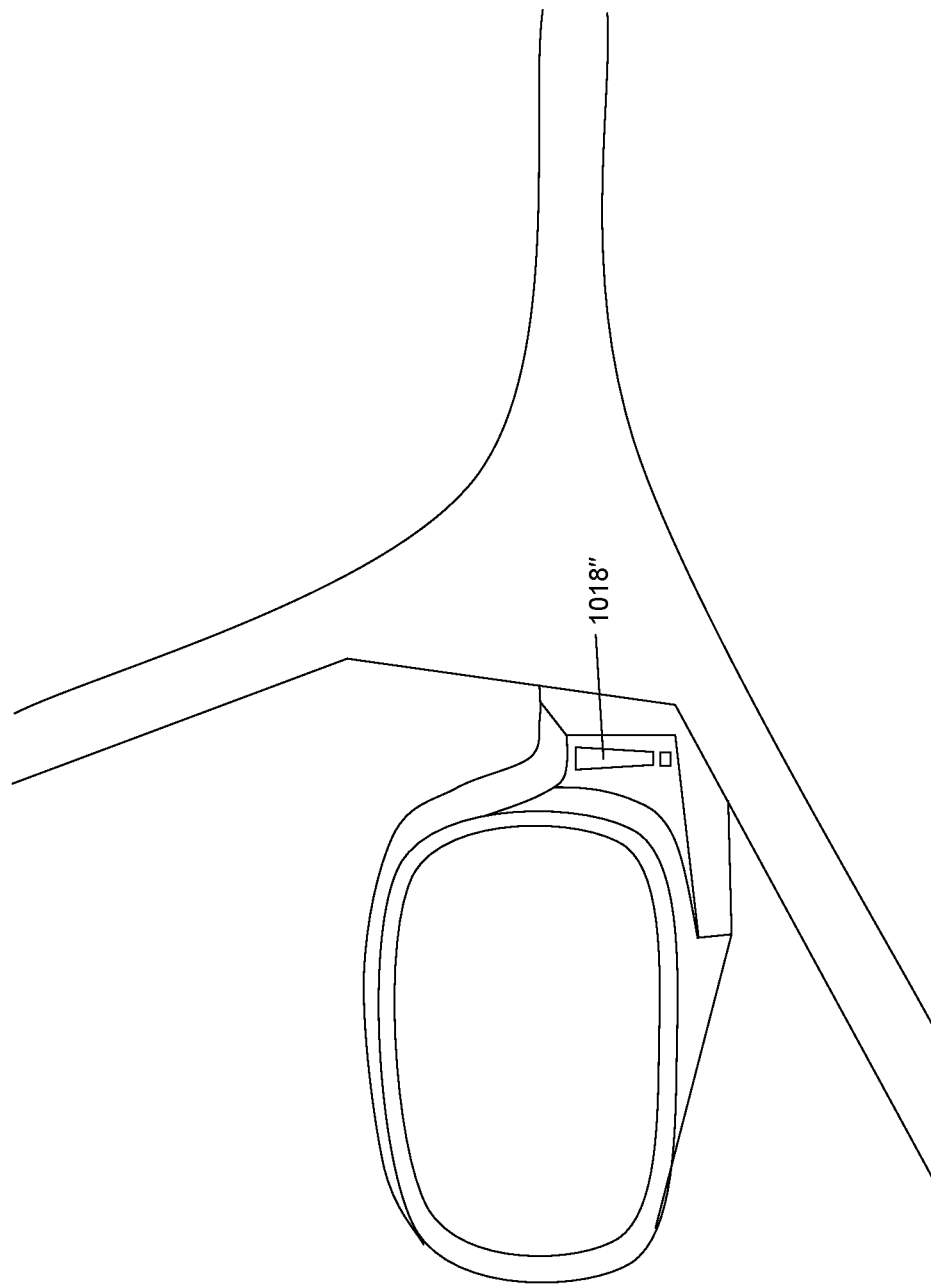
FIG. 34 is a perspective view of another exterior mirror assembly similar to FIG. 32, shown with the indicator as a hazard icon.

As shown in FIG. 32, the indicator 1018 may comprise an ISO indicator with the iconistic representation of the host vehicle and adjacent or approaching vehicle, such as described above with respect to FIG. 25. Optionally, and such as described above with respect to FIGS. 26 and 27, the blind spot indicator may comprise a multi-stage indicator 1018' (FIG. 33) or a hazard indicator 1018" (FIG. 34) at the support arm or stem of the mirror assembly.

Figure 35:
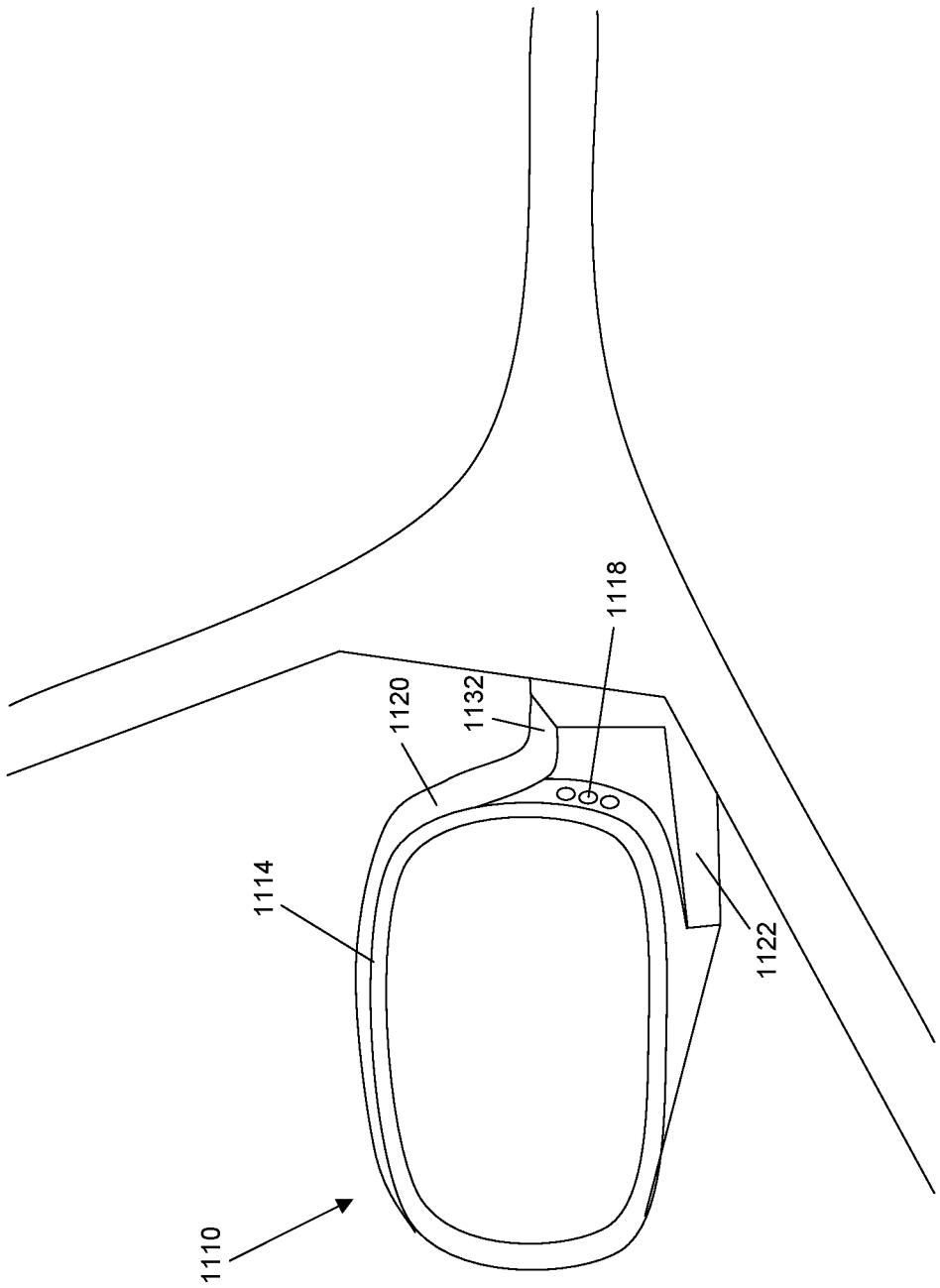
FIG. 35 is a perspective view of another exterior mirror assembly similar to FIG. 32, shown with a multi-stage indicator at the side of the mirror shell.
Figure 36:
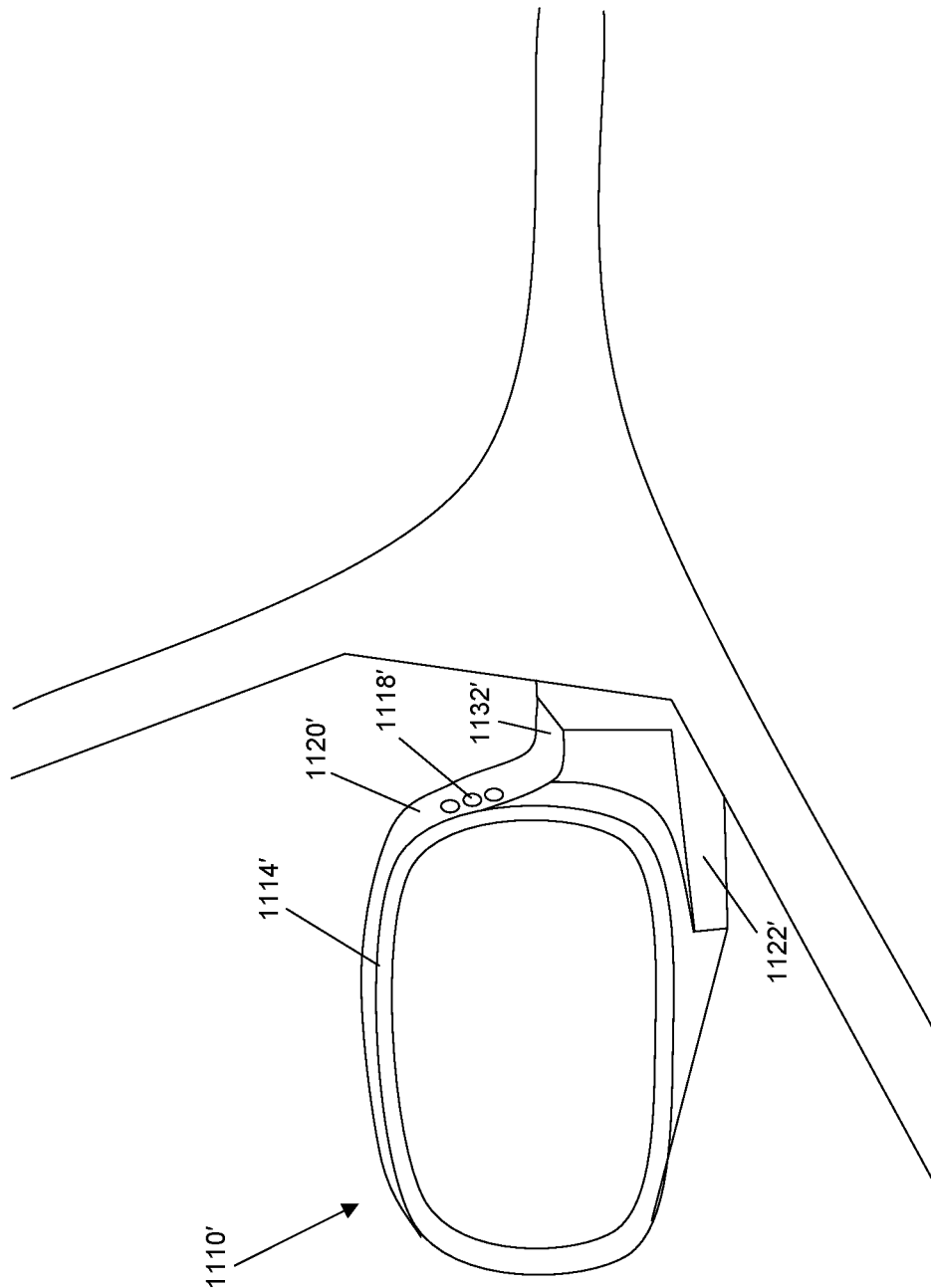
FIG. 36 is a perspective view of another exterior mirror assembly similar to FIG. with the indicator at the side of the mirror shell and above the support arm.
Figure 37A:
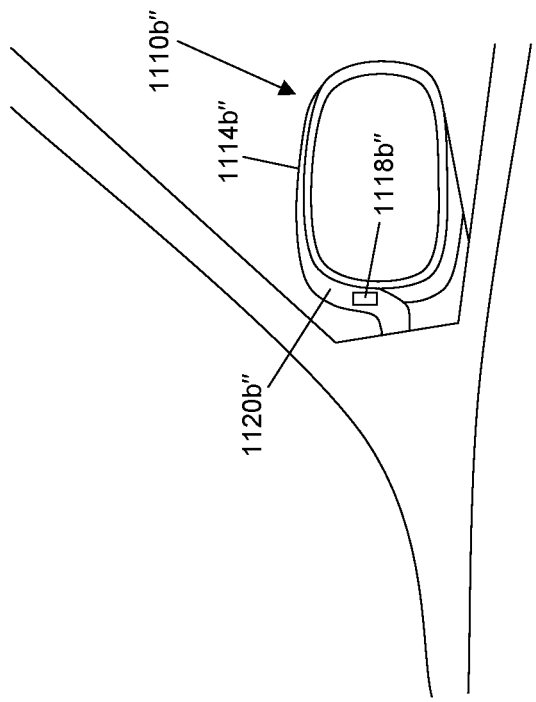
FIGS. 37A and 37B are perspective views of the driver and passenger side exterior mirror assemblies of a vehicle, with blind spot indicators in accordance with the present invention.
Figure 37B:
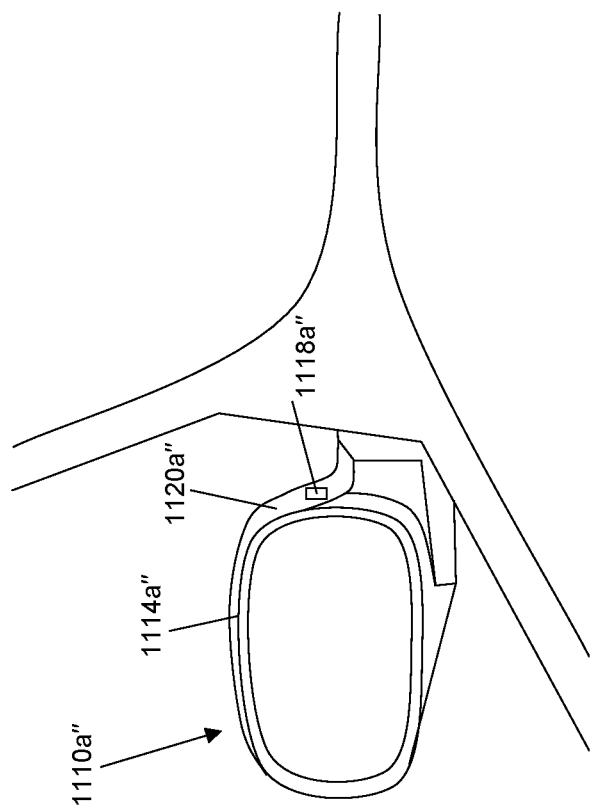

Optionally, and as shown in FIG. 35, the blind spot indicator 1118 (such as a multi-stage indicator or other type of indicator) may be located at the inboard wall 1120 of the mirror casing 1114 of an exterior mirror assembly 1110 and generally at or rearward of the support arm or stem 1132 (which mounts to a mounting arm or portion 1122 at the vehicle) of the casing 1114 (where the indicator is rearward of the support arm and thus facing generally rearwardly with respect to the forward direction of travel of the vehicle, and preferably on an outwardly angled portion so as to be facing partially inward toward the driver of the vehicle). The indicator thus is readily viewable by the driver of the host vehicle at the mirror casing and rearward of the support arm or stem of the mirror assembly. As shown in FIG. 36, the blind spot indicator 1118' may be located at the inboard portion 1120' of the casing 1114' of an exterior mirror assembly 1110' and generally above the support arm or stem 1132' (which mounts to the mounting arm or portion 1122'), if desired. The particular location of the blind spot indicator may be selected depending on the geometries and content of the mirror assembly and support arm and mounting portion of the mirror assembly and on the vehicle door design and/or the vehicle A-pillar design, so as to provide enhanced viewability and discernibility of the blind spot indicator to the driver of the host vehicle. As shown in FIGS. 37A and 37B, a blind spot indicator 1118a" may be located at the inboard portion 1120a" of the casing 1114a" of a driver side exterior mirror assembly 1110a", while a blind spot indicator 1118b" may be located at the inboard portion 1120b" of the casing 1114b" of a passenger side exterior rearview mirror assembly 1110b", so that the indicators 1118a", 1118b" are readily viewable and discernible by the driver of the host vehicle while being substantially non-viewable to drivers of other vehicles at or near or trailing or approaching or overtaking or leading the host vehicle.

Optionally, the blind spot indicator or LCA indicator of the present invention may be provided as an indicator module that is a unitary module including an illumination source, electrical connectors and cover and/or light directing or guiding elements or means. The unitary indicator module is preferably sealed so as to be substantially impervious to water so as to provide a robust module that can withstand the exposure to the elements at the exterior rearview mirror assembly. The mirror assembly may be formed with a cavity or opening for receiving or attaching the unitary indicator module therein or thereat, and may include the electrical connectors at the cavity or opening for making the appropriate electrical connections to the indicator module. Optionally, the electrical connections may be made while the indicator module is attached to the mirror assembly, such as via a plug and socket type arrangement or configuration, and such as by utilizing aspects of the mirror assembly described in U.S. Pat. No. 6,669,267. The unitary indicator module may include or utilize aspects of various light modules or systems or devices, such as the types described in U.S. Pat. Nos. 6,227,689; 6,582,109; 5,371,659; 5,497,306; 5,669,699; 5,823,654; 6,176,602 and/or 6,276,821.

The unitary indicator module thus may be readily installed at an exterior mirror assembly to provide the blind spot/LCA indicator at the inboard wall or portion of the exterior mirror. The blind spot detection system (and thus the blind spot indicator) thus may be selected by a customer as an option for their vehicle. Optionally, the exterior mirror assembly may be shipped to a vehicle assembly plant with the module already installed, or the exterior mirror assembly may be shipped to the vehicle assembly plant with a socket or structure for receiving or mounting or attaching the indicator module. The indicator module may be connected or plugged in or otherwise attached to the mirror assembly at the socket or structure at the vehicle assembly plant. The indicator module may make both the mechanical and electrical connections to the mirror assembly when attached thereto, such as by utilizing aspects described in U.S. Pat. No. 6,669,267. The indicator module thus may be installed at the appropriate mirror assembly (such as for a vehicle that has the blind spot indicator selected as an option) at the vehicle assembly plant, while a blank out panel or the like may be attached to the mirror assembly for vehicles that do not have the blind spot indicator option selected. Because the blind spot indicator and associated electronics may be costly, the indicator module allows the indicator to be added to the exterior mirror only for those vehicles with the indicator option selected, and without affecting the mirror assembly structure and design, so that a common mirror shell may be utilized for a standard mirror and for a mirror with the indicator option selected, thereby deproliferating parts and providing economies of scale for the mirror assemblies.

The blind spot indicator of the present invention thus is positioned at the inboard portion of the exterior mirror and thus is positioned at an area that is readily viewable by the driver of the host vehicle. Because an exterior rearview mirror for a vehicle is formed to be angled for aerodynamic and aesthetic purposes, the exterior rearview mirror typically has an inboard portion or wall that is contoured or formed to be sloping outwardly and away from the vehicle, so as to provide a wall that is generally facing toward the driver of the vehicle so that the portion is readily viewable by the driver of the vehicle. This outwardly sloping portion or wall provides a location for the blind spot/LCA indicator of the present invention, where the indicator is readily viewable by the driver of the host vehicle, but is substantially hidden from the view of drivers of other vehicles at or near the host vehicle. Since the inboard wall or side or portion is not a primary viewing area, the blind spot indicator may be located at this portion without adversely affecting the styling lines and appearance of the mirror assembly. Optionally, a cowling or cover element or dome element or baffle or louver or the like may be provided at the mirror shell or support arm to further restrict the view of the indicator by drivers of other vehicles.

Typically, the mirror reflective element is recessed slightly within the cavity of the mirror shell, and it is not uncommon to have water beads, dirt, ice and the like build up in that area, since that area is sheltered from and is not directly exposed to the wind or slip stream as the vehicle travels along the road. By placing the indicator at the inboard wall or portion of the exterior mirror, the indicator is located in the slip stream and thus is exposed to the wind as the vehicle travels along the road. The blind spot indicator thus may be more visible to the driver of the host vehicle, since ice buildup and/or debris build up is less likely in this area and since any water or ice or dirt or other debris or contaminants are often blown away from where the indicator is located, thus enhancing its visibility to the driver. Also, because the blind spot indicator is closer to the window (through which the driver views the indicator), the indicator is more readily viewable in fog or hazy conditions or other extreme weather conditions, such as during a snow storm or rain storm or the like, even if the driver cannot readily view the mirror reflective element of the exterior mirror.

The blind spot indicator thus is positioned at a location that is closer than conventional or known external indicators (which are typically located at the outboard upper corner of the reflective element) may be seen and discerned by the driver of the host vehicle even when the driver is not viewing the reflective element of the exterior rearview mirror. Because the blind spot indicator is located at the side or inboard portion of the mirror assembly or casing, the blind spot indicator may be relatively large (such as compared to indicators at the reflective element) to enhance viewing of the indicator, since the size of the indicator is not limited by the viewing requirements at the reflective element. For example, the blind spot indicator of the present invention may provide a viewing area dimension of preferably at least about one square centimeter, and more preferably at least about two square centimeters, and more preferably at least about four square centimeters. The size of the blind spot indicator thus may be selected to provide a desired viewing area, and is less fettered by the design constraints and regulations of the exterior mirror.

The blind spot indicator thus may be sized to provide the desired appearance and viewability/discernibility and may be positioned at the inboard portion in a manner that does not interfere with the movable parts of the exterior mirror assembly. Also, by locating the blind spot indicator at the inboard portion of the exterior rearview mirror assembly, the indicator is naturally occluded by the exterior mirror from the view of the driver of another vehicle or any other person outside of the host vehicle. The blind spot indicator of the present invention thus may be provided at the desired size, shape and location, and thus provides the potential for enhanced flexibility in the design and implementation of the blind spot indicator, since the size, shape and design of the indicator is not constrained by the regulations and limitations otherwise applicable at the reflective element of the exterior mirror.

The blind spot indicator preferably is fixedly positioned at the inboard portion of the mirror assembly (such as substantially within the mirror shell and visible at the inner shell wall adjacent to the driver side or passenger side front window, depending on whether it is a driver side or pass side mirror). However, it is envisioned that the blind spot indicator may be adjustable (such as via a user input within the vehicle cabin) to direct the indicator toward the particular driver's head area. The indicator may be adjusted by the driver of the host vehicle to enhance viewing of the indicator by the driver. The indicator may be adjusted separately from any adjustment of the reflective element so that the indicator may be adjusted toward the driver's head area and irrespective of the desired adjustment of the reflective element of the exterior rearview mirror. The indicator and any adjustment or alignment thereof may utilize aspects of the alignment device described in U.S. Pat. No. 6,598,982.

Figure 38:
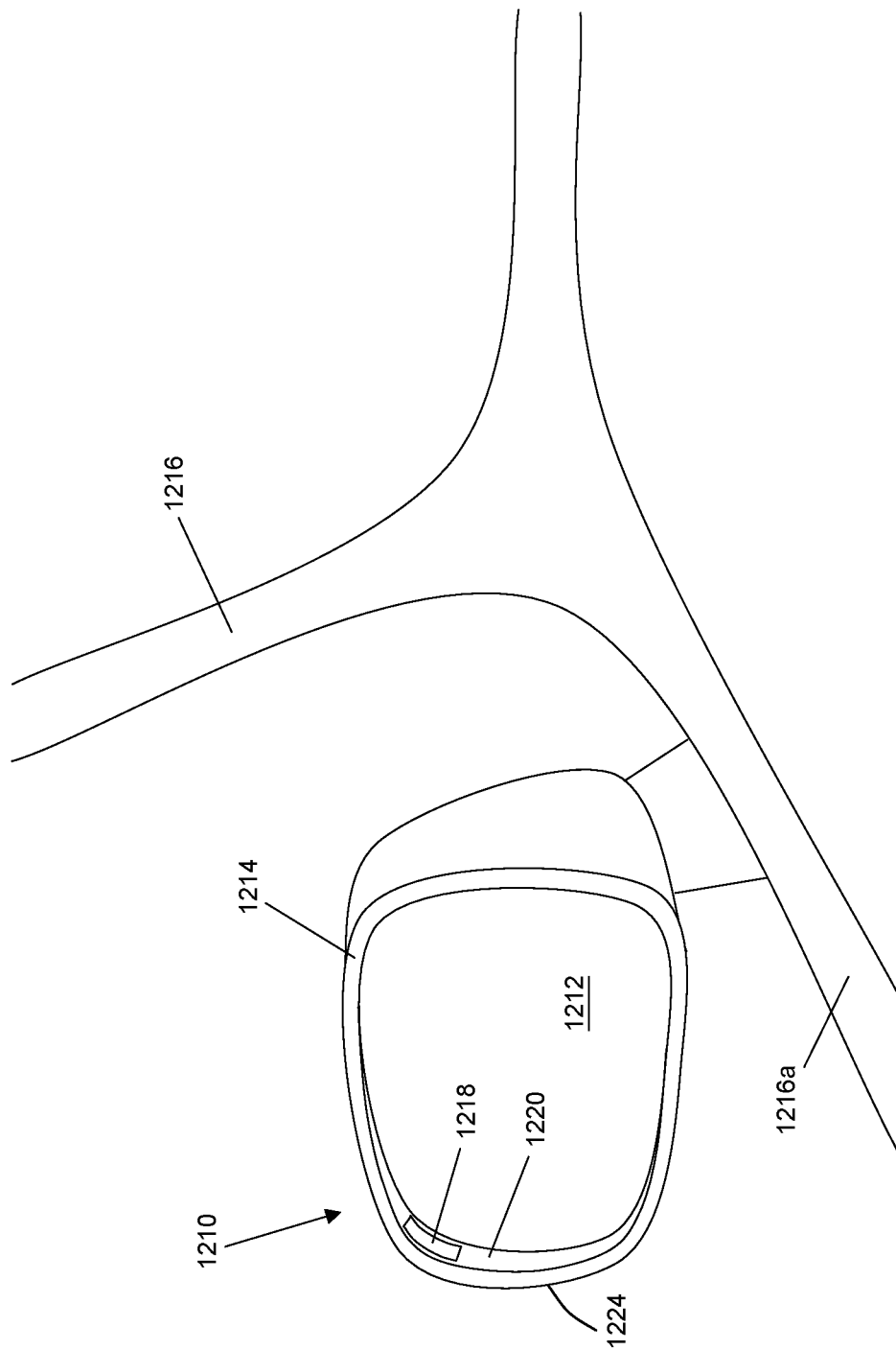
FIG. 38 is a perspective view of another exterior mirror assembly with a blind spot indicator in accordance with the present invention.

Optionally, and with reference to FIG. 38, an exterior rearview mirror assembly 1210 for a vehicle includes a reflective element 1212 and a mirror shell or casing 1214. Mirror assembly 1210 is mounted at the side 1216a of a host or subject vehicle 1216, and includes a blind spot indicator 1218 at an inboard portion or surface 1220 of an outer wall 1224 of the mirror casing 1214 of mirror assembly 1210. The blind spot indicator 1218 thus may be located at a cusp or inboard surface of the outer wall 1224 of mirror casing 1214 so as to be readily viewable by the driver of the host vehicle, while being substantially hidden or not viewable by the driver of another vehicle at or near or approaching the host vehicle. The blind spot indicator 1218 thus is located at a region that is remote from the reflective element of the mirror assembly so as to limit or substantially preclude confusion between the blind spot indicator and any display or indicator (such as a turn signal display or the like) that is located at the reflective element of the mirror assembly (and thus that may be intended for viewing by the driver of another vehicle).

The blind spot indicator thus is operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or ultrasonic sensor or sensors, or sonar sensor or sensors or the like. For example, the blind spot detection system may utilize aspects of the blind spot detection and/or imaging systems described in U.S. Pat. Nos. 6,882,287; 6,198,409; 5,929,786 and/or 5,786,772, and/or U.S. patent application Ser. No. 10/427,051, filed Apr. 30, 2003, now U.S. Pat. No. 7,038,577, and/or U.S. provisional applications, Ser. No. 60/638,687, filed Dec. 23, 2004; Ser. No. 60/628,709, filed Nov. 17, 2004; Ser. No. 60/614,644, filed Sep. 30, 2004; and/or Ser. No. 60/618,686, filed Oct. 14, 2004, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003, now U.S. Pat. No. 7,005,974, and/or of the automatic headlamp controls described in U.S. Pat. Nos. 5,796,094 and/or 5,715,093; and/or U.S. patent application Ser. No. 11/105,757, filed Apr. 14, 2005, now U.S. Pat. No. 7,526,103; and/or U.S. provisional application Ser. No. 60/607,963, filed Sep. 8, 2004, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999, now U.S. Pat. No. 7,339,149, and/or PCT Application No. PCT/US2003/036177 filed Nov. 14, 2003, published Jun. 3, 2004 as PCT Publication No. WO 2004/047421, with all of the above referenced U.S.

patents, patent applications and provisional applications and PCT applications being commonly assigned.

Optionally, the indicator of the present invention may alert the driver of the host vehicle of other situations or status or the like. For example, the indicator could function to alert the driver of the host vehicle that the brake lights of the host vehicle are functioning properly. Other applications or uses of the indicator may be implemented, without affecting the scope of the present invention.

The reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346, 5,724,187; 5,668,663; 5,910,854; 5,142,407 and/or 4,712,879, and/or U.S. patent application Ser. No. 10/054,633, filed Jan. 22, 2002, now U.S. Pat. No. 7,195,381; and/or Ser. No. 11/021,065, filed Dec. 23, 2004, now U.S. Pat. No. 7,255,451, and/or U.S. provisional applications, Ser. No. 60/695,149, filed Jun. 29, 2005; Ser. No. 60/690,400, filed Jun. 14, 2005; Ser. No. 60/681,250, filed May 16, 2005; and/or Ser. No. 60/692,113, filed Jun. 20, 2005, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990). The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9, 2003 and published Apr. 1, 2004 as International Publication No. WO 2004/026633.

Optionally, use of an elemental semiconductor mirror, such as a silicon metal mirror, such as disclosed in U.S. Pat. Nos. 6,286,965; 6,196,688; 5,535,056; 5,751,489 and 6,065, 840, and/or in U.S. patent application Ser. No. 10/993,302, filed Nov. 19, 2004, now U.S. Pat. No. 7,338,177, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element 12 includes a perimeter metallic band, such as the types described in PCT Application No. PCT/US03/29776, filed Sep. 19, 2003 and published Apr. 1, 2004 as International Publication No. WO 2004/026633; and/or PCT Application No. PCT/US03/ 35381, filed Nov. 5, 2003 and published May 21, 2004 as International Publication No. WO 2004/042457; and/or U.S. patent application Ser. No. 11/021,065, filed Dec. 23, 2004, now U.S. Pat. No. 7,255,451; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004. Optionally, the reflective element may include indicia formed at and viewable at the reflective element, such as by utilizing aspects of the reflective elements described in U.S. provisional applications, Ser. No. 60/695,149, filed Jun. 29, 2005; Ser. No. 60/690,400, filed Jun. 14, 2005; and/or Ser. No. 60/681,250, filed May 16, 2005.

Although shown and described as an electro-optic or electrochromic reflective element assembly or cell, the reflective element may comprise a single substrate with a reflective coating at its rear surface, without affecting the scope of the present invention. The mirror assembly thus may comprise a prismatic mirror assembly or other mirror having a single substrate reflective element, such as a mirror assembly utilizing aspects described in U.S. Pat. Nos. 6,318, 870; 6,598,980; 5,327,288; 4,948,242; 4,826,289; 4,436,371 and 4,435,042; and PCT Application No. PCT/US04/ 015424, filed May 18, 2004 and published Dec. 2, 2004 as International Publication No. WO 2004/103772; and U.S. patent application Ser. No. 10/933,842, filed Sep. 3, 2004, now U.S. Pat. No. 7,249,860. Optionally, the reflective element may comprise a conventional prismatic or flat reflective element or prism, or may comprise a prismatic or flat reflective element of the types described in PCT Application No. PCT/US03/29776, filed Sep. 19, 2003 and published Apr. 1, 2004 as International Publication No. WO 2004/026633; U.S. patent application Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177, and/or PCT Application No. PCT/US2004/015424, filed May 18, 2004 and published Dec. 2, 2004 as International Publication No. WO 2004/ 103772, without affecting the scope of the present invention.

Optionally, the mirror assembly may include one or more displays, such as the types disclosed in U.S. Pat. Nos. 5,530,240 and/or 6,329,925, and/or display-on-demand or transflective type displays, such as the types disclosed in U.S. Pat. Nos. 6,690,268; 5,668,663 and/or 5,724,187, and/ or in U.S. patent application Ser. No. 10/054,633, filed Jan. 22, 2002, now U.S. Pat. No. 7,195,381; and/or Ser. No. 11/021,065, filed Dec. 23, 2004, now U.S. Pat. No. 7,255, 451; and/or PCT Application No. PCT/US03/29776, filed Sep. 9, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/ 042457; and/or U.S. provisional applications, Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; and Ser. No. 60/563,342, filed Apr. 19, 2004, and/or PCT Application No. PCT/US03/40611, filed Dec. 19, 2003 and published Jul. 15, 2004 as International Publication No. WO 2004/058540, or may include or incorporate video displays or the like, such as the types described in PCT Application No. PCT/US03/40611, filed Dec. 19, 2003 and published Jul. 15, 2004 as International Publication No. WO 2004/058540, and/or U.S. provisional applications, Ser. No. 60/630,061, filed Nov. 22, 2004; and Ser. No. 60/667,048, filed Mar. 31, 2005.

Optionally, the mirror assembly may include an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023 and 6,498,620, and U.S. patent application Ser. No. 09/441,341, filed Nov. 16, 1999, now U.S. Pat. No. 7,339,149, and Ser. No. 10/427,051, filed Apr. 30, 2003, now U.S. Pat. No. 7,038,577.

Figure 17:
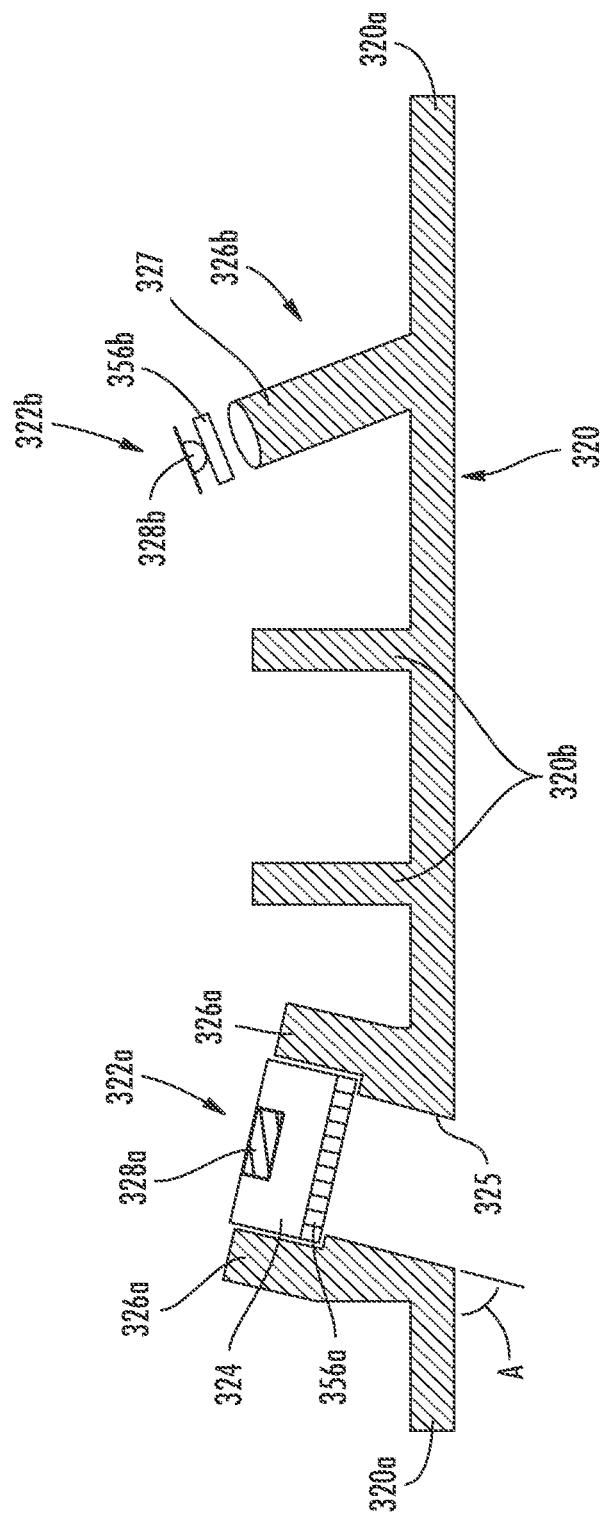
FIG. 17 is a sectional view of another back plate and indicator modules in accordance with the present invention.

Optionally, and with reference to FIG. 17, a back plate 320 may be formed (such as via injection molding) to include the mirror actuator attachment portion 320b, an indicator mounting or receiving portion 326a and a second indicator mounting or receiving portion 326b. As can be seen in FIG. 17, indicator receiving portion 326a is formed to receive a signal indicating module 322a such that light emanating from indicating module 322a is transmitted through a passageway 325 of indicator receiving portion 326a. Signal indicating module 322a may be similar to the signal indicating modules described above, and may include a translucent diffusing block or glow element 324 and an illumination source 328a (such as at a rear portion of the block or at a side portion of the block) that emits light into the block, whereby the light reflects off of the sides and rear of the block and is transmitted along the passageway 325 of indicator receiving portion 326a and toward the reflective element. Likewise, signal indicating module 322b may be similar to signal indicating module 222b discussed above, and may include an illumination source or LED 328b at a passageway along a hollow tube 327 of indicator mounting portion 326b. Preferably, signal indicating module 322a includes a light control film 356a at a forward surface of the glow block or indicating light source 324 to direct the substantially uniform diffuse light emanating from block 324 in a direction generally along passageway 325 of indicator receiving portion 326a. Likewise, the signal indicating module 322b may include a light control film 356b for directing light emitted by illumination source 328b toward and along the passageway of the hollow tube 327 of indicator mounting portion 326b.

The depth or length (or rearward extending dimension) of the indicator receiving portion 326a may be selected to provide the desired degree of shielding or blocking the viewability of light emanating from the indicator module by the driver of the vehicle and to provide the desired viewability of light emanating from the indicator module by the driver of another vehicle when the illumination source of the indicator module is activated, while limiting viewability of the indicator module when the illumination source is deactivated (desirable for example for a turn signal indicator). For example, the indicator receiving portion may extend about 40 mm (or more or less) rearward from the rear surface of the planar back plate portion 320a. Likewise, the angle of the passageway 325 may be selected depending on the particular application of the indicator module. For example, the passageway may be slanted so as to allow light to pass therethrough at an angle A of about 65 degrees (or more or less, such as plus or minus about 5 degrees or thereabouts) relative to the generally vertical plane of the planar back plate portion and reflective element (i.e., about 25 degrees outboard from a line extending perpendicularly from the plane of the planar back plate portion and reflective element), so that the axis formed by the slats or baffles or vanes is generally pointed away from the side of the vehicle (such as for a turn signal indicator application). Optionally, if it is desired, for example, to provide a blind spot indicator or LCA indicator, the passageway of the indicator receiving portion may be slanted so as to allow light to pass therethrough at an angle of about 65 degrees (or more or less, such as plus or minus about 5 degrees or thereabouts) relative to the generally vertical plane of the planar back plate portion and reflective element (i.e., about 25 degrees inboard from a line extending perpendicularly from the plane of the planar back plate portion and reflective element), so that the axis formed by the slats or baffles or vanes is generally pointed toward the side of the vehicle so that the light emanating from the indicator module is viewable by the driver of the host vehicle.

Optionally, and as shown in FIG. 18, a back plate 320' may be molded to include a mirror actuator mounting portion 320b', an indicator receiving or mounting portion 326a' for receiving or mounting a signal indicating module 322a', and another indicator receiving or mounting portion 326b' for receiving or mounting a signal indicating module 322b'. In the illustrated embodiment, the indicator mounting portion 326a' and signal indicating module 322a' are substantially similar to the indicator mounting portion 326a and signal indicating module 322a, discussed above, such that a detailed discussion of the mounting portions and indicating modules need not be repeated herein. Suffice it to say that indicating module 322a may include an optical block or glow element 324a' and at least one illumination source 328a' (such as a power LED) at the block, such as described above.

Likewise, the indicator mounting portion 326b' and signal indicating module 322b' may be similar in construction to the mounting portion 326a' and indicating module 322a' (although signal indicating module 322b' is shown in FIG. 18 with two illumination sources or LEDs 328b at the rear of the translucent optical block or glow element 324b'), but may be angled at a generally opposite direction as the indicating module 322a' and mounting portion 326a'. For example, indicating module 322a' may be configured so as to direct light (such as via the light control film 356a' and passageway 325a') in an outboard direction (generally away from the vehicle when the mirror assembly is mounted at the vehicle), such as for a turn signal indicator (whereby the transparent/translucent optical plastic block or glow element may be formed in the shape of an arrow head or a chevron or other suitable icon or shape), while indicating module 322b' may be configured so as to direct light (such as via the light control film 356b' and passageway 325b') in an inboard direction (generally toward the vehicle when the mirror assembly is mounted at the vehicle), such as for a blind spot alert indicator. Because the signal indicating modules 322a', 322b' and indicator mounting portions 326a', 326b' may be similar to the modules and mounting portions described above, a detailed discussion of the modules and mounting portions need not be repeated herein.

The light control film disposed at the indicator module may be disposed or adhered otherwise attached to the translucent block or to the rear surface of the respective indicator receiving portion so that light emanating from the block or illumination source is directed through the light control film and directed along and through the passageway established through the respective indicator receiving portion. The light control film may comprise any suitable film and may function as microlouvers, so as to preferentially direct light that is received from one angle whereby the light is redirected or controlled to another direction (such as the films of the types described in PCT Application No. PCT/US2006/018567, filed May 15, 2006 and published Nov. 23, 2006 as International Publication No. WO 2006/124682, which is hereby incorporated herein by reference in its entirety). An example of a suitable light control film or material is disclosed in U.S. Pat. No. 5,481,409 (which is hereby incorporated herein by reference in its entirety), and may comprise a light control film manufactured by the 3M Company of Minn., such as the light control film commercially available under the trade name LCF-P (light control film-polycarbonate).

Such a light control film comprises a thin plastic film enclosing a plurality of closely spaced, light black colored microlouvers. A preferred light control film is approximately 0.75 mm thick or thereabouts, and the angled microlouvers are spaced approximately 0.127 mm apart. The microlouvers may be in various angular positions to provide a particular viewing angle, such as from as narrow as about a 48 degree angle to as wide as about a 90 degree angle, depending on the desired angle of the microlouvers for the particular application for angling/directing the light in a desired or appropriate direction or angle. Thus, the light control film controls or directs the light emanating from the block along a desired or appropriate or predetermined angle with respect to the back plate and mirror substrate or reflective element, and helps assure that the driver of the host vehicle is largely unaware or not bothered by actuation of the turn signal indicating light sources.

The likes of a 3M Light Control Film comprises a thin plastic film containing closely spaced dark or black or light absorbing microlouvers. When used as described herein, the film simulates a tiny Venetian blind, wherein the microlouvers allow for controlled transmission of the light emitted by the indicator light sources (that are disposed behind the transflective mirror element) along the axis of the microlouvers so that the light is seen by drivers overtaking the host vehicle in a side-lane blind spot area but the line of sight from the driver of the host vehicle to the turn signal indicator's emitted light beam is substantially blocked by the microlouvers. Examples of light directing or regulating filters or baffle assemblies can be found in U.S. Pat. Nos. 4,906,085 and 5,313,335, the entire disclosures of which are hereby incorporated by reference herein.

Optionally, and typically, the light control film may have its microlouvers at an angle of about zero degrees (i.e., generally perpendicular to the plane of the light control film) so as to direct the principle beam axis of the light emitted by the illumination sources at the desired or appropriate angle established by the angling of the rear surface of the display receiving portion relative to its front surface and so as to have the light beam emitted by the light sources pass through the display receiving portion to exit at the desired or set or selected angle. Placement of the light control film on the angled rear surface of the display receiving portion is advantageous when the light control film (such as 3M's VIKUITI™ ALCF-P or LCF-P) is used where the louver angle is zero degrees and where on-axis vertically incident light from the light sources is highly transmitted but where off-axis light is cut-off by the embedded microlouvers. Such zero degree louvered light control film is used for privacy filters for laptop computer screens and ATM screens, and so is economically available. By being able to purchase and use zero angle louvered light control film, and by using the likes of an angled rear surface (pre-established via molding of the mirror back plate at its display receiving portion) to support the light control film at an angle in front of the light sources that are similarly angled and supported, economical assembly can be enhanced. Optionally, and alternatively, a mechanical support to mutually support and angle the light control film/light sources relative to the plane of the rear of the mirror reflective element may be used so that light emitted by the light sources is generally aligned with or on-axis with the light transmission axis between the louvers, and so that the light beam passed through the light control film has its principal beam axis directed in the desired or appropriate direction, such as in a direction generally away (for a turn signal indicator) from the vehicle body side and away from direct view by a driver of the host vehicle to which the exterior mirror reflective element is attached, or such as in a direction generally toward (for a blind spot indicator) the vehicle body side for direct viewing by the driver of the host vehicle and away from direct view by a driver of another vehicle.

Preferably, the indicator mounting portion or portions 326a, 326b of back plate 320 include light absorbing means to substantially absorb non-axially directed light rays passing through the respective passageway. For example, the inner wall or surface of the passageway of the indicator mounting portion may be black or dark (such as due to the molding of the dark or opaque back plate), and may be at least partially light absorbing, and preferably substantially light absorbing, and most preferably fully light absorbing of light incident thereon. Thus, principally only light rays that pass substantially or entirely through the full length of the inner passageway exit the end of the light emitting passageway, and, therefore, the light emitting source is mainly visible only by viewing axially along or substantially along the line of direction of the passageway. For example, the inner surface of the passageway may be stippled or textured or faceted to make the passageway substantially light absorbing, or the inner surface may include a honeycomb structure that may substantially absorb the light that is not directed along the axis of the passageway.

Optionally, the blind spot indicator of the present invention may include a blind spot alert indicator stencil or mask, at the front surface of the back plate and behind the reflective element, for providing a dark mask at the indicator module or passageway while having a cut out of the desired or appropriate icon or light pattern for viewing by the driver of the vehicle (or other person in the subject vehicle or in a vehicle approaching or at the side of the subject vehicle) when the indicator or illumination source is activated. For example, and as shown in FIGS. 19A-C, a back plate 420 may include a blind spot indicator mounting portion 426 (such as at an inboard portion or region of the back plate) and blind spot indicator or alert module or element 422. Optionally, the blind spot indicator or alert module or element 422 at mounting portion 426 may utilize aspects of the blind spot indicator or alert module or element 222b and/or the indicator modules and mounting portions described in U.S. patent application Ser. No. 11/520,193, filed Sep. 13, 2006, now U.S. Pat. No. 7,581,859, which is hereby incorporated herein by reference in its entirety.

In the illustrated embodiment, mounting portion 426 comprises a hollow tube 427 integrally formed with and extending from the rear of the back plate 420, and with a passageway extending therethrough or therealong, whereby the indicator module 422 is mounted at the rearward portion of the hollow tube 427. An indicator stencil or mask or masking element 425 is disposed at the front surface of the planar portion 420a of back plate 420 (and preferably received within a recess 420c established at the front surface of the planar portion 420a of back plate 420) and generally at the forward end of the passageway extending through the hollow tube 427. The indicator module 422 includes an illumination source or LED 428 that is operable to emit light into and along and through the passageway of the hollow tube 427 and through the stenciled element or masking element 425 and toward and through the reflective element 418 (FIG. 19C) for viewing by the driver of the vehicle.

Optionally, the indicator module 422 may include a light control film 429 (such as a light control film of the types described above with respect to indicator modules 322a, 322b, 322a', 322b') to direct the light emitted by illumination source 428 in a direction generally along the passageway of the hollow tube 427 of indicator mounting portion 426.

As can be seen in FIG. 19B, the masking element 425 may be a dark or opaque substrate or element 425a with one or more apertures or icons or characters or patterns 425b etched or cut or otherwise established therethrough so that light will pass through the apertures or icons yet not through the other portions of the masking element. The reflective element 418 comprises a transflective display-on-demand reflective element that is partially transmissive to allow the light from the indicator module 422 to transmit through the stenciled icons 425b of masking element 425 and through the transflective reflective element. The transflective reflective element 418 is substantially reflective of light incident thereon, such the dark masking element 425 is substantially hidden or substantially non-viewable or discernable by a person viewing the reflective element when the indicator module is deactivated. Thus, the blind spot indicator is viewable and discernible when the illumination source 428 of indicator module 422 is activated and is substantially not viewable or discernible when the illumination source 428 of indicator module 422 is deactivated.

Back plate 420 includes an actuator mounting portion 420b for attaching the back plate and reflective element to a mirror actuator for providing adjustment of the reflective element by the driver of the vehicle. The indicator module and mounting portion 426 are disposed toward the inboard side of the reflective element subassembly and at a space that is available to the rear of the reflective element and clear of the mirror actuator.

Optionally, the reflective element subassembly and/or indicator module of the present invention may include a non-illuminated icon etched or otherwise formed or established at the mirror reflector and at or near an illuminated blind spot indicator so as to be readily viewed by the driver of the vehicle when the blind spot alert indicator is activated (such as in response to a detection of a vehicle or object in a lane adjacent to the subject vehicle and/or in response to the driver of the subject vehicle activating a turn signal indicator in anticipation of making a lane change and/or the like). For example, and as shown in FIG. 20A, a reflective element subassembly 510 includes a reflective element 518 and a back plate 520, which includes a turn signal indicator mounting portion 526a (such as at an outboard portion or region of the back plate) and a blind spot indicator mounting portion 526b (such as at an inboard portion or region of the back plate), such as in a similar manner as described above with respect to the reflective element subassembly of FIG. 16. In the illustrated embodiment, the turn signal indicator mounting portion 526a and signal indicating module 522a include a translucent block or indicating light source or element 524 and illumination source 528a at a rear portion of the mounting portion 526a and generally at a light baffle 530 of back plate 520. Optionally, the blind spot indicator or alert module or element 522b at mounting portion 526b may utilize aspects of the indicator modules and mounting portions described in U.S. patent application Ser. No. 11/520, 193, filed Sep. 13, 2006, now U.S. Pat. No. 7,581,859, which is hereby incorporated herein by reference in its entirety, and may comprise a hollow tube 527 integrally formed with and extending from the rear of the back plate 520, and with a passageway extending therethrough or therealong, whereby the indicator module 522b is mounted at the rearward portion of the hollow tube 527. The indicator module 522b includes an illumination source or LED 528b that is operable to emit light into and along and through the passageway of the hollow tube 527 and toward and through the reflective element 518 for viewing by the driver of the vehicle. Back plate 520 also includes an actuator mounting portion 520b for attaching the back plate and reflective element to a mirror actuator for providing adjustment of the reflective element by the driver of the vehicle.

The reflective element 518 may comprise any type of reflective element, preferably a transflective or display on demand type reflective element such as described above. In the illustrated embodiment, reflective element 518 comprises a transflective electrochromic reflective element having a first or front substrate 540 and a second or rear substrate 542 with an electrochromic medium 543 sandwiched therebetween and sealed with a perimeter seal 544. The front substrate 540 includes a transparent conductor coating 546 at its rear surface and may include a perimeter metallic band 550 at the perimeter of the rear surface, such as described above. The reflective element may comprise a "third surface" reflective element with its rear substrate 542 having a transflective coating or a metal oxide/metal/metal oxide stack (with at least one of the metal oxide layers that contacts any electro-optic medium comprising a conducting or semiconducting layer), such as an IMI stack of coatings or layers 548, at its front surface. An icon or character or indicia 525 may be etched or otherwise created or established (such as via masking during deposition of the reflector coating or later etching or ablation or the like) at and at least partially through the third surface reflective coatings or layers 548.

The back plate 520 is adhered or attached at the rear surface of the rear substrate, and the mirror reflective element sub-assembly 512 may include a heater element 538 and an opacifying element or layer or coating or film 552 disposed between the back plate and rear substrate. As can be seen in FIG. 20A, the heater element 538 and opacifying layer 552 include apertures therethrough (or transparent or translucent or light transmitting or light diffusing portion or portions of the heater element and/or opacifying layer) at the location of the light baffle 530 and the passageway of the indicator mounting portion 526b of the back plate 520, so that light emanating from the signal indicating modules 522a, 522b is transmitted through the apertures in the heater element and opacifying layer and through the reflective element for viewing by a person viewing the reflective element at the appropriate angle.

The icon or indicia may be formed through the reflector coating or coatings or partially through the reflector coating or coatings and thus may provide a non-reflective icon (which may appear as a dark icon due to the darkened or opaque opacifying element or layer 552), or may provide a partially reflective icon or indicia and may be a different tint or color as compared to the spectral reflectivity of the reflector coatings or layers. Optionally, the indicia may be established utilizing aspects of the reflective element assemblies described in U.S. patent application Ser. No. 11/226, 628, filed Sep. 14, 2005 and published Mar. 23, 2006 as U.S. Publication No. US-2006-0061008; and/or PCT Application No. PCT/US2006/018567, filed May 15, 2006 and published Nov. 23, 2006 as International Publication No. WO 2006/ 124682, which are hereby incorporated herein by reference in their entireties. Optionally, if the reflective element has a transflective reflector, the reflective element may have a white or light colored layer or element behind the reflective element at the icon or indicia to make the presence of icon or indicia less covert and thus to provide enhanced viewing of the icon or indicia (by giving an indication of the presence of the icon or indicia without establishing a window through the mirror reflector). Thus, the presence of the blind spot feature is subtlely rendered when the mirror reflective element is viewed such as on a sunny day. Since the transflector of the transflective mirror element can be made to have a visible light transmission of about 20% T to as high as about 35% T, or higher, the use of a white or lighter colored element or icon or mask close to and contacting the substrate surface to the rear of the reflective element's substrate, and adjacent to where the blind spot indicator will illuminate, can stand out during daylight and be perceived in contrast to the otherwise highly light absorbing, generally opaque backing at the rear of the transflective mirror element. Thus, the owner of the vehicle gets a subtle indication that the vehicle is equipped with such a "another-vehicle-is-in-a-side-lane" blind spot alert system.

The icon or icons 525 etched or otherwise established at the mirror reflector are located at or near or adjacent to where the illuminated blind spot indicator 523 is viewable to the driver of the subject vehicle. As can be seen in FIG. 20B, the illumination of the blind spot indicator (via activation of the illumination source 528b of blind spot indicator module 522b) functions to alert the driver or draw the driver's attention to that region of the reflective element where the indicator is disposed. The non-illuminated icon functions to indicate to the driver that the illuminated indicator pertains to the blind spot detection system so that the driver is alerted to a detection of a vehicle or object at or in the respective blind spot of the vehicle. As can also be seen in FIG. 20B, the turn signal module 522a is activatable to illuminate a turn signal indicator icon 529 for viewing by the drivers of other vehicles rearward of and/or to the side of the subject vehicle. Because the reflective element 518 is preferably a transflective display-on-demand reflective element, the illuminated icons or indicators are viewable by a person viewing the reflective element when they are activated, but are substantially not viewable or discernible by a person viewing the reflective element when they are deactivated.

Thus, the indicator module is covertly placed at the back plate and behind the reflective element so that it is not readily visible to a person viewing the reflective element when the illumination source is deactivated. The dark or black walled passageway of the back plate functions to camouflage the presence of the indicator module. The length of the passageway and indicator mounting portion is selected so that the indicator module is located far enough back from the reflective element so as to be substantially not visible to a person viewing the reflective element (when the illumination source or module is deactivated). Preferably, the indicator module is disposed or located at least about 0.5 cm back from the rear surface of the reflective element, and more preferably is disposed or located at least about 1 cm back from the rear surface of the reflective element, and more preferably is disposed or located at least about 1.5 cm back from the rear surface of the reflective element. However, the indicator module may be located closer to or further back from the reflective element while remaining within the spirit and scope of the present invention.

Therefore, the indicator mounting portion and back plate and the signal indicating module of the present invention provide enhanced displays or indications at the mirror reflective element, while reducing the costs and complexities associated with displays or indicators of the prior art. For example, an advantage of creating a light baffle via molding the back plate is that such a back plate and light baffle obviates the costs and complexities associated with utilizing a separate light control film, such as what is disclosed in U.S. Pat. Nos. 4,906,085; 5,355,284; 5,788,357 and 6,045,243, which are hereby incorporated herein by reference in their entireties. Further, utilizing the glow block and its simple construction obviates the complexities and costs associated with the prior art mirror assemblies, such as those described in U.S. Pat. Nos. 5,788,357 and 6,045,243, which are hereby incorporated herein by reference in their entireties.

Thus, the mirror assembly or assemblies of the present invention obviate the need to have the likes of a collimating optical element and/or a refractive optical element or optical elements having total internal reflective portions. As can be seen from the figures and the above discussions, the present invention has a very economical construction comprising a glowing light source or block and a light baffle (which may comprise a light directing film or the innovative establishment of a light baffle during the molding of the back plate itself). The present invention thus may provide a reduced cost indicator for a turn signal indicator or blind spot alert indicator at an exterior rearview mirror of the vehicle. Optionally, aspects of the present invention may be utilized for displays or indicators of an interior rearview mirror assembly, while remaining within the spirit and scope of the present invention.

The angle and direction of the indicator mounting portions may be selected depending on the particular associated display indicia or icons and on the particular mirror application. The reflector carrier or back plate of the mirror reflector sub-assemblies may have an aperture or opening therethrough for at least partially receiving the indicator mounting portion or portions or hollow tube or tubes or passageways therethrough when the back plate is attached to the rear surface of the reflective element, whereby the hollow tube or tubes (and associated indicator or indicators) may protrude at least partially through the back plate when the mirror reflector sub-assembly is assembled. Optionally, the icons or displays of the mirror reflector sub-assemblies described herein may be established utilizing aspects of the icons or symbols or indicia described in U.S. patent application Ser. No. 11/226,628, filed Sep. 14, 2005 and published Mar. 23, 2006 as U.S. Publication No. US-2006-0061008; and/or PCT Application No. PCT/US2006/018567, filed May 15, 2006 and published Nov. 23, 2006 as International Publication No. WO 2006/124682, which are hereby incorporated herein by reference in their entireties.

Optionally, the mirror reflector sub-assembly may include masks or baffles or additional light direction means or occluding means or directional filtering. For example, the mirror reflective element sub-assembly may comprise louvers or shutters for shading from view, or filters or light directing film or the like, at the rear of the reflective element (such as between the back plate and the iconistic portions) for further directing or guiding the illumination from the illumination source at the desired angle and through the reflective element so as to be principally or solely viewable by the driver of the host vehicle (for blind spot/LCA applications) or so as to be principally or solely viewable by others at the side or rear of the vehicle but not principally by the host driver (for turn signal applications).

Therefore, the present invention provides a back plate that includes one or more indicator mounting portions or display receiving portions integrally formed therewith, so that the display element or device may be readily assembled to the mirror reflector sub-assembly via attachment or adherence of the back plate to the mirror reflective element. The present invention thus provides a display element or device that is readily assembled to a mirror reflector sub-assembly, and thus facilitates assembly of the mirror reflector sub-assembly at a facility remote from the mirror assembly facility, such that the mirror reflector sub-assembly (including the back plate and indicator mounting portion) may be provided or supplied to the mirror manufacturer as a unit. The mirror manufacturer then may install or attach the indicator or indicator module to the indicator mounting or receiving portion (or may electrically connect an already installed indicator to a wire or lead of the mirror assembly), and may attach the mirror reflector sub-assembly to the mirror actuator. The present invention thus provides enhanced assembly processing of the mirror assembly, while taking advantage of the otherwise typically unused space within the casing and behind the back plate of the exterior rearview mirror assembly. For example, a mirror manufacturer may purchase a sealed, pre-assembled signal indicator module (including the necessary electrical connectors for establishing electrical connection and power and control to the module as it is attached or mounted to the reflective element or back plate), and may insert the module into the housing or shell or structure of the back plate (that is pre-configured to receive such) or may otherwise engage the module with the rear of the reflective element assembly, such as by inserting one end of the module into the side walls of the shell or structure of the back plate and against the rear of the reflective element, whereby the module makes an at least partially efficient optical connection/coupling to the rear surface or portion of the transflective reflective element or to a light transmitting portion of any heater pad disposed between the back plate and the rear of the reflective element, preferably while also making a mechanical connection and alignment to the back plate of the reflective element assembly. Note that the receiving portion of the back plate at the rear of the heater pad/reflective element and where the signal indicator/light unit emits light therethrough when its light source or light sources are activated may itself comprise a resilient light transmitting clear and/or light-diffusing material or element (such as a low durometer soft plastic material or element, such as an element having less than 120 Shore A durometer hardness for example, such as a silicone pad or film, or such as an optical adhesive or optical tape or film) that at least one of (a) light-couples the receiving part of the back plate to the signal indicator/light unit and (b) light couples the part of the back plate where the signal indicator/light unit is disposed at (and emits light through) to the corresponding aperture or light transmitting window of the heater pad and/or to the rear surface of the substrate of the reflective element.

Optionally, a spring-like resilient light transmitting and/or light diffusing interface or pad, such as a silicone or other soft or pliable plastic having light transmitting qualities, may be provided at the interface end of the module (or at or in any aperture in the back plate where a light indicator shines through) to provide an interface at the rear (typically a glass surface that may be coated or uncoated) of the reflective element with little or no air gap between the module and the rear of the reflective element. Also, the indicator module (having a shape or structure, such as a triangular or trapezoid shape or the like, with one or more light sources or light emitting diodes and an electrical connector) may have a light transmitting element or window or lens (that may or may not have an optical light directing property) at its interfacing end that is at least somewhat soft or pliable, so that the module creates intimate contact at the rear of the reflective element when pressed against the reflective element. The module may be purchased with the light transmitting interface or pad already incorporated therein, or the pad may be a separate element at the rear of the reflective element or may be separately disposed between the module and the rear of the reflective element.

The signal indicator or blind spot indicator or turn signal indicator of the present invention thus provides a visible signal that is viewable at the exterior mirror by a person viewing the reflective element of the exterior rearview mirror at or near an appropriate angle or location relative to the exterior mirror. If the mirror reflective element is not a transflective mirror reflective element (such as a construction using laser ablation to create a hole or holes in the mirror reflector such as is now used on the likes of 2008 Toyota Tundra and 2008 Cadillac Escalade vehicles), the size of the icon or indicia of the display or signal indicator module is typically limited if used for blind spot indication, such as to a size dimension that is circumscribed by a circle having a diameter of about 5 mm to about 7 mm or less, since a larger indicator or display may interfere with viewing of the reflective element during normal driving conditions and when the signal indicator module is not activated, and may be aesthetically unacceptable. However, if the reflective element is a transflective mirror reflective element, the display area or icon or indicia may be larger than that of a non-transflective mirror reflective element, and may have a size dimension that is circumscribed by a circle having a diameter of greater than about 7 mm or preferably greater than about 15 mm and up to about 30 mm or thereabouts. This is because, for transflective mirror reflector applications, the icon or indicia or display of the signal indicator module is only viewable and discernible by a person viewing the rearview mirror assembly when it is activated and, thus, when it is desired or appropriate that the person viewing the mirror assembly readily sees and discerns the signal, and is substantially not viewable or discernible during normal driving conditions and when the signal indicator module is deactivated.

Desirably, the signal indicator module (such as for a blind spot indicator) will be sufficiently bright or intense when activated so as to be viewable during high ambient or daytime driving conditions. For example, the blind spot indication signal indicator module preferably has a luminance of preferably in the range of about 5,000 nits (candelas/square meter) to about 30,000 nits or greater when activated during daytime and when viewed via the reflective element from the front along its axis of highest brightness/directionality, and with the blind spot signal indictor behind the reflective element and emitting light therethrough. The signal indicator module is operable (such as via a photo sensor control) to have a significantly reduced intensity during low ambient lighting, night time driving conditions (and may be automatically adjusted to the reduced intensity in response to an ambient light sensor detecting an ambient light level at or below a threshold light level).

Although shown and described as being located at a driver side exterior mirror, the blind spot/LCA/turn signal indicator of the present invention may also or otherwise be located at the passenger side exterior mirror, if desired. Optionally, a blind spot indicator in accordance with the present invention may be located at both the driver side mirror assembly and the passenger side mirror assembly of the host vehicle. The indicator at either side may be selectively activated or illuminated to indicate to the driver of the host vehicle that an object or other vehicle has been detected at that particular side lane region of the host vehicle. Optionally, the blind spot indicator may be associated with a blind spot detection and indication system that includes one or more indicators at the interior rearview mirror assembly of the host vehicle. The blind spot indicators may utilize aspects of the blind spot indicators and/or blind spot detection systems described in U.S. Pat. Nos. 6,198,409; 5,929,786 and 5,786,772, and/or PCT Application No. PCT/US2006/026148, filed Jul. 5, 2006 and published Jan. 11, 2007 as International Publication No. WO 2007/005942, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786 and 5,786,772, and/or U.S. patent application Ser. No. 11/315,675, filed Dec. 22, 2005, now U.S. Pat. No. 7,720,580; and/or PCT Application No. PCT/US2006/026148, filed Jul. 5, 2006 and published Jan. 11, 2007 as International Publication No. WO 2007/005942, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

A challenge to providing an indicator at the exterior rearview mirror reflective element is that the back plate and associated components of the exterior reflective element subassembly may be exposed to harsh environmental conditions, such as water spray, rain, dirt and debris and the like, when the reflective element is mounted at a vehicle. Thus, it is desirable to provide a sealed, water impervious indicator module or display element so as to limit or substantially preclude water ingress or the like into the module or element. Optionally, the back plate and indicator module may be integrally molded to limit water entry into the module, whereby the illumination source and/or light directing film or the like may be sealed at the module to protect the electronic components of the module. Optionally, a lens or cover element may be provided at the planar portion of the back plate and may be sealed thereat to limit water entry into the indicator module through the back plate.

Optionally, and desirably, the display element or signal indicating module (such as a module of the types having a hollow tube configuration or a translucent block configuration as described above) may comprise a stand-alone unitary module that is a substantially sealed, water impervious, indicator module or display module, so as to be substantially impervious to water ingress or to debris ingress, and preferably with electrical connectors (such as a plug or socket connector) established or incorporated therein or with a lead or wire harness (such as a flying lead or pigtail) established or incorporated therein. The indicator module may be provided as a sealed or substantially sealed unit or module that can be snapped into or otherwise attached or secured (preferably mechanically but optionally adhesively) at the mirror back plate (and does so substantially or wholly sealingly to limit or substantially preclude water ingress to the module so that the module and back plate are substantially water impervious), preferably at the mirror sub-assembly manufacturing operation when the mirror reflective element (and any associated heater or other item or element) is joined to the mirror back plate, such as by utilizing aspects of the indicators described in U.S. patent application Ser. No. 11/520,193, filed Sep. 13, 2006, now U.S. Pat. No. 7,581,859, and/or PCT Application No. PCT/US2006/018567, filed May 16, 2006 and published Nov. 23, 2006 as International Publication No. WO 2006/124682, which are hereby incorporated herein by reference in their entireties. For example, the indicator module may be provided with the illumination source and associated elements sealed to the hollow tube or sidewalls of the module, and a lens or optic element (such as a transparent lens element or the like) may be sealed at the opposite end of the hollow tube or housing structure of the module, such that both ends of the hollow tube or housing structure of the module are closed and sealed so that the module is substantially water impervious as a stand-alone module. The sealed signal indicating module, including the light source and circuitry, may be supplied or provided to an assembly facility (such as a mirror assembly facility or the like) from a display element supplier, while the back plate may be molded and supplied or provided to the assembly facility from a back plate supplier. An operator at the assembly facility may attach the display device or indicator module and/or circuitry to the back plate (such as to the rear surface of the display receiving portion of the back plate), preferably by snapping the display device or module to snaps or clips or clasps or fingers or the like molded into the back plate (at its display element receiving portion) to assemble the display or indicator module to the back plate. Optionally, and desirably, the display receiving portion of the back plate and/or the display element (such as at the circuit element or circuit board) or indicator module may have attaching elements or snaps or clips or prongs (such as cooperating structure molded into the module and back plate so that the module is readily attached to or snapped or clasped to the back plate) to ease the assembly and securement of the display element or indicator module to the back plate, such as at or to a display receiving portion of the back plate, so that an operator may attach the display element or indicator module to the back plate via a snap connection or attachment.

Optionally, and desirably, electrical connection (such as to a power supply or 12 volt power wire of the vehicle battery/ignition system or to a power feed from a LIN bus controller) to the display circuitry may be made when the display element is snapped or otherwise attached (preferably mechanically but optionally adhesively) to the back plate, such as by making electrical contact between the display element and mirror circuitry (including circuitry associated with the reflective element and/or mirror assembly, such as electrochromic mirror circuitry, mirror lights and/or display circuitry and the like, typically disposed at a printed circuit board of the mirror assembly) when the display element is snapped to the back plate, such as via pressed contact or connection between respective electrical terminals or contacts of the display element and mirror circuitry as the display element is pressed or snapped or received to the display receiving portion of the back plate, such as by press attaching the display element or module into receiving fingers or clips or snaps or the like that are integrally formed with the display receiving portion of the back plate in the injection molding operation that manufactures or forms the back plate itself. For example, electrical terminals or contacts may be insert molded in the display receiving portion so as to be exposed at (or otherwise located at) the rear surface of the display receiving portion for electrical connection to the display element when the display element is attached or snapped to the display receiving portion of the back plate. Alternately, electrical connection to the display device may be made via other means, such as wires or leads or flying leads or wire harnesses or the like such as pigtails or other suitable connectors or leads, and before or after the display device is snapped or otherwise attached to the back plate, while remaining within the spirit and scope of the present invention.

Thus, a method of assembling such a mirror reflective element sub-assembly may include molding the back plate having an indicator mounting or receiving portion and providing the back plate and reflective element to an assembly facility, while also providing a display element or signal indicating module at the assembly facility. Preferably, the display element and the back plate are supplied or provided to the assembly facility from different sources. An operator at the assembly facility takes a back plate and a display element and snaps the display element to the rear surface of the display receiving portion of the back plate to attach and secure the display element at the display receiving portion. The operator also makes the electrical connection between circuitry or wiring of the mirror assembly or sub-assembly and the display element, either as the display element is snapped to the display receiving portion of the back plate (such as via contacts at the display element and display receiving portion of the back plate) or at a separate time from the attachment of the display element to the back plate (such as via separate connectors at or extending from the display element). Optionally, electrical connection to the display element may be made during assembly of the reflective element sub-assembly to the mirror casing of the mirror assembly (such as via connectors or leads or pigtails extending from the display element).

Thus, the display elements or devices or modules of the present invention provide a desired or appropriate iconistic display or indication that, when electrically actuated, emits light that is viewable by a person viewing the mirror reflective element. The display element may be formed with the back plate or may attach to the back plate (such as by snapping to the back plate or the like), and provides the desired angle effect relative to the reflective element. For example, the reflective element may be attached to or snapped into the back plate (which includes the display element at a perimeter region thereof), whereby the display element or module is thus positioned at a desired or appropriate angle relative to the reflective element to provide the desired or appropriate angle effect for directing the light from the light sources (when electrically actuated) in a desired or predetermined angle relative to the mirror reflective element. Thus, the display element provides the desired or appropriate preset angle when the mirror reflective element is attached to the back plate.

The blind spot indicators of the present invention thus provide a display element or indicator that is disposed at or integrally provided with the back plate. A back plate thus may be provided to a mirror manufacturer with mounting or attachment structure or receiving structure for the display element or display circuitry integrally formed with the back plate. The attachment structure or receiving portion is configured to receive or attach to a display element or display circuitry or indicator element. A mirror assembler or manufacturer may attach the display element to the attachment structure or receiving portion of the back plate (such as by snapping display circuitry or a circuit board at the attachment structure), whereby the display element is oriented at a desired angle relative to the mirror reflective element when attached to the back plate. Thus, illumination emanating from the display element is directed at the desired or appropriate angle for viewing, either by the driver of the host vehicle (for a blind spot detection system) or a driver of another vehicle (for a turn signal indicator).

The blind spot indicators of the present invention thus are operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786 and/or 5,786,772, and/or U.S. patent application Ser. No. 11/239, 980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/638,687, filed Dec. 23, 2004; Ser. No. 60/628, 709, filed Nov. 17, 2004; Ser. No. 60/614,644, filed Sep. 30, 2004; and/or Ser. No. 60/618,686, filed Oct. 14, 2004, and/or of the reverse or backup aid systems, such as the rearwardly directed vehicle vision systems described in U.S. Pat. Nos. 5,550,677; 5,760,962; 5,670,935; 5,877,897; 6,201,642; 6,396,397; 6,498,620; 6,717,610 and/or 6,757,109, and/or U.S. patent application Ser. No. 10/418,486, filed Apr. 18, 2003, now U.S. Pat. No. 7,005,974, and/or of the automatic headlamp controls described in U.S. Pat. Nos. 5,796,094 and/or 5,715,093; and/or U.S. patent application Ser. No. 11/105,757, filed Apr. 14, 2005, now U.S. Pat. No. 7,526, 103; and/or U.S. provisional application Ser. No. 60/607, 963, filed Sep. 8, 2004, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999, now U.S. Pat. No. 7,339,149, and/or PCT Application No. PCT/US2003/ 036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference in their entireties.

Optionally, the indicator or indicators of the present invention may alert the driver of the host vehicle of other situations or status or the like. For example, the indicator could function to alert the driver of the host vehicle that the brake lights of the host vehicle are functioning properly. Other applications or uses of the indicator may be implemented, without affecting the scope of the present invention.

The reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109;

5,076,673; 5,073,012; 5,117,346; 5,724,187; 5,668,663; 5,910,854; 5,142,407 and/or 4,712,879, and/or U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; and/or Ser. No. 11/226,628, filed Sep. 14, 2005 and published Mar. 23, 2006 as U.S. Publication No. US-2006-0061008, and/or PCT Application No. PCT/US2006/018567, filed May 16, 2006 and published Nov. 23, 2006 as International Publication No. WO 2006/124682, and/or U.S. provisional applications, Ser. No. 60/695,149, filed Jun. 29, 2005; Ser. No. 60/690,400, filed Jun. 14, 2005; Ser. No. 60/681,250, filed May 16, 2005; and/or Ser. No. 60/692,113, filed Jun. 20, 2005, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854; 6,420,036 and 7,274,501, and in PCT Application No. PCT/US03/29776, filed Sep. 9, 2003 and published Apr. 1, 2004 as International Publication No. WO 2004/026633, which are all hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489 and 6,065,840, and/or in U.S. patent application Ser. No. 10/993,302, filed Nov. 19, 2004, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in U.S. Pat. Nos. 7,255,451 and 7,274,501, and PCT Application No. PCT/US03/29776, filed Sep. 19, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457; and/or U.S. patent application Ser. No. 11/226,628, filed Sep. 14, 2005 and published Mar. 23, 2006 as U.S. Publication No. US-2006-0061008; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference in their entireties. Optionally, the reflective element may include indicia formed at and viewable at the reflective element, such as by utilizing aspects of the reflective elements described in PCT Application No. PCT/US2006/018567, filed May 15, 2006 and published Nov. 23, 2006 as International Publication No. WO 2006/124682; and U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 18, 2006, which are all hereby incorporated herein by reference in their entireties.

Optionally, the reflective element may comprise a single substrate with a reflective coating at its rear surface, without affecting the scope of the present invention. The mirror assembly thus may comprise a prismatic mirror assembly or planar or non-planar mirror or other mirror having a single substrate reflective element, such as a mirror assembly utilizing aspects described in U.S. Pat. Nos. 6,318,870; 6,598,980; 5,327,288; 4,948,242; 4,826,289; 4,436,371 and 4,435,042; and PCT Application No. PCT/US04/015424, filed May 18, 2004 and published Dec. 2, 2004 as International Publication No. WO 2004/103772; and U.S. patent application Ser. No. 10/933,842, filed Sep. 3, 2004, now U.S. Pat. No. 7,249,860, which are hereby incorporated herein by reference in their entireties. Optionally, the reflective element may comprise a conventional prismatic or flat reflective element or prism, or may comprise a prismatic or flat reflective element of the types described in PCT Application No. PCT/US03/29776, filed Sep. 19, 2003 and published Apr. 1, 2004 as International Publication No. WO 2004/026633; U.S. patent application Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177, and/or PCT Application No. PCT/US2004/015424, filed May 18, 2004 and published Dec. 2, 2004 as International Publication No. WO 2004/103772, which are all hereby incorporated herein by reference in their entireties, without affecting the scope of the present invention.

Optionally, and with reference to FIGS. 21A, 21B and 22, a reflective element 618 may comprise a vehicular electrochromic reflective element (but could comprise a non-electrochromic reflective element without affecting the scope of the present invention) having a front substrate 640 (such as a transparent glass substrate or the like), a rear substrate 642 (such as a transparent glass substrate or the like) and an electrochromic medium 643 (such as a solid polymer matrix electrochromic medium such as the types disclosed in U.S. Pat. Nos. 5,724,187 or 5,910,854, or a liquid electrochromic medium such as the types disclosed in U.S. Pat. No. 4,902,108, the entire disclosures of which are incorporated by reference herein, or the like) sandwiched therebetween and sealed via a perimeter seal 644. Front substrate 640 has a transparent conductor coating 646 (such as an indium tin oxide (ITO) coating or layer) disposed at its rear surface 640a, while rear substrate 642 has a transflective mirror reflector or transflector coating 648 (such as a non-dichroic transflector, such as an IMI stack such as an ITO/Ag/ITO stack of layers or coatings or the like) disposed at its front surface 642a. The reflective element 618 includes a third surface tab-in portion or coating 650 and a fourth surface wraparound coating 652 at an edge region of the rear substrate so as to provide electrical conductivity or continuity between the fourth or rear surface 642b of the rear substrate 642 and the front or third surface 642a of the rear substrate 642.

As can be seen in FIGS. 21A, 21B and 22, the tab-in coating 650 may be established (such as via sputter deposition or other suitable coating or establishing means) at a perimeter region 643 of the third or front surface 642a of the rear substrate 642 and at least partially around and over the perimeter edge dimension 656 of rear substrate 642, while the fourth or rear surface wraparound coating 652 may be disposed so as to overlap a portion of the third surface tab-in portion 650 (such as at the edge dimension 656 of the rear substrate) and may wrap around at least partially onto the rear or fourth surface 642b of the rear substrate (such as by utilizing aspects of the reflective elements described in U.S. Pat. Nos. 7,274,501; 7,255,451; 7,184,190 and 7,004,593, which are hereby incorporated herein by reference in their entireties). Optionally, the third surface tab-in portion 650 and fourth surface wraparound portion may be commonly established via a common or same deposition process or the like. The third surface tab-in portion 650 may comprise any suitable conductive materials, such as a metallic or conductive layer or coating, such as a silver or silver alloy (such as an alloy with greater than about three percent and less than about 25 percent minority content), such as a silver-palladium alloy, a silver-platinum alloy, a silver-gold alloy, a silver-rhodium alloy, a silver-ruthenium alloy or the like, or an electrically conducting metal oxide layer, such as an indium tin oxide (ITO) transparent electrically conductive layer or the like, or a thin conductive ink or frit layer or film or tape or the like.

As shown in FIGS. 21A, 21B and 22, the third surface transflective mirror reflector 648 may be established at the front surface 642a of the rear substrate 642 and with an uncoated or non-conducting pathway or raceway 654 established around the perimeter region 643 of the front surface 642a of the rear substrate 642, such as by masking during the deposition of the mirror reflector on the front surface or by laser ablating or otherwise deleting or removing the mirror reflector from the front surface of the rear substrate at and around the perimeter region of the front surface 642a of the rear substrate 642. The third surface mirror reflector 648 may comprise any suitable reflective and transmissive material or materials, such as a silicon coating or a metal oxide/metal/metal oxide stack (with at least one of the metal oxide layers comprising a conducting or semiconducting layer), such as an IMI (such as ITO/silver/ITO or other suitable alternating layers of materials or the like) stack of layers or coatings such as by utilizing aspects of the reflective elements described in U.S. Pat. Nos. 7,274,501; 7,255, 451; 7,184,190; 6,690,268; 5,724,187 and/or 5,668,663, which are all hereby incorporated herein by reference in their entireties.

Figure 23:
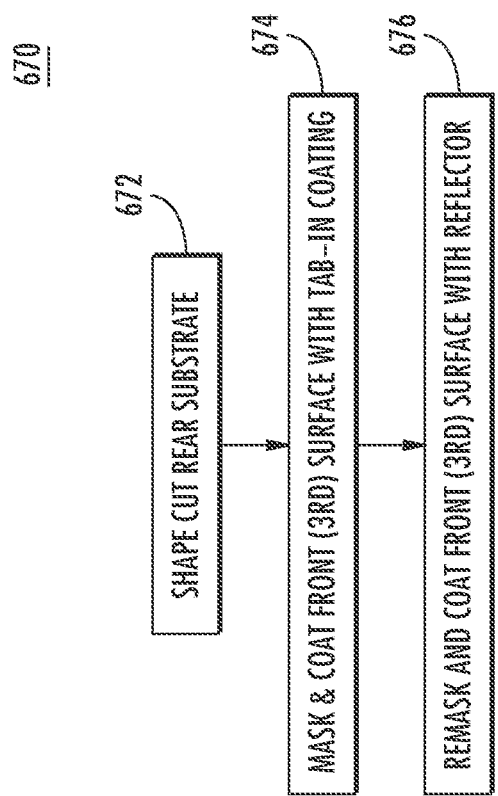
FIG. 23 is a diagram showing the process of forming and coating the rear substrate of FIGS. 21A and 21B.

As can be seen in FIGS. 21B and 22, the third surface mirror reflector 648 is disposed on the substrate surface after the tab-in portion has already being coated or otherwise dispose on the substrate and so as to partially overlap the tab-in portion 650 (with a portion of the tab-in portion being tucked under and making electrical contact with an outboard perimeter portion of the third surface mirror reflector), and at a location that is spanned or encompassed by the perimeter seal 644. With reference to FIG. 23, the process 670 of forming and coating the rear substrate includes shape cutting or forming the rear substrate at 672. The third surface of the cut substrate is then masked and coated at 674 to establish the tab-in coating or coatings at the third surface (and optionally at the edge dimension and fourth surface of the substrate depending on the particular application). After the tab-in coating is established, the third surface of the cut substrate is remasked and coated at 676 with the third surface reflector or transflective mirror reflector or transflector coating or coatings. An outboard portion of the third surface transflector coating is thus established over the previously established tab-in portion, and at a region that is encompassed by the perimeter seal when the reflective element is assembled together and the front and rear substrates are joined and sealed together by the perimeter seal.

Optionally, and desirably, the tab-in portion comprises a thin coating or layer (such as a layer having a thickness of about 20 microns or less, such as less than 10 microns (while remaining sufficiently electrically conductive), but could be more depending on the particular application) so as to limit any step or change in thickness of the coatings under the seal (that typically has a thickness in the range of from about 80 microns to about 150 microns or thereabouts) so as to limit any effect the presence of the thickness of the tab-in coatings may have on the sealing function of the perimeter seal at that location and/or any impact it might have on the uniformity of the inter-pane spacing between the front and rear substrates (although other means for providing a substantially uniform thickness of the various layers at the perimeter seal may be implemented to reduce non-uniformity at the interface between the perimeter seal and the third surface coatings or layers, such as by having the tab-in coating or stack of coating circumscribe the perimeter of the cut shape that constitutes the rear substrate).

Thus, the overlap region of the reflector 648 and tab-in coating 650 is entirely within, is under and is encompassed/ protected by the perimeter seal 644 at that location at the perimeter region of the rear substrate (with the outer edge/ periphery of the potentially environmentally vulnerable third surface reflector being inboard of an outer region/wall of the perimeter seal 644 and with the inner edge/periphery of the more environmentally robust tab-in coating or coatings (such as chromium or ruthenium or the like) preferably being outboard of an inner region of the perimeter seal 644 so as not to be visible to a viewer viewing the electrochromic-active region bounded by the perimetal seal). Thus, environmental concerns or environmental vulnerability of the transflective mirror reflector coating 648 are reduced by sealing the environmentally vulnerable third surface reflector coatings entirely within and under the bounds of the perimeter seal and providing electrical continuity/connection to the mirror reflector coating via an environmentally robust, electrically conducting tab-in coating, and with the electrical joint/overlap made and terminating under the seal. Optionally, an additional encapsulant or protectant 658 (such as a silicone sealant or an epoxy sealant or another suitable sealant) may be established at the tab-in portion and fourth surface wraparound portion to environmentally seal and protect the metallic or conductive tab-in and wraparound portions outside of the perimeter seal of the reflective element. This may conveniently be applied after the electrochromic mirror cell has been fabricated. Such additional sealing can augment the inherent environmental robustness of the tab-in coating or layers used, and such additional or secondary encapsulation well suits exterior mirror construction of the flush and/or frameless types, such as the types that are disclosed in U.S. Pat. Nos. 7,274,501; 7,255,451 and 7,184,190, which are all hereby incorporated herein by reference in their entireties.

The third surface tab-in portion thus extends from the overlap region (where the third surface reflector overlaps or overlays an inboard portion of the tab-in portion) or perimeter seal region and out to the perimeter edge of the cut shape of the rear substrate. In the illustrated embodiment, the tab-in portion extends over or wraps around a portion of the edge of the substrate (between the front and rear surfaces of the rear substrate), and a fourth surface wraparound portion covers a portion of the fourth surface and overlays or underlays a portion of the wraparound tab-in portion at the substrate edge. Because the reflective element does not necessarily require a wraparound coating at the edge dimension of the substrate, the tab-in portion may optionally be coated only on the perimeter region of the third or front surface of the rear substrate without any significant wraparound or coating on the edge dimension of the rear substrate. Optionally, the tab-in portion may wraparound a portion of the edge of the substrate or may be coated substantially across the edge dimension of the substrate, yet the reflective element may not include a fourth surface wraparound portion, whereby the tab-in portion may extend to the edge of the rear substrate and may extend or encompass a portion of the edge dimension of the substrate, such that electrical connection to the tab-in portion may be made at the perimeter region of the third surface of the rear substrate or at the edge or edge dimension of the rear substrate, while remaining within the spirit and scope of the present invention. Optionally, if a fourth surface wraparound coating is desired, the fourth surface wraparound coating may be established before or after or at the same time as the tab-in portion, such as via simultaneously sputter coating the tab-in coating and the fourth surface wraparound coating at the opposite sides and perimeter edge of the substrate via a two-sided sputter coating process, such as a sputter coating process that sputter coats the top and bottom surfaces of a substrate shape held in a fixture of a sputter coating chamber (with the coatings comprising the same coating composition or different coating composition as desired).

The fourth surface wraparound electrically conductive coating (or stack of coatings) thus may be deposited or disposed or coated onto the cut-edge dimension of the substrate, which has already been first coated with a portion of the tab-in coating (or stack of coatings) that wraps around or partially wraps around the edge dimension of the substrate so that the fourth surface wraparound electrically conductive coating (or stack of coatings) overlays, and thus protects, the underlying tab-in portion. Optionally, the fourth surface wraparound coating may comprise an environmentally robust composition or material, such as metallic chromium or ruthenium or the like, and thus may provide at least some enhanced environmental protection to the undercoated tab-in portion at the edge dimension of the substrate shape. Optionally, the sputter chamber in which the substrate shape is placed for coating of the fourth surface wraparound portion may utilize baffles or scattering techniques or other means for sputter coating the more environmentally robust coating(s) of the fourth surface wraparound portion over the tab-in portion at the edge dimension of the substrate shape and/or over the tab-in portion at the third surface of the substrate. Thus, the sputter-coated environmentally-protective coating(s) may sufficiently cover the tab-in portion so as to envelop and further environmentally protect the tab-in portion of the rear substrate. Also, and for constructions such as are disclosed in U.S. Pat. Nos. 7,255,451 and 7,184,190, and/or PCT Application No. PCT/US2006/018567, filed May 15, 2006 and published Nov. 23, 2006 as International Publication No. WO 2006/124682, which are hereby incorporated herein by reference in their entireties, where a third surface metallic reflector is principally protected by the seal of the electrochromic laminate assembly but with a tab-out portion that extends out beyond the seal to a cut edge (and preferably wraps-around the cut edge dimension) so as to facilitate electrical connection to the metallic reflector, the fourth surface coating or stack of coatings may be extended (such as by appropriate use of baffles or scattering means during sputter deposition in a vacuum chamber) from the fourth surface, along the cut edge dimension, and along the perimeter edge portion of the third surface where the tab-out of the third surface reflector has already been established so that the fourth surface coating (or stack of coatings) can overlay and thus help environmentally-protect the tab-out portion of the third surface reflector, not just along the cut edge dimension but also along the part of the tab-out portion that extends beyond the seal at the edge perimeter of the seal on the third surface of the rear substrate of the electrochromic mirror element.

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 6,690,268; 5,668,663 and/or 5,724,187, and/or in U.S. patent application Ser. No. 10/054, 633, filed Jan. 22, 2002, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 and published Mar. 9, 2006 as U.S. Publication No. US-2006-0050018; Ser. No. 11/284,543, filed Nov. 22, 2005, now U.S. Pat. No. 7,370,983; and/or Ser. No. 11/021, 065, filed Dec. 23, 2004, now U.S. Pat. No. 7,255,451; and/or PCT Application No. PCT/US03/29776, filed Sep. 9, 2003 and published Apr. 1, 2004 as International Publication No. WO 2004/026633; and/or PCT Application No. PCT/US03/35381, filed Nov. 5, 2003 and published May 21, 2004 as International Publication No. WO 2004/042457; and/or U.S. provisional applications, Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; and Ser. No. 60/563,342, filed Apr. 19, 2004, and/or PCT Application No. PCT/US03/40611, filed Dec. 19, 2003 and published Jul. 15, 2004 as International Publication No. WO 2004/058540, which are all hereby incorporated herein by reference in their entireties, or may include or incorporate video displays or the like, such as the types described in PCT Application No. PCT/US03/40611, filed Dec. 19, 2003 and published Jul. 15, 2004 as International Publication No. WO 2004/058540, and/or U.S. patent application Ser. No. 10/538,724, filed Jun. 13, 2005 and published Mar. 9, 2006 as U.S. Publication No. US-2006-0050018; and/or Ser. No. 11/284,543, filed Nov. 22, 2005, now U.S. Pat. No. 7,370, 983; and/or U.S. provisional applications, Ser. No. 60/630, 061, filed Nov. 22, 2004; and Ser. No. 60/667,048, filed Mar. 31, 2005, which are hereby incorporated herein by reference in their entireties.

Telecommunications and wireless communication/data transfer between, from and within a vehicle equipped with the present invention may be by means of airwaves designated for other technologies in the standard known as IMT-2000, and can be over networks based on WiMAX. WiMAX—Worldwide Interoperability for Microwave Access—is capable of delivering wireless broadband connections at speeds of 70 megabits per second or more across an area of up to 40 miles. It is properly referred to as 802.16e-2005. WiMAX provides wireless data over long distances in a variety of ways, from point-to-point links to full mobile cellular type access, and is based on the IEEE 802.16 standard (which is also called WirelessMAN). The 802.16 specification applies across a wide swath of the RF spectrum, and WiMAX can function on any frequency below 10 GHz (although higher frequencies can decrease the range to a few hundred meters in an urban environment). Although there is no uniform global licensed spectrum for WiMAX, WiMAX has three licensed spectrum profiles: 2.3 GHz, 2.5 GHz and 3.5 GHz.

Figure 24:
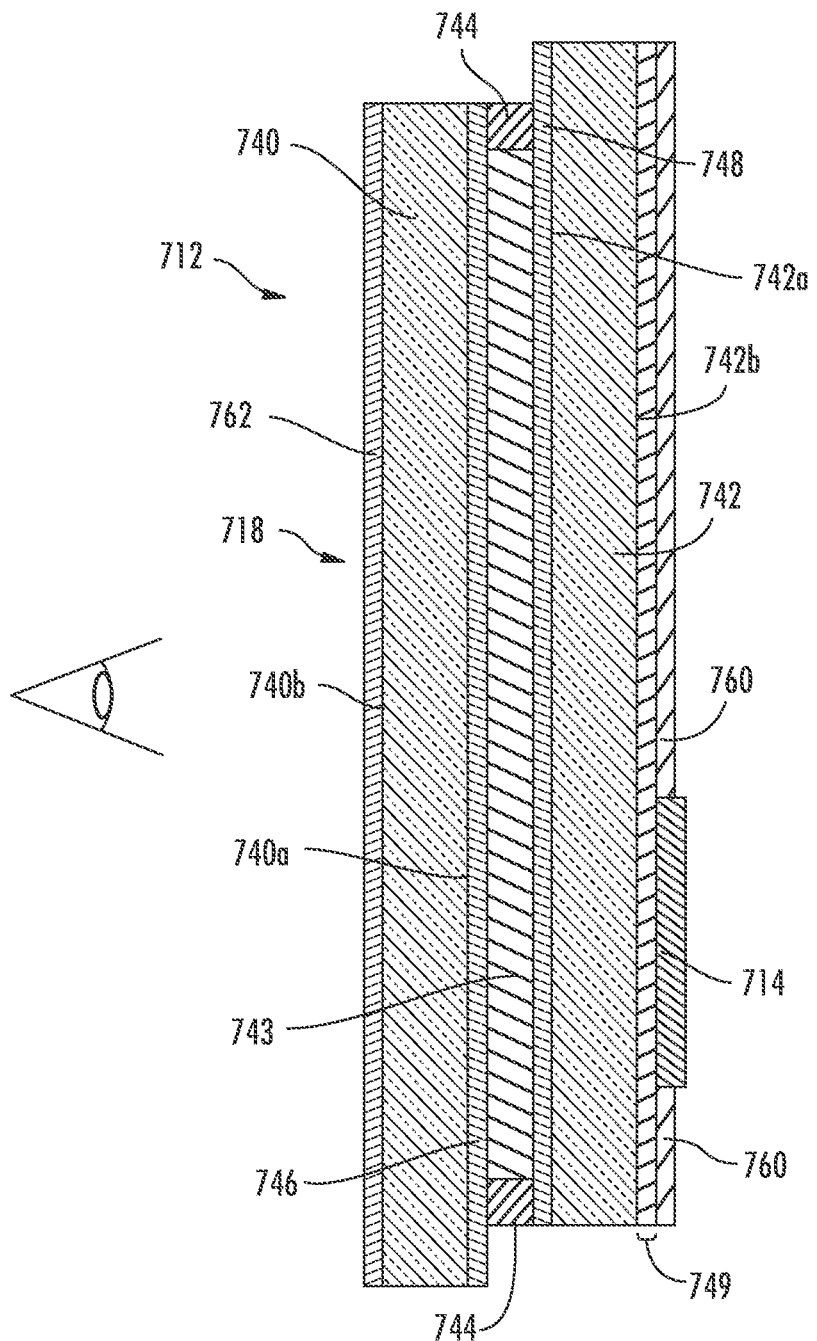
FIG. 24 is a sectional view of another mirror reflective element assembly in accordance with the present invention.

Optionally, and with reference to FIG. 24, a reflective element assembly 712, such as for an interior rearview mirror assembly, may include a video display element 714 at a rear portion of the reflective element 718 for viewing video display information through the reflective element when the video display element 714 is activated. In the illustrated embodiment, reflective element 718 comprises an electro-optic reflective element having a front substrate 740 (such as a transparent glass substrate or the like), a rear substrate 742 (such as a transparent glass substrate or the like) and an electro-optic medium 743 (such as a solid type, such as a solid polymer matrix electrochromic medium or the like, such as the types described in U.S. Pat. Nos. 7,004,592; 5,724,187; 5,668,663 and 5,910,854, and commonly owned and co-assigned and co-pending U.S. patent application Ser. No. 11/653,254, filed Jan. 16, 2007, now U.S. Pat. No. 7,349,144; Ser. No. 11/244,182, filed Oct. 6, 2005, now U.S. Pat. No. 7,543,947; and Ser. No. 11/655, 096, filed Jan. 19, 2007, now U.S. Pat. No. 7,572,017, which are all hereby incorporated herein by reference in their entireties, or such as a liquid type, such as the types described in U.S. Pat. Nos. 4,902,108; 5,128,799 and 5,818, 625, which are hereby incorporated herein by reference in their entireties) sandwiched therebetween and sealed via a perimeter seal 744. Front substrate 740 has a transparent conductor coating 746 (such as a ½ wave indium tin oxide (ITO) layer or doped tin oxide layer or doped zinc oxide layer, such as an AZO layer, or the like) disposed at its rear surface 740a, while rear substrate 742 has a third surface transparent electrical conductor coating 748 (such as a ½ wave indium tin oxide (ITO) layer or doped tin oxide layer or doped zinc oxide layer, such as an AZO layer, or the like) disposed at its front surface 742a and a fourth surface dichroic transflector coating or layer or layers 749 disposed at its rear surface 742b. Optionally, the conductive coatings or layers may be disposed or deposited at the surface of the glass substrate or substrates via any suitable means, such as via a sputter deposition process or via a pyrolytic deposition process, such as by utilizing aspects described in PCT Application No. PCT/US2006/018567, filed May 15, 2006 and published Nov. 23, 2006 as International Publication No. WO 2006/124682, which is hereby incorporated herein by reference in its entirety.

The dichroic transflector coating 749 of reflective element 718 comprises a stack of dielectric thin film layers, such as by utilizing aspects of optical dichroic mirrors as known in the optical dichroic mirror art. The dichroic reflector provides a reduced absorption level as compared to a metallic transflective layer, such that the reflective element 718 may provide enhanced transmissivity of light therethrough for a given level of reflectance of light incident thereon. Preferably, the reflectivity of light off of the dichroic transflector stack is greater than about 60% R, more preferably greater than about 70% R and more preferably greater than about 80% R, while the transmission of light through the dichroic transflector stack may be preferably greater than about 20% T, more preferably greater than about 25% T, and more preferably greater than about 30% T, but preferably less than about 40% T or thereabouts. Preferably, the dichroic transflector stack provides a non-specularly selective (i.e., neutral and substantially untinted and "silvery") reflection of light incident thereon and is also substantially neutral in transmission across the visible range of the electromagnetic spectrum (so that the likes of color video images generated on the video screen disposed to the rear of and emitting through the reflective element can be seen substantially true-to-color), such that the dichroic transflector is highly suitable for transmitting color video images therethrough. Thus, the dichroic transflector provides a wide band pass transmission of light substantially across the visible band of the electromagnetic spectrum. Thus, these dichroic reflectors have a wide band pass substantially across the visible light spectrum for transmission, and similarly for reflection.

In the illustrated embodiment, the display element 714 is disposed to the rear of the dichroic transflector stack 749 for emitting illumination therethrough. A light absorbing element 760 (such as a dark colored ink or paint or frit or coating or tape or film or layer or adhesive or plastic part or the like) may be disposed at the rear of the dichroic transflector stack 749 (except where the display element 714 is at) to limit light transmission through the reflective element except at the display element 714. Optionally, and as shown in FIG. 23, a first surface anti-reflector 762 may be provided at or established on the front or first surface 740b of the front substrate 740 to limit reflectance of light incident on the front substrate. Optionally, the anti-reflection layer (such as an OPTIVIEW™ layer such as commercially available from Pilkington) may be deposited pyrolytically in a glass manufacturing plant, such as described above or such as is disclosed in U.S. Pat. No. 5,076,674, which is hereby incorporated herein by reference in its entirety. The anti-reflector 762 may limit or reduce the first surface reflectivity to be, for example, preferably less than about 2 percent reflective of light incident thereon, preferably less than about 1 percent reflective of light incident thereon, and more preferably less than about 0.5 percent reflective of light incident thereon.

The display element 714 may comprise any suitable display element, such as a color video screen, such as a back-lit liquid crystal display video screen, such as a back-lit thin film transistor (TFT) liquid crystal display (LCD) video screen, such as a back-lit TFT LCD video screen that is back lit by a plurality of white light emitting light emitting diodes (such as an array of at least four white light emitting light emitting diodes or the like), such as light emitting diodes that utilize aspects of the light emitting diodes described in U.S. Pat. Nos. 6,690,268; 7,167,796 and 7,195,381, which are hereby incorporated herein by reference in their entireties.

Preferably, display element 714 comprises a video screen construction of the type disclosed in PCT Application No. PCT/US2006/042718, filed Oct. 31, 2006 and published May 10, 2007 as International Publication No. WO 2007/053710, which is hereby incorporated herein by reference in its entirety, that utilizes visible light transmitting brightness enhancing films such as VIKUITI™ Dual Brightness Enhancement Films (DBEF) that are commercially available from 3M® Corporation of Minneapolis, MN and that are typically a light transmitting plastic optical film consisting of over 800 polymer layers. VIKUITI™ Dual Brightness Enhancement (DBEF) film is a reflective polarizer made using multi-layer optical polymer film technology that manages light by preferentially transmitting one polarization state (P1) while reflecting the opposite polarization state (P2) back into the display. When a DBEF film is placed to the rear of the LCD panel of the video screen used with a video mirror of the present invention, so as to be between the LCD panel and the back-lighting light sources, and with the axis of polarization of the DBEF aligned with the axis of polarization (P1) of the polarizer at the rear of the rear glass substrate of the LCD panel, then light in the P2 polarization state emitted by the back-lighting light sources that would normally be absorbed by/not passed by the rear polarizer of the liquid crystal panel is recycled by reflection off the DBEF film back towards the back-lighting array to be in turn reflected off the likes of a mirror-like reflector of the back-lighting array with a concomitant change/scramble in handedness of polarization state back at least partially to a P1 polarization state, thus increasing the overall amount of light ultimately exiting the LCD display panel to pass through the reflective element for viewing by the driver of the vehicle equipped with the video mirror. Use can also be made of a VIKUITI™ BEF 111-1 OT film that provides about a 37 percent increase in on-axis brightness for direct-light systems, or the like. VIKUITI™ Brightness Enhancement Film (BEF) uses a microreplication process to create a prism structure that manages the angle of light ultimately exiting a display. Using the likes of total internal reflection and reflection/refraction at the micro prisms forming a random prism pattern, off-axis light rays incident at the rear of the BEF prism film can be made to exit more perpendicular to the plane of the BEF film and so on-axis display brightness is enhanced. When combined with VIKUITI™ DBEF-D400 (or D550) film or similar film or element, on-axis brightness can be increased by up to 68 percent or thereabouts.

Additionally, combining VIKUITI™ BEF ITT-I OT film with VIKUITI™ DBEF film may beneficially improve contrast when viewing an image displayed at the video mirror. For example, a video mirror can be constructed utilizing a video screen that comprises a thin film transistor liquid crystal display (LCD) panel that is back lit by an array of a plurality of white light emitting light emitting diodes (preferably more than four white LEDs) and including a VIKUITI™ DBEF reflecting polarizer and a VIKUITI™ BEF prism film, preferably disposed between the rear of the LCD panel and the back-lighting array of LEDs (and with the DBEF film closer to the LCD panel and the BEF film closer to the back-lighting so that light emitted by the back-lighting LEDs impinges on the BEF film (typically having passed through a light diffuser film, although a diffusing property may be included in the DBEF film such as VIKUITI™ Diffuse Reflective Polarizer Film DRPF or VIKUITI™ DBEF-D280) before passing through the DBEF film and then, in turn, passes through the LCD panel and then through the reflective element itself. Also, two BEF sheets crossed at degrees can optionally be used to increase display brightness. Also, VIKUITI™ Brightness Enhancement Film-Reflective Polarizer (BEF-RP) that combines light recycling and reflection/refraction in a single multi-layer polymeric film/sheet that includes micro-prism structures and polarized light management may be used in the video screen device construction of a video mirror of the present invention. Also, VIKUITI™ BEF-RP or VIKUITI™ BEFRP2-RC multi-functional film that combines polarizing recycling and light angle management may be used in the video screen device construction of a video mirror of the present invention. Also, VIKUITI™ DBEF MF1-650 (having a film/sheet thickness of 650 microns) or multi-functional film VIKUITI™ DBEF MF1-470 (having a film/sheet thickness of 470 microns) that combines polarizing recycling and light angle management may be used in the video screen device construction of a video mirror of the present invention.

When viewed via the front substrate and when operated during normal driving conditions and under high ambient lighting (such as daylight driving conditions), the luminance of the images seen at the video display screen as viewed through the front substrate and through the electro-optic medium and through the rear substrate is preferably at least about 900 candelas/square meter, more preferably at least about 1,200 candelas/square meter, and more preferably at least about 1,500 candelas/square meter, when the electro-optic medium is in its undimmed state and with the back lighting light sources of the video screen being powered to their maximum normally-allowed power level for use in the interior rearview mirror assembly in the vehicle.

Figure 25:
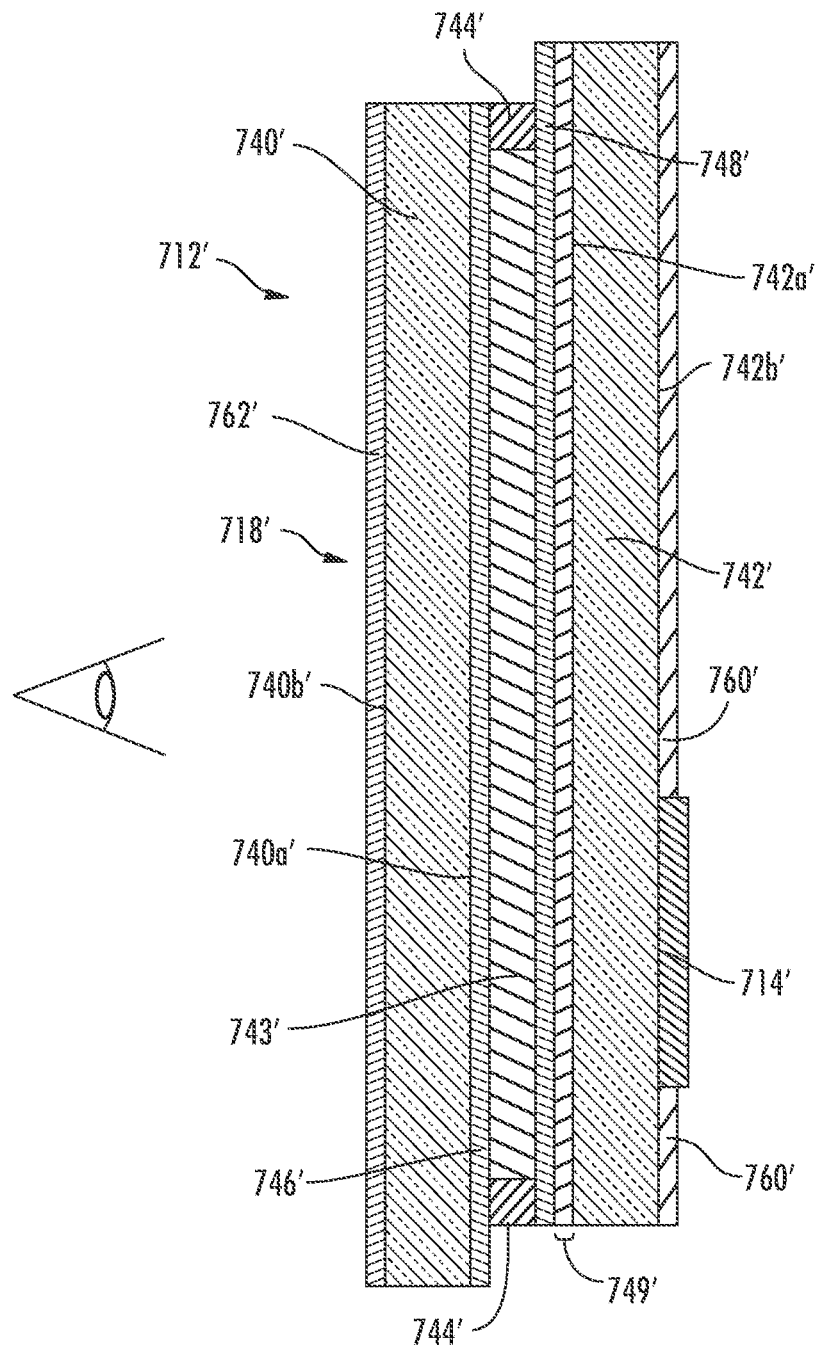
FIG. 25 is a sectional view of another mirror reflective element assembly in accordance with the present invention.

Optionally, and with reference to FIG. 25, the dichroic transflector layers 749' of a reflective element 718' may be disposed at the front surface or third surface 742a' of the rear substrate 742' and between the third surface 742a' and the transparent electrical conductor 748'. Similar to reflective element 718, a video display element 714' is disposed at a rear portion of the reflective element 718' for viewing video display information through the reflective element when the video display element 714' is activated. Reflective element 718' comprises an electro-optic reflective element having a front substrate 740', rear substrate 742' and an electro-optic medium 743' sandwiched therebetween and sealed via a perimeter seal 744'. Front substrate 740' has a transparent conductor coating 746' disposed at its rear surface 740a' and an anti-reflective coating or layer 762' disposed at its front surface 740b', while rear substrate 742' has a light absorbing element 760' disposed at its rear surface 742b'.

The transparent electrical conductor layer 748' is thus disposed over the third surface dichroic transflector layers 749' and is between the electro-optic medium 743' and the dichroic transflector layers 749'. The transparent electrical conductor is thus in contact with the electro-optic medium and preferably has a resistivity of about 5-15 ohms per square for powering the electro-optic medium when a current is applied to the transparent electrical conductor. The third surface dichroic transflector reflective element 718' may be substantially similar to the fourth surface dichroic transflector reflective element 718, discussed above (although the stack design may be adjusted so as to accommodate use of the likes of a half-wave ITO transparent thin film as the outermost layer in electrical contact with the electro-optically active inter-pane medium), such that a detailed discussion of the reflective elements need not be repeated herein. The difference in appearance (as viewed by a person viewing the reflective elements when the respective mirror assemblies are normally mounted in a vehicle) between a third surface dichroic transflector reflective element and a fourth surface dichroic transflector reflective element is not readily discernible to a person viewing the reflective elements of the interior rearview mirror assemblies due to the size of the mirrors and mirror substrates.

The third and fourth surface dichroic transflector reflective elements of the present invention thus provide dichroic transflectors that have reduced absorption as compared to non-dichroic metallic transflectors (such as metal oxide/metal/metal oxide stacks of layers), so that the dichroic transflector reflective element exhibits enhanced transmissivity of light therethrough for a given level of reflectivity of light incident thereon. This is because the dichroic transflector layers used in the dichroic transflectors, being all non-metallic (such as transparent metal oxides or transparent metal halides or transparent metal nitrides or other transparent non-metallic metal compounds), have a significantly lower extinction coefficient (smaller "k" value in the optical constants) than a metal layer (such as a thin silver thin film coating or a thin silver alloy thin film coating or a thin aluminum thin film coating or a thin aluminum alloy thin film coating) used in a non-dichroic metallic transflector. The extinction coefficient for the layers or coatings is a measure of how well the layers or coatings absorb electromagnetic radiation. If electromagnetic waves can pass through with reduced absorption, the material has a lower extinction coefficient.

The constructions of the present invention are economical and effective compared to the more complicated and potentially more costly constructions of other mirror assemblies. For example, no collimating optical element (or any equivalent thereof) need be positioned at the light assembly of the embodiments of the present invention, since the slanted baffle in tandem with the slanted orientation of the light assembly to the rear of the back plate obviates the need for a collimating optical element. The present invention also obviates the cost and complexity of use of an optics block with collimating and deviator portions to control direction of light rays, or any equivalent thereof, such as is disclosed in PCT Application No. PCT/US00/07437, filed Mar. 7, 2005 by Gentex Corporation, and published Sep. 22, 2005 as International Publication No. WO 2005/086777, which is hereby incorporated herein by reference in its entirety.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior breakaway rearview mirror assembly, the vehicular exterior breakaway rearview mirror assembly comprising:
   a skull-cap mirror shell;
   a reflective element;
   wherein, with the vehicular exterior breakaway rearview mirror assembly mounted at an exterior side of a vehicle equipped with the vehicular exterior breakaway rearview mirror assembly, the skull-cap mirror shell has an inboard wall that faces toward the exterior side of the equipped vehicle;
   a blind spot indicator disposed at an aperture established at the inboard wall of the skull-cap mirror shell of the vehicular exterior breakaway rearview mirror assembly, wherein the blind spot indicator comprises an illumination source comprising at least one light emitting diode;
   wherein the blind spot indicator comprises an electrical connector;
   wherein, with the vehicular exterior breakaway rearview mirror assembly mounted at the exterior side of the equipped vehicle, the inboard wall of the skull-cap mirror shell is viewable by a driver of the equipped vehicle;
   wherein, with the vehicular exterior breakaway rearview mirror assembly mounted at the exterior side of the equipped vehicle, the illumination source is activated to illuminate the blind spot indicator responsive to an electronic blind spot monitoring system of the equipped vehicle detecting another vehicle that is at least one selected from the group consisting of (i) approaching the equipped vehicle from rearward of the equipped vehicle and (ii) overtaking the equipped vehicle from rearward of the equipped vehicle at a side lane adjacent to the exterior side of the equipped vehicle at which the vehicular exterior breakaway rearview mirror assembly is mounted;
   wherein, with the vehicular exterior breakaway rearview mirror assembly mounted at the exterior side of the equipped vehicle, and upon the electronic blind spot monitoring system of the equipped vehicle detecting the other vehicle, the blind spot indicator indicates a hazard;
   wherein the blind spot indicator disposed at the aperture established at the inboard wall of the skull-cap mirror shell of the vehicular exterior breakaway rearview mirror assembly provides a viewing area of at least two square centimeters viewable by the driver of the equipped vehicle when the vehicular exterior breakaway rearview mirror assembly is mounted at the exterior side of the equipped vehicle; and
   wherein, with the vehicular exterior breakaway rearview mirror assembly mounted at the exterior side of the equipped vehicle, illumination of the blind spot indicator by activation of the illumination source is readily viewable by the driver of the equipped vehicle and is not readily viewable by a driver of the detected other vehicle.

2. The vehicular exterior breakaway rearview mirror assembly of claim 1, wherein the blind spot indicator is disposed at a sloping wall portion of the inboard wall of the skull-cap mirror shell.

3. The vehicular exterior breakaway rearview mirror assembly of claim 1, wherein the blind spot indicator is aerodynamically disposed at a sloping wall portion of the inboard wall of the skull-cap mirror shell.

4. The vehicular exterior breakaway rearview mirror assembly of claim 1, wherein the blind spot indicator disposed at the aperture established at the inboard wall of the skull-cap mirror shell of the vehicular exterior breakaway rearview mirror assembly provides a viewing area of at least four square centimeters viewable by the driver of equipped vehicle when the vehicular exterior breakaway rearview mirror assembly is mounted at the exterior side of the equipped vehicle.

5. The vehicular exterior breakaway rearview mirror assembly of claim 4, wherein the blind spot indicator comprises an optic element.

6. The vehicular exterior breakaway rearview mirror assembly of claim 1, wherein the exterior side of the equipped vehicle at which the vehicular exterior breakaway rearview mirror assembly is mounted is a driver side of the equipped vehicle.

7. The vehicular exterior breakaway rearview mirror assembly of claim 1, wherein the exterior side of the equipped vehicle at which the vehicular exterior breakaway rearview mirror assembly is mounted is a passenger side of the equipped vehicle.

8. The vehicular exterior breakaway rearview mirror assembly of claim 1, wherein the blind spot indicator comprises a light directing element for directing illumination from the illumination source toward the exterior side of the equipped vehicle to enhance viewing of the blind spot indicator by the driver of the equipped vehicle when the vehicular exterior breakaway rearview mirror assembly is mounted at the exterior side of the equipped vehicle and when the illumination source is illuminated.

9. The vehicular exterior breakaway rearview mirror assembly of claim 1, wherein the blind spot indicator comprises at least two light emitting diodes.

10. The vehicular exterior breakaway rearview mirror assembly of claim 9, wherein the blind spot indicator comprises a first light emitting diode, a second light emitting diode and a third light emitting diode.

11. The vehicular exterior breakaway rearview mirror assembly of claim 1, wherein the vehicular exterior breakaway rearview mirror assembly is a powerfold vehicular exterior breakaway rearview mirror assembly.

12. The vehicular exterior breakaway rearview mirror assembly of claim 1, wherein the reflective element comprises an electro-optic reflective element with electrically variable reflectivity.

13. The vehicular exterior breakaway rearview mirror assembly of claim 1, wherein the blind spot indicator comprises at least one selected from the group consisting of (i) a lens, (ii) a light directing element, (iii) a light guiding element, (iv) a light channel, (v) a light conduit, (vi) a light baffle and (vii) a light louver.

14. The vehicular exterior breakaway rearview mirror assembly of claim 1, wherein the blind spot indicator is aerodynamically disposed at the inboard wall of the skull-cap mirror shell.

15. The vehicular exterior breakaway rearview mirror assembly of claim 14, wherein, with the vehicular exterior breakaway rearview mirror assembly mounted at the exterior side of the equipped vehicle, and when the illumination source is illuminated, the driver of the equipped vehicle who is viewing the blind spot indicator sees a hazard alert.

16. The vehicular exterior breakaway rearview mirror assembly of claim 1, wherein the blind spot indicator is disposed at the skull-cap mirror shell at a location that is inboard relative to the position of the reflective element with respect to the exterior side of the equipped vehicle.

17. The vehicular exterior breakaway rearview mirror assembly of claim 1, wherein electrical connection is made with the blind spot indicator via a plug and socket type arrangement.

18. A vehicular exterior breakaway rearview mirror assembly, the vehicular exterior breakaway rearview mirror assembly comprising:
  a skull-cap mirror shell;
  a reflective element;
  wherein, with the vehicular exterior breakaway rearview mirror assembly mounted at an exterior side of a vehicle equipped with the vehicular exterior breakaway rearview mirror assembly, the skull-cap mirror shell has an inboard wall that faces toward the exterior side of the equipped vehicle;
  a blind spot indicator disposed at an aperture established at the inboard wall of the skull-cap mirror shell of the vehicular exterior breakaway rearview mirror assembly, wherein the blind spot indicator comprises an illumination source comprising at least two light emitting diodes;
  wherein the blind spot indicator is disposed at the skull-cap mirror shell at a location that is inboard relative to the position of the reflective element with respect to the exterior side of the equipped vehicle;
  wherein the blind spot indicator comprises an electrical connector;
  wherein, with the vehicular exterior breakaway rearview mirror assembly mounted at the exterior side of the equipped vehicle, the inboard wall of the skull-cap mirror shell is viewable by a driver of the equipped vehicle;
  wherein, with the vehicular exterior breakaway rearview mirror assembly mounted at the exterior side of the equipped vehicle, the illumination source is activated to illuminate the blind spot indicator responsive to an electronic blind spot monitoring system of the equipped vehicle detecting another vehicle that is at least one selected from the group consisting of (i) approaching the equipped vehicle from rearward of the equipped vehicle and (ii) overtaking the equipped vehicle from rearward of the equipped vehicle at a side lane adjacent to the exterior side of the equipped vehicle at which the vehicular exterior breakaway rearview mirror assembly is mounted;
  wherein, with the vehicular exterior breakaway rearview mirror assembly mounted at the exterior side of the equipped vehicle, and upon the electronic blind spot monitoring system of the equipped vehicle detecting the other vehicle, the blind spot indicator indicates a hazard;
  wherein the blind spot indicator disposed at the aperture established at the inboard wall of the skull-cap mirror shell of the vehicular exterior breakaway rearview mirror assembly provides a viewing area of at least two square centimeters viewable by the driver of the equipped vehicle when the vehicular exterior breakaway rearview mirror assembly is mounted at the exterior side of the equipped vehicle; and
  wherein, with the vehicular exterior breakaway rearview mirror assembly mounted at the exterior side of the equipped vehicle, illumination of the blind spot indicator by activation of the illumination source is readily viewable by the driver of the equipped vehicle and is not readily viewable by a driver of the detected other vehicle.

19. The vehicular exterior breakaway rearview mirror assembly of claim 18, wherein the blind spot indicator is disposed at a sloping wall portion of the inboard wall of the skull-cap mirror shell.

20. The vehicular exterior breakaway rearview mirror assembly of claim 18, wherein the blind spot indicator is aerodynamically disposed at a sloping wall portion of the inboard wall of the skull-cap mirror shell.

21. The vehicular exterior breakaway rearview mirror assembly of claim 18, wherein the exterior side of the equipped vehicle at which the vehicular exterior breakaway rearview mirror assembly is mounted is a driver side of the equipped vehicle.

22. The vehicular exterior breakaway rearview mirror assembly of claim 18, wherein the exterior side of the equipped vehicle at which the vehicular exterior breakaway rearview mirror assembly is mounted is a passenger side of the equipped vehicle.

23. The vehicular exterior breakaway rearview mirror assembly of claim 18, wherein the blind spot indicator comprises a light directing element for directing illumination from the illumination source toward the exterior side of the equipped vehicle to enhance viewing of the blind spot indicator by the driver of the equipped vehicle when the vehicular exterior breakaway rearview mirror assembly is mounted at the exterior side of the equipped vehicle and when the illumination source is illuminated.

24. The vehicular exterior breakaway rearview mirror assembly of claim 18, wherein the blind spot indicator comprises a first light emitting diode, a second light emitting diode and a third light emitting diode.

25. The vehicular exterior breakaway rearview mirror assembly of claim 18, wherein the vehicular exterior breakaway rearview mirror assembly is a powerfold vehicular exterior breakaway rearview mirror assembly.

26. The vehicular exterior breakaway rearview mirror assembly of claim 18, wherein the reflective element comprises an electro-optic reflective element with electrically variable reflectivity.

27. The vehicular exterior breakaway rearview mirror assembly of claim 18, wherein the blind spot indicator comprises at least one selected from the group consisting of (i) a lens, (ii) a light directing element, (iii) a light guiding element, (iv) a light channel, (v) a light conduit, (vi) a light baffle and (vii) a light louver.

28. The vehicular exterior breakaway rearview mirror assembly of claim 18, wherein the blind spot indicator is aerodynamically disposed at the inboard wall of the skull-cap mirror shell.

29. The vehicular exterior breakaway rearview mirror assembly of claim 28, wherein, with the vehicular exterior breakaway rearview mirror assembly mounted at the exterior side of the equipped vehicle, and when the illumination source is illuminated, the driver of the equipped vehicle who is viewing the blind spot indicator sees a hazard alert.

30. The vehicular exterior breakaway rearview mirror assembly of claim 18, wherein electrical connection is made with the blind spot indicator via a plug and socket type arrangement.

31. A vehicular exterior breakaway rearview mirror assembly, the vehicular exterior breakaway rearview mirror assembly comprising:

a skull-cap mirror shell;

a reflective element;

wherein, with the vehicular exterior breakaway rearview mirror assembly mounted at an exterior side of a vehicle equipped with the vehicular exterior breakaway rearview mirror assembly, the skull-cap mirror shell has an inboard wall that faces toward the exterior side of the equipped vehicle;

a blind spot indicator disposed at an aperture established at the inboard wall of the skull-cap mirror shell of the vehicular exterior breakaway rearview mirror assembly, wherein the blind spot indicator comprises an illumination source comprising at least two light emitting diodes;

wherein the blind spot indicator comprises an electrical connector;

wherein, with the vehicular exterior breakaway rearview mirror assembly mounted at the exterior side of the equipped vehicle, the inboard wall of the skull-cap mirror shell is viewable by a driver of the equipped vehicle;

wherein, with the vehicular exterior breakaway rearview mirror assembly mounted at the exterior side of the equipped vehicle, the illumination source is activated to illuminate the blind spot indicator responsive to an electronic blind spot monitoring system of the equipped vehicle detecting another vehicle that is at least one selected from the group consisting of (i) approaching the equipped vehicle from rearward of the equipped vehicle and (ii) overtaking the equipped vehicle from rearward of the equipped vehicle at a side lane adjacent to the exterior side of the equipped vehicle at which the vehicular exterior breakaway rearview mirror assembly is mounted;

wherein, with the vehicular exterior breakaway rearview mirror assembly mounted at the exterior side of the equipped vehicle, and upon the electronic blind spot monitoring system of the equipped vehicle detecting the other vehicle, the blind spot indicator indicates a hazard;

wherein the blind spot indicator disposed at the aperture established at the inboard wall of the skull-cap mirror shell of the vehicular exterior breakaway rearview mirror assembly provides a viewing area of at least four square centimeters viewable by the driver of the equipped vehicle when the vehicular exterior breakaway rearview mirror assembly is mounted at the exterior side of the equipped vehicle; and wherein, with the vehicular exterior breakaway rearview mirror assembly mounted at the exterior side of the equipped vehicle, illumination of the blind spot indicator by activation of the illumination source is readily viewable by the driver of the equipped vehicle and is not readily viewable by a driver of the detected other vehicle.

32. The vehicular exterior breakaway rearview mirror assembly of claim 31, wherein the blind spot indicator is disposed at a sloping wall portion of the inboard wall of the skull-cap mirror shell.

33. The vehicular exterior breakaway rearview mirror assembly of claim 31, wherein the blind spot indicator is aerodynamically disposed at a sloping wall portion of the inboard wall of the skull-cap mirror shell.

34. The vehicular exterior breakaway rearview mirror assembly of claim 31, wherein the blind spot indicator comprises an optic element.

35. The vehicular exterior breakaway rearview mirror assembly of claim 31, wherein the exterior side of the equipped vehicle at which the vehicular exterior breakaway rearview mirror assembly is mounted is a driver side of the equipped vehicle.

36. The vehicular exterior breakaway rearview mirror assembly of claim 31, wherein the exterior side of the equipped vehicle at which the vehicular exterior breakaway rearview mirror assembly is mounted is a passenger side of the equipped vehicle.

37. The vehicular exterior breakaway rearview mirror assembly of claim 31, wherein the blind spot indicator comprises a light directing element for directing illumination from the illumination source toward the exterior side of the equipped vehicle to enhance viewing of the blind spot indicator by the driver of the equipped vehicle when the vehicular exterior breakaway rearview mirror assembly is mounted at the exterior side of the equipped vehicle and when the illumination source is illuminated.

38. The vehicular exterior breakaway rearview mirror assembly of claim 31, wherein the blind spot indicator comprises a first light emitting diode, a second light emitting diode and a third light emitting diode.

39. The vehicular exterior breakaway rearview mirror assembly of claim 31, wherein the vehicular exterior breakaway rearview mirror assembly is a powerfold vehicular exterior breakaway rearview mirror assembly.

40. The vehicular exterior breakaway rearview mirror assembly of claim 31, wherein the reflective element comprises an electro-optic reflective element with electrically variable reflectivity.

41. The vehicular exterior breakaway rearview mirror assembly of claim 31, wherein the blind spot indicator comprises at least one selected from the group consisting of (i) a lens, (ii) a light directing element, (iii) a light guiding element, (iv) a light channel, (v) a light conduit, (vi) a light baffle and (vii) a light louver.

42. The vehicular exterior breakaway rearview mirror assembly of claim 31, wherein the blind spot indicator is aerodynamically disposed at the inboard wall of the skull-cap mirror shell.

43. The vehicular exterior breakaway rearview mirror assembly of claim 42, wherein, with the vehicular exterior breakaway rearview mirror assembly mounted at the exterior side of the equipped vehicle, and when the illumination source is illuminated, the driver of the equipped vehicle who is viewing the blind spot indicator sees a hazard alert.

44. The vehicular exterior breakaway rearview mirror assembly of claim 31, wherein the blind spot indicator is disposed at the skull-cap mirror shell at a location that is inboard relative to the position of the reflective element with respect to the exterior side of the equipped vehicle.

45. The vehicular exterior breakaway rearview mirror assembly of claim 31, wherein electrical connection is made with the blind spot indicator via a plug and socket type arrangement.

\* \* \* \* \*

UNITED STATES PATENT AND TRADEMARK OFFICE
CERTIFICATE OF CORRECTION

PATENT NO. : 11,827,155 B2
APPLICATION NO. : 18/054964
DATED : November 28, 2023
INVENTOR(S) : Niall R. Lynam Page 1 of 1

It is certified that error appears in the above-identified patent and that said Letters Patent is hereby corrected as shown below:

In the Specification

Column 7
Line 42, "FIG. with" should be --FIG. 35, with--

Column 61
Line 53, "at degrees" should be --at 90 degrees--

Signed and Sealed this
Second Day of January, 2024

Katherine Kelly Vidal
*Director of the United States Patent and Trademark Office*